United States Patent
Kim et al.

(10) Patent No.: US 9,328,447 B2
(45) Date of Patent: *May 3, 2016

(54) WASHING MACHINE TO PRODUCE THREE-DIMENSIONAL MOTION

(71) Applicant: LG ELECTRONICS INC., Seoul (KR)

(72) Inventors: Jinwoong Kim, Seoul (KR); Changwoo Son, Seoul (KR); Chaseung Jun, Seoul (KR); Dongwon Kim, Seoul (KR); Hwanjin Jung, Seoul (KR); Byungwook Min, Seoul (KR); Byungkeol Choi, Seoul (KR)

(73) Assignee: LG Electronics Inc., Seoul (KR)

(*) Notice: Subject to any disclaimer, the term of this patent is extended or adjusted under 35 U.S.C. 154(b) by 240 days.

This patent is subject to a terminal disclaimer.

(21) Appl. No.: 14/018,114
(22) Filed: Sep. 4, 2013
(65) Prior Publication Data

US 2014/0069149 A1    Mar. 13, 2014

Related U.S. Application Data

(63) Continuation of application No. 13/658,114, filed on Oct. 23, 2012, now Pat. No. 9,080,279.

(30) Foreign Application Priority Data

| Oct. 24, 2011 | (KR) | 10-2011-0108952 |
| Oct. 24, 2011 | (KR) | 10-2011-0108953 |
| Oct. 24, 2011 | (KR) | 10-2011-0108955 |
| Oct. 24, 2011 | (KR) | 10-2011-0108957 |
| Oct. 24, 2011 | (KR) | 10-2011-0108971 |
| Oct. 24, 2011 | (KR) | 10-2011-0108973 |
| Oct. 24, 2011 | (KR) | 10-2011-0108974 |
| Oct. 24, 2011 | (KR) | 10-2011-0108976 |
| Oct. 24, 2011 | (KR) | 10-2011-0108977 |
| Oct. 24, 2011 | (KR) | 10-2011-0108978 |
| Oct. 24, 2011 | (KR) | 10-2011-0108979 |
| Oct. 24, 2011 | (KR) | 10-2011-0108982 |
| Oct. 24, 2011 | (KR) | 10-2011-0108986 |
| Feb. 8, 2012 | (KR) | 10-2012-0012984 |
| Feb. 8, 2012 | (KR) | 10-2012-0012985 |
| Feb. 8, 2012 | (KR) | 10-2012-0012986 |
| Feb. 13, 2012 | (KR) | 10-2012-0014463 |
| Feb. 13, 2012 | (KR) | 10-2012-0014464 |
| Oct. 9, 2012 | (KR) | 10-2012-0112047 |

(51) Int. Cl.
*D06F 37/30*    (2006.01)
*D06F 37/04*    (2006.01)
(Continued)

(52) U.S. Cl.
CPC ............... *D06F 37/30* (2013.01); *B23P 11/00* (2013.01); *B23P 11/02* (2013.01); *D06F 31/00* (2013.01);
(Continued)

(58) Field of Classification Search
CPC ......... D06F 21/02; D06F 23/02; D06F 31/00; D06F 35/00; D06F 37/04; D06F 37/30; D06F 37/304
See application file for complete search history.

(56) References Cited

U.S. PATENT DOCUMENTS 6,257,027 B1    7/2001    Imai
6,311,527 B1    11/2001   Monteiro et al.
(Continued)

FOREIGN PATENT DOCUMENTS

CN    2305416    1/1999
CN    1427112 A  7/2003
(Continued)

OTHER PUBLICATIONS

Notice of Allowance mailed Jan. 17, 2013 in corresponding Korean application No. 10-2011-1018952, 4 pages with translation.
(Continued)

*Primary Examiner* — Joseph L Perrin
(74) *Attorney, Agent, or Firm* — Fish & Richardson P.C.

(57) ABSTRACT

A washing machine includes a main body defining an outer appearance, a tub disposed within the main body, a main drum rotatably mounted in the tub, a sub drum mounted in the main drum to be relatively rotatable with respect to the main drum, an outer shaft for rotating the main drum, an inner shaft for rotating the sub drum, being disposed inside the outer shaft, and a driving motor having a stator, an outer rotor connected to the inner shaft that is rotatable outside the stator, and an inner rotor connected to the outer shaft that is rotatable inside the stator, wherein the driving motor independently drives the main drum and the sub drum.

15 Claims, 64 Drawing Sheets

(51) Int. Cl.

| | | |
|---|---|---|
| *H02K 1/26* | (2006.01) | |
| *D06F 37/20* | (2006.01) | |
| *B23P 11/00* | (2006.01) | |
| *B23P 11/02* | (2006.01) | |
| *H02K 1/27* | (2006.01) | |
| *H02K 21/12* | (2006.01) | |
| *H02K 1/16* | (2006.01) | |
| *H02K 1/28* | (2006.01) | |
| *H02K 3/52* | (2006.01) | |
| *H02K 7/00* | (2006.01) | |
| *H02K 7/14* | (2006.01) | |
| *H02K 11/00* | (2016.01) | |
| *H02K 16/02* | (2006.01) | |
| *D06F 37/00* | (2006.01) | |
| *D06F 37/06* | (2006.01) | |
| *D06F 37/26* | (2006.01) | |
| *D06F 31/00* | (2006.01) | |
| *D06F 21/02* | (2006.01) | |
| *H02K 21/16* | (2006.01) | |
| *H02K 21/22* | (2006.01) | |
| *D06F 23/02* | (2006.01) | |

(52) U.S. Cl.
CPC .............. *D06F 37/00* (2013.01); *D06F 37/04* (2013.01); *D06F 37/06* (2013.01); *D06F 37/206* (2013.01); *D06F 37/269* (2013.01); *D06F 37/304* (2013.01); *H02K 1/16* (2013.01); *H02K 1/26* (2013.01); *H02K 1/265* (2013.01); *H02K 1/2706* (2013.01); *H02K 1/2773* (2013.01); *H02K 1/28* (2013.01); *H02K 3/522* (2013.01); *H02K 7/003* (2013.01); *H02K 7/14* (2013.01); *H02K 11/0021* (2013.01); *H02K 16/02* (2013.01); *H02K 21/12* (2013.01); *D06F 21/02* (2013.01); *D06F 23/02* (2013.01); *H02K 21/16* (2013.01); *H02K 21/22* (2013.01); *Y02B 40/52* (2013.01); *Y10T 29/49826* (2015.01); *Y10T 29/49945* (2015.01)

(56) References Cited

U.S. PATENT DOCUMENTS

| | | | |
|---|---|---|---|
| 6,474,114 B1 * | 11/2002 | Ito et al. .......................... | 68/140 |
| 6,843,079 B2 | 1/2005 | Hird | |
| 7,191,484 B2 | 3/2007 | Dawe | |
| 7,441,422 B2 | 10/2008 | Choi | |
| 7,557,486 B2 | 7/2009 | Choi et al. | |
| 7,638,920 B2 | 12/2009 | Niguchi et al. | |
| 2002/0029594 A1 | 3/2002 | Monteiro et al. | |
| 2004/0035155 A1 | 2/2004 | Yoon | |
| 2004/0103698 A1 | 6/2004 | Kim et al. | |
| 2004/0163429 A1 | 8/2004 | Lim | |
| 2005/0210604 A1 * | 9/2005 | Schmid et al. .................... | 8/158 |
| 2006/0042022 A1 | 3/2006 | Kim et al. | |
| 2007/0205682 A1 | 9/2007 | Choi et al. | |
| 2007/0273241 A1 | 11/2007 | Niguchi et al. | |
| 2010/0018257 A1 | 1/2010 | Chang | |
| 2010/0050702 A1 * | 3/2010 | Kim et al. ..................... | 68/23 R |
| 2010/0156216 A1 | 6/2010 | Lee et al. | |
| 2013/0111676 A1 | 5/2013 | Jun et al. | |
| 2013/0118212 A1 | 5/2013 | Jun et al. | |
| 2013/0118213 A1 | 5/2013 | Jun et al. | |
| 2013/0118214 A1 | 5/2013 | Jun et al. | |
| 2014/0190219 A1 | 7/2014 | Kim et al. | |
| 2014/0366283 A1 | 12/2014 | Jun et al. | |
| 2015/0020555 A1 | 1/2015 | Jun et al. | |

FOREIGN PATENT DOCUMENTS

| | | |
|---|---|---|
| CN | 1469949 A | 1/2004 |
| CN | 1531611 A | 9/2004 |
| CN | 1743535 A | 3/2006 |
| CN | 1880563 | 12/2006 |
| CN | 101074527 A | 11/2007 |
| CN | 101074535 A | 11/2007 |
| CN | 101171382 A | 4/2008 |
| CN | 101177879 A | 5/2008 |
| CN | 101314905 | 12/2008 |
| CN | 201339116 | 11/2009 |
| EP | 0688894 A1 | 12/1995 |
| EP | 947622 B1 | 7/2003 |
| EP | 1630278 A3 | 5/2006 |
| EP | 1334226 B1 | 1/2010 |
| EP | 1 967 636 B1 | 4/2010 |
| GB | 2141742 B | 12/1986 |
| GB | 2368071 A | 4/2002 |
| JP | 59-230599 A | 12/1984 |
| JP | 3111089 A | 5/1991 |
| JP | 06-038413 A | 2/1994 |
| JP | 11137884 A | 5/1999 |
| JP | 11-276774 A | 10/1999 |
| JP | 11-319374 A | 11/1999 |
| JP | 2002-006009 A | 1/2002 |
| JP | 2002514488 T | 5/2002 |
| JP | 2003-527902 T | 9/2003 |
| JP | 2003-299296 A | 10/2003 |
| JP | 2004072949 A | 3/2004 |
| JP | 2005110485 A | 4/2005 |
| JP | 2006-043153 A | 2/2006 |
| JP | 2006-230956 A | 9/2006 |
| JP | 2007-318974 A | 12/2007 |
| JP | 2010046323 A | 3/2010 |
| KR | 1020020037814 A | 5/2002 |
| KR | 1020020043934 A | 6/2006 |
| KR | 1020060071146 A | 6/2006 |
| KR | 1020060084139 A | 7/2006 |
| KR | 2006088237 A | 8/2006 |
| KR | 1020100073450 A | 7/2010 |
| RU | 2002119569 A | 2/2004 |
| SU | 1758785 A1 | 2/1990 |
| WO | WO2006126814 A3 | 2/2007 |
| WO | 2010/008181 A1 | 1/2010 |

OTHER PUBLICATIONS

Notification of Transmittal of the International Search Report and the Written Opinion of the International Searching Authority, or Declaration (2 pages); International Search Report (5 pages); and Written Opinion of the International Searching Authority (5 pages), mailed Feb. 19, 2013, for related international application PCT/KR2012/008777.

Notification of Transmittal of the International Search Report and the Written Opinion of the International Searching Authority, or Declaration (1 page); International Search Report (4 pages); and Written Opinion of the International Searching Authority (4 pages), mailed Feb. 19, 2013, for related international application PCT/KR2012/008775.

Notification of Transmittal of the International Search Report and the Written Opinion of the International Searching Authority, or the Declaration, dated Mar. 26, 2013 from International Application No. PCT/KR2012/008780, 17 pages.

Notification of Transmittal of the International Search Report and the Written Opinion of the International Searching Authority, or the Declaration, mailed Jan. 10, 2014 in corresponding International Application No. PCT/KR2013/008991 (in English), 12 pages.

Notice of Allowance dated Feb. 11, 2015 in corresponding U.S. Appl. No. 13/658,114, 17 pages.

(56) References Cited

OTHER PUBLICATIONS

Search Report dated Apr. 7, 2015 from corresponding European Patent Application No. 14176380.5, 8 pages.
Office Action dated Apr. 7, 2015 from corresponding Japanese Patent Application No. 2014-538707, 5 pages.
Office Action dated Apr. 21, 2015 from corresponding Japanese Patent Application No. 2014-538705, 4 pages.
Office Action dated Oct. 19, 2015 from corresponding Chinese Patent Application No. 20180063100.8, 29 pages (including translation).
Office Action dated Oct. 29, 2015 from corresponding Chinese Patent Application No. 201280063132.8, 25 pages (including translation).
Notice of Allowance dated Nov. 6, 2015 from corresponding Russian Patent Application No. 2014120978, 14 pages (including translation).
Office Action dated May 26, 2015 from corresponding Japanese Patent Application No. 2014-538706, 3 pages.
Search Report dated Jun. 16, 2015 from corresponding European Patent Application No. 12843300.0, 8 pages.
Office Action issued in Chinese Application No. 201410373480.6 on Jan. 13, 2016, 18 pages (with English translation).

* cited by examiner

WASHING MACHINE TO PRODUCE THREE-DIMENSIONAL MOTION

CROSS-REFERENCE TO RELATED APPLICATION(S)

This is a continuation application of U.S. application Ser. No. 13/658,114, filed Oct. 23, 2012, which application claims priority under 35 U.S.C. §119 to Korean Applications Nos. 10-2011-0108952, 10-2011-0108953, 10-2011-0108955, 10-2011-0108957, 10-2011-0108971, 10-2011-0108973, 10-2011-0108974, 10-2011-0108976, 10-2011-0108977, 10-2011-0108978, 10-2011-0108979, 10-2011-0108982, 10-2011-0108986, filed in Korea on Oct. 24, 2011 and 10-2012-0012984, 10-2012-0012985, 10-2012-0012986 filed in Korea on Feb. 8, 2012 and 10-2012-0014463, 10-2012-0014464, filed in Korea on Feb. 13, 2012 and 10-2012-0112047 filed in Korea on Oct. 9, 2012, all applications of which are hereby incorporated by reference for all purposes as if fully set forth herein.

TECHNICAL FIELD

This specification relates to a washing machine with a structure of improving washing efficiency by allowing three-dimensional (3D) motion of the laundry such that the laundry can be moved in both circumferential and axial directions within drums, a drum assembling method for the washing machine and an operation controlling method thereof.

BACKGROUND OF THE DISCLOSURE

In general, a washing machine forcibly spins the laundry within a drum by using a mechanical force, such as a frictional force generated between the drum, which is rotated by a driving force transferred from a driving motor, and the laundry, after filling detergent, washing water and the laundry in the drum. Accordingly, the laundry can be washed by a physical reaction such as friction or impact. Also, the laundry which contacts the detergent can be washed by a chemical reaction with the detergent. The spinning of the laundry within the drum may facilitate the chemical reaction of the detergent.

A drum type washing machine, which has been widely used in recent time, has a rotation shaft of the drum formed in a horizontal direction. The rotation shaft of the drum is alternatively inclined with respect to the horizontal direction by a predetermined angle. The drum type washing machine having the horizontal rotation shaft allows the laundry to be spin along an inner circumferential surface of the drum in a circumferential direction.

The laundry is rotated along the inner circumferential surface of the drum by a centrifugal force responsive to the rotation of the drum and the friction against the inner circumferential surface of the drum. For assisting the spinning of the laundry, lifters are often provided on the inner circumferential surface of the drum. Here, the laundry also performs a circular motion along the inner circumferential surface according to rotation speed of the drum and a falling motion from an upper side of the drum by the force of gravity. The falling motion becomes a factor which greatly affects a washing effect.

The motion of the laundry within the drum greatly affects the washing effect. In detail, various types of motions of the laundry may change contact surfaces of the laundry, which rubs against the inner circumferential surface of the drum, resulting in an even washing of the laundry, and also allowing for an increase in a physical force applied to the laundry so as to enhance the washing effect.

Meanwhile, the washing machine is configured to run the rotation shaft by a driving motor, which has a rotor structure by use of permanent magnets. The permanent magnet motor typically includes a stator and a rotor. The stator is fixedly wound on the outside of the rotor. The rotor is in a circular shape, and has a plurality of permanent magnets regularly aligned in an annular form. Rotor teeth may be interposed between the adjacent permanent magnets so as to secure permanent magnets. Also, the rotor teeth form magnetic fluxes with the stator so as for the rotor to have a rotational force.

For the related art drum type washing machine, a single drum is rotated to make the laundry moved. Accordingly, the laundry is merely circulated from an initial position in the circumferential direction of the drum along the inner circumferential surface of the drum (i.e., merely generating a circumferential-direction motion), without complicated motions such as an axial-direction motion and a rotation motion. That is, the laundry generates the two-dimensional motion because there is no room for a separate external force applied to generate such complicated motions of the laundry. Consequently, the laundry is limitedly moved, which gives rise to a limited washing effect, and an increase in washing time and power consumption.

Furthermore, the related art washing machine causes a problem in that those clothes are stuck on the inner circumferential surface of the drum, with getting entangled together, after completion of washing and dehydration. Since the dehydration is performed using a centrifugal force by the rotation of the drum, the laundry in the entangled or twisted state is stuck on the inner circumferential surface of the drum. Hence, the laundry remains entangled until taken out of the washing machine for drying, thereby causing wrinkles on the laundry and difficulty in taking the laundry out of the washing machine.

SUMMARY OF THE DISCLOSURE

In general, one innovative aspect of the subject matter described here can be implemented as a washing machine that includes a main body defining an outer appearance. A tub is disposed within the main body. A main drum is rotatably mounted in the tub. A sub drum is mounted in the main drum to be relatively rotatable with respect to the main drum. A hollow outer shaft is connected to the sub drum upon insertion into the outer shaft. The washing machine includes a driving motor having a stator, an outer rotor connected to the inner shaft that is rotatable outside the stator, and an inner rotor connected to the outer shaft that is rotatable inside the stator. The driving motor independently drives the main drum and the sub drum.

This, and other aspects, can include one or more of the following features. The driving motor can drive the inner rotor and the outer rotor independently. The main drum and the sub drum can be driven independent of each other. An independent drive between the outer rotor and the inner rotor can induce rotations of laundry by a difference in rotation speed between the drums. The main drums and the sub drum can move the laundry in a direction by virtue of relative rotations therebetween, allowing the laundry to perform three-dimensional motions while rotating within the drums. An inner circumferential surface of the main drum can be divided into a first surface that does not face the outer circumferential surface of the sub drum and a second surface that faces the outer circumferential surface of the sub drum. The laundry can be moved in the axial direction by relative motions between the first surface of the inner circumferential surface of the main drum and the inner circumferential surface of the sub drum.

The washing machine can include multiple main drum lifters protruding from the inner circumferential surface of the main drum toward the inside in a radial direction, and multiple sub drum lifters protruding from an inner circumferential surface of a sub drum toward the inside in a radial direction. The multiple main drum lifters can be provided on the first surface. A length ratio of the main drum lifter and the sub drum lifter in an axial direction can be proportional to a length of the first surface of the inner circumferential surface of the main drum and a length of the inner circumferential surface of the sub drum. The main drum lifters and the sub drum lifters can have a predetermined angle from an axial direction. The main drum lifters or the sub drum lifters can be formed to have a straight inclination or a curve inclination along an axial direction.

The washing machine can include a main drum spider to connect the main drum to the outer shaft, and a sub drum spider to connect the sub drum to the inner shaft. Separate spiders can be employed for the respective drums. The main drum and the sub drum can be independently driven by the driving motor. The sub drum spider can include a shaft coupling portion coupled to the inner shaft, and multiple drum fixing portions radially extending from the shaft coupling portion. Ends of the drum fixing portions can be fixable onto the sub drum back. The main drum spider can include a shaft coupling portion coupled to the outer shaft, a spider supporting portion radially extending from the shaft coupling portion, and a drum fixing portion disposed at an end of the spider supporting portion. The drum fixing portion can be fixed onto the main drum. The sub drum spider is rotatable independent of the main drum spider.

The main drum can have openings at front and rear sides. The sub drum can have a sub drum back to form its rear surface. The sub drum has a front side open and the rear side closed by the sub drum back. The main drum and the sub drum respectively can include a main drum back and a sub drum back defining rear surfaces thereof. The main drum and the sub drum can have the front side open and the rear side closed by the main drum back and the sub drum back, respectively. An outer circumferential surface of the sub drum can face the inner circumferential surface of the main drum. Only a part of the inner circumferential surface of the main drum can face the outer circumferential surface of the sub drum. The sub drum can be shorter than the main drum in length in an axial direction, such that laundry can contact an interface between the sub drum and the main drum. A ratio (D2/D1) of a length D2 of the inner circumferential surface of the sub drum in an axial direction with respect to a length D1 of the inner circumferential surface of the main drum in an axial direction can be 0~0.5, and the length D2 of the inner circumferential surface of the sub drum in the axial direction with respect to the length D1 of the inner circumferential surface of the main drum in the axial direction can be ⅓. The washing machine can further include a drum guide provided along the inner circumferential surface of the main drum to shield an interval from the outer circumferential surface of the sub drum. The drum guide can include a body portion protruding into the main drum and coupled to the inner surface of the main drum. A guide portion can extend from the body portion toward the inner circumferential surface of the sub drum.

The sub drum can include a bead protruding into the sub drum along a circumferential surface while being spaced apart from an end portion of the sub drum by a predetermined interval. The guide portion of the drum guide can extend up to the bead of the sub drum. The end portion of the sub drum can be curled outwardly along the circumferential surface. A reinforcing bead to prevent torsion of the sub drum can be provided at the inner circumferential surface or the outer circumferential surface of the sub drum. The main drum can be divided into a first portion and a second portion having different inner diameters from each other. The inner diameter of the first portion can be the same as the inner diameter of the sub drum. The inner diameter of the second portion can be greater than an outer diameter of the sub drum, thereby shielding the interface between the main drum and the sub drum.

A rotation shaft of the washing machine may be inclined with respect to a horizontal direction by a predetermined angle. Multiple lifters can be provided on at least one inner circumferential surface of the main drum and the sub drum to guide motions of the laundry. The sub drum can have a cylindrical portion and a drum back which can be integrally formed with each other as one member. The receiving portion can include coupling openings for coupling of the sub drum spider, which can include coupling openings corresponding to the coupling openings of the receiving portion. The sub drum can include a cylindrical portion and a drum back as independent members. The drum back can be coupled to an outer circumference of the rear of the cylindrical portion to close the rear side. The receiving portion of the drum back is extendable up to the outer circumference of the drum back. Coupling openings can be formed at a rear end portion of the cylindrical portion. An outer circumference of the drum back can be bent in a lengthwise direction of the drum. Coupling openings can be formed at the bent portion. The sub drum can be assembled by coupling a cylindrical portion forming an outer circumferential portion of the sub drum to a drum back disposed on a rear surface of the sub drum and coupled with a sub drum spider, receiving the sub drum spider in a spider receiving portion recessed toward the front of the drum back, and coupling arm end portions of the sub drum spider using bolts through coupling openings formed at the rear end portion of the cylindrical portion of the sub drum and a bent outer circumference of the drum back.

Another innovative aspect of the subject matter described here can be implemented as a drum assembling method for a washing machine that includes a main drum and a sub drum disposed within a tub fixed to a main body and driven independent of each other, and a driving motor having a stator, an outer rotor and an inner rotor to independently drive the main drum and the sub drum. A shaft for transferring a driving force from the driving motor to the main and sub drums is coupled to a spider to fabricate a shaft-spider assembly. The shaft-spider assembly is coupled to the rear of the sub drum. The sub drum is coupled to the main drum. The shaft-spider assembly is to the rear of the main drum This, and other aspects can include one or more of the following features. In the fabricating of the shaft-spider assembly, after a main drum spider is coupled to an outer shaft to transfer a driving force from the inner rotor to the main drum, and a sub drum spider is coupled to an inner shaft to transfer a driving force from the outer rotor to the sub drum, the inner shaft can be coupled into the outer shaft. The inner shaft can be coupled into the outer shaft. a bearing can then be press-fitted, after which, a waterproof seal can be inserted. Upon mounting a drum guide for sealing, the drum guide can be mounted inside the main drum prior to inserting the sub drum into the main drum. In the coupling of the shaft-spider assembly to the rear of the main drum, the end of the main drum spider can be coupled to the main drum.

Therefore, an aspect of the detailed description is to provide a washing machine with a structure capable of being affected by an external force so as to allow for various motions of the laundry, which is limitedly moved within a drum of the washing machine.

Another aspect of the detailed description is to provide a washing machine with a structure allowing the laundry to move three-dimensionally by employing two drums and a driving motor for independently driving the two drums.

Another aspect of the detailed description is to provide a drum assembling method for the washing machine with the unique structure allowing the three-dimensional (3D) motion of the laundry, and a washing machine with a structure enabling an efficient 3D motion of the laundry and efficiently improving a washing performance.

Another aspect of the detailed description is to provide a washing machine, which has a structure of preventing damage of the laundry, which may be caused due to use of two drums, and allows the laundry to smoothly move by virtue of low resistance with respect to the motions of the laundry even though the two drums are used.

Another aspect of the detailed description is to provide a rotor structure for a permanent magnet motor in a washing machine, capable of reducing the occurrence of inferiority due to transformation of a protrusion fixing end by removing the protrusion fixing end formed at an inner side toward the center from the rotor teeth, and preventing the leakage of a magnetic flux to the upper side by virtue of the reduction of the protrusion fixing end.

Another aspect of the detailed description is to provide a method for fabricating a dual motor stator in a dual drum washing machine, configured such that an inner rotor of a high torque is provided in a main drum and an outer rotor of a low torque is provided in a sub drum, by designing torque of the inner rotor side to be greater than torque of the outer rotor side in a manner that the number of windings of coil increases on inner teeth by making a length of the inner teeth longer than a length of outer teeth, and a washing machine using the same.

Another aspect of the detailed description is to provide a washing machine capable of maximizing torque efficiency within a preset size by optimizing a ratio of an outer diameter of a rotor with respect to an outer diameter of a stator of a permanent magnet motor, and capable of maximizing efficiency of the permanent magnet motor by enhancing characteristics of vibration and noise by minimizing cogging torque and torque ripple under control of a height of a teeth extension portion of rotor teeth, a distance between neighboring teeth extension portions, an arc angle of the rotor teeth, and an angle of a linear part of the teeth extension portion.

Another aspect of the detailed description is to provide a method for fabricating a dual motor stator capable of minimizing redundant parts after punching and accordingly reducing waste of components, by punching separately fabricated inner stator and outer stator without being integral with each other, and a washing machine employing the same.

Another aspect of the detailed description is to provide a washing machine having an efficient structure to drive two drums by a single driving motor, and not having size increase, and a driving motor for the washing machine.

Another aspect of the detailed description is to provide a method for fabricating a washing machine including a driving motor having an optimized number of windings on a stator for driving two drums by a single driving motor.

Another aspect of the detailed description is to provide a washing machine having an efficient structure to drive two drums by a single driving motor, of reducing the number of components so as to reduce the size of the driving motor, of shortening an operation time, and of reducing the fabrication costs, a driving motor of the washing machine, and a method for fabricating a stator of the driving motor of the washing machine.

Another aspect of the detailed description is to provide a washing machine capable of effectively performing radiation by conduction and convection by way of forming bent portions including protruding portion and concaved portion at a body of a bearing housing, in order to radiate heat generated from coil on the inner teeth (winding portions) of the stator, in the aspect of an assembled structure of the bearing housing and the stator of the driving motor in the washing machine.

Another aspect of the detailed description is to provide a structure of a current connector and a hall sensor for a dual motor, capable of implementing a simplified structure, preventing an erroneous assembling, securing a space and enhancing convenience, by combining separately installed current connector and hall sensor into one integrated member, different from the structure of the conventional dual motor in which the current connector and the hall sensor are separately installed at the inner stator and the outer stator, and a washing machine employing the same.

Another aspect of the detailed description is to provide a shaft structure for a dual drum washing machine capable of providing a simplified structure to prevent separation due to abnormal noise and vibration, which may be generated in a connection structure between an inner rotor and an outer shaft of a dual motor applied to the dual drum washing machine, and accordingly reducing a material cost, and a washing machine employing the same.

Another aspect of the detailed description is to provide a shaft structure of a dual drum washing machine capable of reducing material cost, and capable of having a simplified structure for prevention of entangled state releasing, the entangled state releasing occurring due to abnormal noise and vibrations generated in a connection structure of an inner rotor and an outer shaft of a dual motor applied to a dual drum washing machine, and a washing machine having the same.

Another aspect of the detailed description is to facilitate an assembly process by fixing coupling positions of a bearing housing and a stator, by forming a fitting protrusion at a stator coupling opening formed at the bearing housing and a fitting recess at a housing coupling opening formed at the stator, in order to improve the process of assembling the stator having outer teeth and inner teeth with the bearing housing, in a dual motor including an inner rotor and an outer rotor and employed in a dual drum washing machine.

Another aspect of the detailed description is to perform a function of an inner rotor assembly guide by employing an assembly auxiliary jig for improvement of assembly without coupling an inner rotor to a bearing housing side.

Another aspect of the detailed description is to provide an operation and control method for a washing machine capable of reducing wrinkles of laundry after completion of dehydration by allowing 3D motions of the laundry by virtue of a driving motor capable of driving two drums independent of each other.

Another aspect of the detailed description is to provide a control method for a washing machine capable of making laundry simply drawn out of a washing machine in an automatic manner after the operation of the washing machine is completely ended.

Another aspect of the detailed description is to provide a washing machine allowing for 3D motions by initially operating a driving motor with preventing a starting failure due to over-current, which may be generated upon starting the driving motor, and minimizing an amount of heat, and simultaneously appropriately controlling a rotation direction or revolutions per minute (RPM) of the motor according to a laundry amount, temperature and the like.

Another aspect of the detailed description is to provide a washing machine capable of precisely detecting a laundry amount, the washing machine having two drums and a single driving motor for independently driving the two drums, and a laundry amount detecting method thereof.

To achieve these and other advantages and in accordance with the purpose of this specification, as embodied and broadly described herein, a washing machine including a main body defining an outer appearance, a tub disposed within the main body, a main drum rotatably mounted in the tub, a sub drum mounted in the main drum to be relatively rotatable with respect to the main drum, a hollow outer shaft connected to the main drum, an inner shaft connected to the sub drum upon insertion into the outer shaft, and a driving motor having a stator, an outer rotor connected to the inner shaft and rotatable outside the stator, and an inner rotor connected to the outer shaft and rotatable inside the stator, wherein the driving motor independently drives the main drum and the sub drum.

With the configuration, the main drum and the sub drum can be driven, independent of each other, by the driving motor, so as to induce rotations of laundry by a difference in rotation speed between the drums, thereby allowing the laundry to perform three-dimensional motions with rotating within the drums.

The washing machine may further include a main drum spider to connect the main drum to the outer shaft, and a sub drum spider to connect the sub drum to the inner shaft.

With the configuration, the separate spiders may be employed for the respective drums, and accordingly the drums can be independently driven by the driving motor.

The main drum may have openings at front and rear sides. The sub drum may have a sub drum back to form its rear surface. The sub drum may have a front side open and the rear side closed by the sub drum back.

The sub drum spider may include a shaft coupling portion coupled to the inner shaft, and a plurality of drum fixing portions radially extending from the shaft coupling portion. Ends of the drum fixing portions may be fixed onto the sub drum back.

The sub drum back may further include a receiving portion recessed inwardly in correspondence with the sub drum spider. The sub drum spider may be received in the receiving portion to be closely adhered onto the sub drum back.

The main drum spider may be fixed onto the main drum.

The main drum spider may include a shaft coupling portion coupled to the outer shaft, a spider supporting portion radially extending from the shaft coupling portion, and a drum fixing portion disposed at an end of the spider supporting portion. The drum fixing portion may be fixed onto the main drum.

The spider supporting portion may be provided with a plurality of cantilevers radially extending from the shaft coupling portion. Alternatively, the spider supporting portion may be in a disk shape extending from the shaft coupling portion.

The drum fixing portion may have a ring shape to connect ends of the spider supporting portion.

The main drum spider may be coupled to an outer circumferential surface of the main drum. Alternatively, the main drum may include a bent portion bent from a rear end portion toward a central portion, and the main drum spider may be coupled to the bent portion.

The sub drum spider may be rotatable independent of the main drum spider.

The sub drum spider may be provided between the sub drum back and the main drum spider, to be rotated integral with the sub drum back and independent of the main drum spider.

As an exemplary variation of the one exemplary embodiment, the main drum and the sub drum may respectively include a main drum back and a sub drum back defining rear surfaces thereof. The main drum and the sub drum may have the front side open and the rear side closed by the main drum back and the sub drum back, respectively.

With this structure, the main drum spider may be fixed onto the main drum back.

The sub drum spider may be provided between the sub drum back and the main drum back, to be rotatable integrally with the sub drum back and independently of the main drum back.

Meanwhile, the outer circumferential surface of the sub drum may face a part of an inner circumferential surface of the main drum.

With the configuration, the sub drum may be shorter than the main drum in length in an axial direction, such that laundry can contact an interface between the sub drum and the main drum. Consequently, a motion that the laundry is rotated by the difference in rotation speed between the drums can be generated, thereby enabling three-dimensional motions of the laundry.

A drum guide to seal an interval from an outer circumferential surface may be disposed at the inner circumferential surface of the main drum, thereby preventing laundry from being jammed between the drums.

Also, a reinforcing bead to prevent torsion of the sub drum may be provided at the inner circumferential surface or the outer circumferential surface of the sub drum.

A rotation shaft of the washing machine may be inclined with respect to a horizontal direction by a predetermined angle.

In accordance with one exemplary embodiment, a drum assembling method for a washing machine may be applied to a washing machine including a main drum and a sub drum disposed within a tub fixed to a main body and driven independent of each other, and a driving motor having a stator, an outer rotor and an inner rotor to independently drive the main drum and the sub drum, and the method may include coupling a shaft for transferring a driving force from the driving motor to the main and sub drums to a spider to fabricate a shaft-spider assembly, coupling the shaft-spider assembly to the rear of the sub drum, coupling the sub drum to the main drum, and coupling the shaft-spider assembly to the rear of the main drum.

In the fabricating of the shaft-spider assembly, after a main drum spider is coupled to an outer shaft to transfer a driving force from the inner rotor to the main drum, and a sub drum spider is coupled to an inner shaft to transfer a driving force from the outer rotor to the sub drum, the inner shaft may be coupled into the outer shaft.

Here, the inner shaft may be coupled into the outer shaft, and then a bearing may be press-fitted. Also, after the bearing is press-fitted, a waterproof seal may be inserted.

In the coupling of the shaft-spider assembly to the rear of the sub drum, the sub drum spider may be attached onto the rear surface of the sub drum.

In the coupling of the sub drum to the main drum, the sub drum may be inserted into the main drum.

Here, upon mounting a drum guide for sealing, the drum guide may be mounted inside the main drum prior to inserting the sub drum into the main drum.

In the coupling of the shaft-spider assembly to the rear of the main drum, the end of the main drum spider may be coupled to the main drum.

With the configuration, a washing machine with a structure using two drums and a hollow shaft and a dual rotor (inner rotor and outer rotor) for driving the drums independent of each other may be produced.

In accordance with another exemplary embodiment of the present disclosure, an inner circumferential surface of the main drum and an inner circumferential surface of the sub drum may have different lengths from each other in an axial direction.

That is, an outer circumferential surface of the sub drum may face the inner circumferential surface of the main drum, more particularly, only a part of the inner circumferential surface of the main drum may face the outer circumferential surface of the sub drum.

Here, the sub drum may be mounted in the main drum to extend from one end portion of the main drum in an axial direction.

A ratio (D2/D1) of a length D2 of the inner circumferential surface of the sub drum in an axial direction with respect to a length D1 of the inner circumferential surface of the main drum in an axial direction may be 0~0.5.

More preferably, the length D2 of the inner circumferential surface of the sub drum in the axial direction with respect to the length D1 of the inner circumferential surface of the main drum in the axial direction may be ⅓.

To describe this in a different manner, the inner circumferential surface of the main drum may be divided into a first surface that does not face the outer circumferential surface of the sub drum and a second surface that faces the outer circumferential surface of the sub drum, and the ratio D2/d1 of the length D2 of the inner circumferential surface of the sub drum in the axial direction with respect to a length d1 of the first surface in an axial direction may be 0.5. The main drum and the sub drum may move the laundry in a direction by virtue of relative rotations therebetween.

More particularly, the inner circumferential surface of the main drum may be divided into a first surface that does not face the outer circumferential surface of the sub drum and a second surface that faces the outer circumferential surface of the sub drum, and the laundry may be moved in the axial direction by relative motions between the first surface of the inner circumferential surface of the main drum and the inner circumferential surface of the sub drum.

From the perspective of laundry, the laundry may be moved in a circumferential direction in response to the rotation of the main drum or the sub drum, and moved in the axial direction by the relative motions between the main drum and the sub drum. Here, the motions of the laundry in the axial direction may be allowed by the rotation of the laundry in response to the relative motions between the main drum and the sub drum.

In the meantime, the driving motor may independently drive the outer rotor and the inner rotor, so as to independently drive the main drum and the sub drum.

The independent driving of the outer rotor and the inner rotor may allow for the relative rotations between the main drum and the sub drum.

With the configuration, the sub drum may be shorter than the main drum in length in an axial direction such that laundry can contact an interface between the sub drum and the main drum. Accordingly, the laundry can be rotated by the difference in rotation speed between the drums, thereby performing three-dimensional motions.

Also, the driving motor may independently drive the main drum and the sub drum to cause the rotations of the laundry by the difference in relative rotation speed between the drums, accordingly, the laundry may perform the three-dimensional motions with rotating within the drums. Also, a structure capable of generating the optimal three-dimensional motion of the laundry may be provided in consideration of torque distribution due to driving of the two drums, a mechanical force applied to the laundry and overall movements of the laundry.

Meanwhile, a plurality of lifters may be provided on at least one inner circumferential surface of the main drum and the sub drum, thus to guide motions of the laundry.

In accordance with another exemplary embodiment, the sub drum may have a cylindrical portion and a drum back which are integrally formed with each other as one member.

The receiving portion may have coupling openings for coupling of the sub drum spider. The sub drum spider may have coupling openings corresponding to the coupling openings of the receiving portion. Also, the receiving portion may be formed within the sub drum back, and a cantilever length of the sub drum spider may be shorter than a radius of the sub drum back so as to be inserted into the receiving portion.

In accordance with another exemplary embodiment, the sub drum may have a cylindrical portion and a drum back as independent members, and the drum back may be coupled to an outer circumference of the rear of the cylindrical portion to close the rear side.

Also, the receiving portion of the drum back may extend up to the outer circumference of the drum back, and coupling openings may be formed at a rear end portion of the cylindrical portion. An outer circumference of the drum back may be bent in a lengthwise direction of the drum, and coupling openings may be formed at the bent portion.

The sub drum spider may have arms whose length is the same as the radius of the sub drum back, and an end portion of the arm of the sub drum spider may be coupled to the rear circumference of the cylindrical portion.

In accordance with another exemplary embodiment, a method for assembling a sub drum of a washing machine may include coupling a cylindrical portion forming an outer circumferential portion of the sub drum to a drum back, which is disposed on a rear surface of the sub drum and coupled with a sub drum spider, receiving the sub drum spider in a spider receiving portion recessed toward the front of the drum back, and coupling arm end portions of the sub drum spider by use of bolts through coupling openings formed at the rear end portion of the cylindrical portion of the sub drum and a bent outer circumference of the drum back.

In accordance with another exemplary embodiment of the present disclosure, the washing machine may further include a drum guide provided along the inner circumferential surface of the main drum to shield an interval from the outer circumferential surface of the sub drum.

The drum guide may include a body portion protruding into the main drum and coupled to the inner surface of the main drum, and a guide portion extending from the body portion toward the inner circumferential surface of the sub drum.

The sub drum may include a bead protruding into the sub drum along the circumferential surface with being spaced apart from an end portion of the sub drum by a predetermined interval. The guide portion of the drum guide may extend up to the bead of the sub drum.

With the configuration, the driving motor may independently drive the main drum and the sub drum to cause the rotations of the laundry by the difference in relative rotation speed between the drums, accordingly, the laundry may perform the three-dimensional motions with rotating within the drums. Also, the drum guide may prevent the laundry from being jammed into the interface where the independently driven main drum and sub drum perform the relative rotations.

As another exemplary embodiment of the present disclosure, the sub drum may include a bead protruding to the outside thereof along the circumferential surface with being spaced apart from an end portion thereof by a predetermined interval. The guide portion of the drum guide may extend up to the end portion of the sub drum.

Accordingly, the drum guide may prevent the laundry from being jammed into the interface where the independently driven main drum and sub drum perform the relative rotations.

The end portion of the sub drum may be curled outwardly along the circumferential surface. The structure may be in order to prevent the laundry from being jammed due to the end portion of the sub drum by way of processing the end portion of the sub drum to have a curved surface.

In accordance with another exemplary embodiment of the present disclosure, the main drum may be divided into a first portion and a second portion having different inner diameters from each other. The inner diameter of the first portion may be the same as the inner diameter of the sub drum, and the inner diameter of the second portion may be greater than an outer diameter of the sub drum, thereby shielding the interface between the main drum and the sub drum.

With the configuration, a part of the main drum may extend such that the inner circumferential surfaces of the main drum and the sub drum can have the same radius, thereby preventing the laundry from being jammed into the interface between the main drum and the sub drum. The structure of preventing the laundry from being jammed may be produced during formation of the drums without use of a separate guide or the like.

Here, the end portion of the sub drum may also be curled outwardly along the circumferential surface, and located inside the second portion.

In accordance with another exemplary embodiment of the present disclosure, the main drum may further include a drum guide unit protruding inwardly along the inner circumferential surface of the main drum. An inner circumferential surface of the drum guide unit may be flush with the inner circumferential surface of the sub drum, thereby shielding the interface between the main drum and the sub drum.

With the configuration, the part of the main drum may protrude such that the inner circumferential surfaces of the main drum and the sub drum can have the same radius at the interface therebetween. Accordingly, the laundry may be prevented from being jammed into the interface. The structure of preventing the laundry from being jammed may be produced during formation of the drums without use of a separate guide or the like.

Here, the end portion of the sub drum may also be curled outwardly along the circumferential surface, and located outside more than the inner circumferential surface of the drum guide unit.

In accordance with another exemplary embodiment of the detailed description, a washing machine may include a plurality of main drum lifters protruding from an inner circumferential surface of a main drum toward the inside in a radial direction, and a plurality of sub drum lifters protruding from an inner circumferential surface of a sub drum toward the inside in a radial direction.

In more detail, the inner circumferential surface of the main drum may be divided into a first face not facing an outer circumferential surface of the sub drum, and a second surface facing the outer circumferential surface of the sub drum. The main drum lifters may be provided on the first surface.

With the configuration, the driving motor may independently drive the main drum and the sub drum to cause the rotations of laundry by the difference in relative rotation speed between the drums, accordingly, the laundry may perform the three-dimensional motions with rotating within the drums. Also, the plurality of lifters may be provided on the inner circumferential surfaces of the drums such that the laundry can perform the three-dimensional motions more smoothly within the drums.

A length ratio of the main drum lifter and the sub drum lifter in an axial direction may be proportional to a length of the first surface of the inner circumferential surface of the main drum and a length of the inner circumferential surface of the sub drum. This may provide the lifters in correspondence with the main drum and the sum drum having the relatively different lengths in the axial direction.

The main drum lifters and the sub drum lifters may be provided within the drums in parallel in an axial direction. However, the present disclosure may not be limited to the structure. Alternatively, the main drum lifters and the sub drum lifters may have a predetermined angle from an axial direction. Here, a rotation direction of the main drum may be determined according to an angle direction of the main drum lifter with respect to the axial direction, and a rotation direction of the sub drum may be determined according to an angle direction of the sub drum lifter with respect to the axial direction. That is, the rotation direction of the drum may be determined based on an inclined direction of the lifters so that laundry inside the drum may smoothly perform 3D motions by the lifters.

Meanwhile, sectional heights in a radial direction of the main drum lifters may become lower toward a rear side along an axial direction, and sectional heights in a radial direction of the sub drum lifters may become lower toward a front side along an axial direction. Accordingly, the lifters may have inclinations with respect to the axial direction to allow the laundry in the drums to efficiently move in an axial direction, thereby allowing three-dimensional motions of the laundry.

Here, the main drum lifters or the sub drum lifters may be formed to have a straight inclination or a curve inclination along an axial direction.

The main drum lifters may extend from a front end portion to a rear side of the main drum. Also, the sub drum lifter may extend from a rear end portion to a front side of the sub drum. Also, the main drum lifters and the sub drum lifter may have inclinations becoming lower in a direction that they face each other. This may be in order to prevent laundry to be concentratively disposed at an inner side or an outer side of the drum due to its motions in an axial direction, and in order to allow the laundry to be positioned at the center of the drum for three-dimensional motions of the laundry.

The main drum and the sub drum may be driven independent of each other by the driving motor. Also, the main drum and the sub drum may rotate the laundry by relative rotations therebetween to move in an axial direction.

The laundry may move in a circumferential direction in response to rotation of the main drum or the sub drum, and move in an axial direction with being rotated by the relative motions between the main drum and the sub drum.

Here, the main drum lifters and the sub drum lifter may guide the laundry to move in the circumferential direction. Also, facing inclinations of the main drum lifters and the sub drum lifters may guide motions of the laundry in an axial direction.

According to another embodiment of the present disclosure, there is provided a permanent magnet motor comprising: a stator including stator teeth and stator slots, and fixedly-installed as a coil is wound on the stator teeth; and a rotor including rotor teeth, a permanent magnet and a bushing, the rotor spaced from an inner circumference of the stator and rotating centering around a rotor shaft by a magnetic force. A ratio of an outer diameter of the rotor with respect to an outer diameter of the stator is in the range of 0.7~0.8.

The rotor teeth include teeth extension portions protruding from the right and left sides of the rotor in an outer diameter direction. The end of the teeth extension portion has a height less than 0.3 mm, and a distance (DW) between teeth extension portions of neighboring rotor teeth is in the range of 5.5 mm~6.5 mm.

Preferably, an outer diameter end portion of the rotor teeth is formed such that the rotor teeth have an arc angle of 60°.

The teeth extension portion of the rotor teeth is provided with an extension linear portion on an outer circumference thereof. An angle between the extension linear portion, and a straight line from the end of the teeth extension portion to the core center is in the range of 90°~100°.

According to still another embodiment of the present disclosure, there is provided a washing machine having a rotor structure of a permanent magnet motor, the washing machine comprising: a main body which forms an outer appearance; a tub disposed within the main body; a main drum rotatably mounted in the tub; a sub drum mounted in the main drum to be relatively rotatable with respect to the main drum; a hollow outer shaft connected to the main drum; an inner shaft connected to the sub drum upon insertion into the outer shaft; and a driving motor having an outer rotor and an inner rotor, wherein the driving motor includes: a stator fixedly-installed as a coil is wound on stator teeth; and a rotor including rotor teeth and a permanent magnet, spaced from an inner circumference of the stator, and rotating centering around a rotor shaft by a magnetic force, and wherein a ratio of an outer diameter of the rotor with respect to an outer diameter of the stator is in the range of 0.7~0.8.

The rotor teeth include teeth extension portions protruding from the right and left sides of the rotor in an outer diameter direction. The end of the teeth extension portion has a height less than 0.3 mm, and a distance (DW) between teeth extension portions of neighboring rotor teeth is in the range of 5.5 mm~6.5 mm.

Preferably, the teeth extension portion of the rotor teeth is provided with an extension linear portion on an outer circumference thereof. An angle between the extension linear portion, and a straight line from the end of the teeth extension portion to the core center is in the range of 90°~100°.

In accordance with another exemplary embodiment of the present disclosure, a stator of a driving motor may include stator teeth and stator slots, and be fixedly-installed as a coil is wound on the stator teeth. The outer rotor and the inner rotor may include rotor teeth, a permanent magnet and a bushing, be spaced from an inner circumference of the stator, and rotate centering around a rotor shaft by a magnetic force. The rotor teeth may include a teeth extension portion extending from a side end of an outer circumference of the rotor teeth in a circumferential direction, a cut recess cut in a concaved manner from the outer circumference of the rotor teeth toward the center of the rotor shaft, and an insertion recess cut in a concaved manner in a radial direction from an inner circumference of the rotor teeth to insert an injection-molding material of the bushing thereinto.

The insertion recess may include a first insertion recess through which an injection-molding material of the bushing is inserted into the rotor teeth, and a second insertion recess extending from the first insertion recess to a radial direction of the rotor shaft to integrally-fix the bushing and the rotor teeth after hardening the injection-molding material of the bushing inserted thereinto.

The second insertion recess may be formed as a through hole having at least one of circular, oval, polygonal and triangular shapes each having a diameter larger than a width of the first insertion recess.

The rotor teeth may further include a cut opening extending from the cut hole toward the center of the rotor shaft to form a flux barrier as an injection-molding material of the bushing is filled therein. The cut opening which forms the flux barrier may preferably be formed in a circular or oval shape having a diameter larger than a width of the cut recess, so as to prevent leakage of a magnetic flux of the permanent magnet positioned between the rotor teeth.

The cut recess and the flux barrier cut opening of the rotor teeth may be filled with an injection-molding material of the bushing. This may prevent separation of the rotor teeth. Also, since a space between the teeth extension portion of the rotor teeth and the permanent magnet may be filled with the injection-molding material of the bushing, the rotor teeth and the permanent magnet may be integrally fixed to each other. This may prevent separation of the rotor teeth from the rotor core due to a centrifugal force.

An outer circumferential end of the rotor teeth may have a curvature larger than that of the annular rotor. This may change a spacing distance between an outer circumferential surface of the rotor teeth and an inner circumferential surface of the stator.

In accordance with another exemplary embodiment of the present disclosure, the dual motor stator may include an inner stator including a plurality of inner teeth protruding toward the center in a ring shape, an inner yoke 13 which forms a ring shape of an inner stator, and inner slots serving as spaces between the inner teeth and the inner yoke, and an outer stator including a plurality of outer teeth protruding in a radial direction in a ring shape, an outer yoke contacting an outer circumferential surface of the inner yoke and forming a ring shape of the outer stator, and outer slots serving as spaces between the outer teeth and the outer 230. The inner stator and the outer stator may face each other at an outer circumferential surface of the inner yoke and an inner circumferential surface of the inner yoke and be coupled to each other with being spaced from each other.

Also, the stator may be configured such that a length of the inner teeth may be longer than a length of the outer teeth, by which the number of windings of the coil wound on the inner teeth can be larger than that of the coil wound on the outer teeth. Consequently, torque of the inner rotor may be larger than torque of the outer rotor, thereby making a rotational force of the main drum greater than that of the sub drum.

The stator may include an insulator installed at part between an outer circumferential surface of the inner yoke and an inner circumferential surface of the outer yoke to shield a magnetic force. The insulator may preferably be formed of a PBT-based plastic material.

In the method for fabricating the stator, a pair of inner stators may be fabricated in a punching manner in a state that the inner teeth are disposed to be engaged with each other in a lengthwise direction, and a pair of outer stators may be fabricated in a punching manner in a state that the outer teeth are disposed to be engaged with each other in a lengthwise direction. This may minimize the amount of redundant parts after punching in the inner stators and the outer stators, thereby minimizing the loss of components.

The inner stator extending in the lengthwise direction may be implemented in a ring shape as one end and another end thereof are connected to each other. And, the outer stator extending in the lengthwise direction may be wound on an outer circumference of the inner stator in a ring shape.

Another exemplary embodiment for a washing machine according to this disclosure may include a tub disposed inside a main body defining appearance, a main drum rotatably mounted in the tub, a sub drum mounted in the main drum to be relatively rotatable with the main drum, a hollow outer shaft connected to the main drum, an inner shaft connected to the sub drum within the outer shaft, and a driving motor having a stator, an outer rotor connected to the inner shaft and rotatable outside the stator, and an inner rotor connected to the outer shaft and rotatable inside the stator, wherein the stator may include an inner stator facing the inner rotor and an outer stator facing the outer rotor, wherein each of the inner stator and the outer stator of the stator may include a plurality of articulated bobbins connected into a ring shape, a plurality of teeth inserted into the articulated bobbins, respectively, and a tooth ring for connecting end portions of the plurality of teeth into a ring shape.

With the configuration, as the main drum and the sub drum are independently worked by the driving motor, the laundry may be rotated due to a difference of a relative rotation speed between the drums, whereby the laundry can perform a three-dimensional motion with rotating within the drums.

Also, the two stators may be employed for driving the two independent rotors, and each stator may include articulated bobbins for improvement of a winding space factor, which may result in enhancement of performance of the driving motor and optimization of the driving motor.

In addition, the use of the tooth ring for reducing cogging torque and preventing lowering of an output may arouse an optimal structure for driving the two independent rotors.

Here, in accordance with one exemplary embodiment, when the teeth are segment type teeth, each of the inner stator and the outer stator of the stator may further include an annular yoke for connecting end portions of the plurality of articulated bobbins, such that the plurality of articulated bobbins can be mounted between the yoke and the tooth ring.

In accordance with another exemplary embodiment, when the teeth are integrally formed with an articulated yoke for connecting end portions of the teeth, the articulated yoke may be bent into a ring shape, such that the plurality of articulated bobbins can be mounted between the annularly-bent articulated yoke and the tooth ring.

In those exemplary embodiments, each of the plurality of articulated bobbins may be wound with a coil.

Each articulated bobbin may include a body part having a receiving portion for insertion of the tooth therein, and articulated parts formed at both side surfaces of the body part to be bent. Accordingly, the articulated parts of the plurality of articulated bobbins can be interconnected to one another.

In accordance with one exemplary embodiment of this disclosure, a method for fabricating a stator of a driving motor for a washing machine may include a bobbin connecting step of connecting a plurality of articulated bobbins in the form of a belt, a tooth inserting step of inserting teeth into the plurality of connected articulated bobbins, respectively, an automatic winding step of automatically winding a coil on each tooth-inserted articulated bobbin, a yoke connecting step of connecting the coil-wound articulated bobbins into a ring shape, and a tooth ring connecting step of connecting a tooth ring of a ring shape for connecting end portions of the teeth.

The automatic winding step may be performed to automatically wind a coil on each of the articulated bobbins in an aligned state.

The coil may be automatically wound on the articulated bobbin in order to improve a winding space factor, which may result in enhancement of the performance of the driving motor and optimization of the driving motor.

Here, when the teeth are segment type teeth, the yoke connecting step may be performed to connect the articulated bobbins to the yoke of the ring shape.

Also, for integral teeth integrally formed with the articulated yoke for connecting the end portions of the teeth, the yoke connecting step may be performed to bend the articulated yoke into the ring shape.

One exemplary embodiment of a driving motor for a washing machine according to this disclosure, when those configurations are limited to the driving motor for the washing machine, may include an inner stator having a ring shape, an outer stator having a ring shape and located outside the inner stator, an inner rotor disposed inside the inner stator, and an outer rotor disposed outside the outer stator, wherein each of the inner stator and the outer stator may include a plurality of articulated bobbins connected into a ring shape, a plurality of teeth inserted into the articulated bobbins, respectively, and a tooth ring for connecting end portions of the plurality of teeth into a ring shape.

Another exemplary embodiment for a washing machine according to this disclosure may include a tub disposed inside a main body defining appearance, a main drum rotatably mounted in the tub, a sub drum mounted in the main drum to be relatively rotatable with the main drum, a hollow outer shaft connected to the main drum, an inner shaft connected to the sub drum within the outer shaft, and a driving motor having a stator, an outer rotor connected to the inner shaft and rotatable outside the stator, and an inner rotor connected to the outer shaft and rotatable inside the stator, wherein the stator may an inner stator facing the inner rotor and an outer stator facing the outer rotor, and the inner stator and the outer stator may be integrally formed by an insulator.

The inner stator may be formed by receiving an inner tooth core, which includes a plurality of inner teeth and an inner yoke, in the insulator and winding the coil on the insulator, and the outer stator may be formed by receiving an outer tooth core, which includes a plurality of outer teeth and an outer yoke, in the insulator and winding the coil on the insulator.

Here, the insulator may include a flux barrier for shielding a magnetic force by spacing the inner tooth core and the outer tooth core apart from each other.

Also, the insulator may include an inner tooth core receiving part having inner tooth receiving portions for receiving the plurality of inner teeth, and an inner yoke receiving portion for receiving the inner yoke, and an outer tooth core receiving part having outer tooth receiving portions for receiving the plurality of outer teeth, and an outer yoke receiving portion for receiving the outer yoke. The flux barrier may be interposed between the inner yoke receiving portion and the outer yoke receiving portion.

Inner slots may be formed between the inner tooth receiving portions for receiving the plurality of inner teeth, respectively, and outer slots may be formed between the outer tooth receiving portions for receiving the plurality of outer teeth, respectively. A coil may be wound on outside of each of the inner tooth receiving portions and the outer tooth receiving portions.

The insulator may be formed by coupling an upper insulator and a lower insulator which face each other. The flux barrier may protrude from at least one of the upper insulator and the lower insulator, thus to shield a magnetic force by spacing the inner tooth core and the outer tooth core apart from each other upon coupling of the upper insulator and the lower insulator.

The insulator may be formed of PBT-based plastic.

With the configuration, as the main drum and the sub drum are independently worked by the driving motor, the laundry may be rotated due to a difference of a relative rotation speed between the drums, whereby the laundry can perform a three-dimensional motion with rotating within the drums.

Also, the insulator may serve even as a bobbin and accordingly the number of components and an entire size of the driving motor can be reduced, which may result in preventing an increase in an entire size of the washing machine even if two stators for driving two independent rotors are employed.

One exemplary embodiment of a driving motor for a washing machine according to this disclosure, when those configurations are limited to the driving motor for the washing machine, may include an inner stator having a ring shape, an outer stator having a ring shape and located outside the inner stator, an inner rotor disposed inside the inner stator, an outer rotor disposed outside the outer stator, and an insulator for integrally forming the inner stator and the outer stator, wherein the inner stator may be formed by receiving an inner tooth core, which includes a plurality of inner teeth and an inner yoke, in the insulator and winding the coil on the insulator, and the outer stator may be formed by receiving an outer tooth core, which includes a plurality of outer teeth and an outer yoke, in the insulator and winding the coil on the insulator. Here, the insulator may include a flux barrier for shielding a magnetic force by spacing the inner tooth core and the outer tooth core apart from each other.

The insulator may include an inner tooth core receiving part having inner tooth receiving portions for receiving the plurality of inner teeth, and an inner yoke receiving portion for receiving the inner yoke, and an outer tooth core receiving part having outer tooth receiving portions for receiving the plurality of outer teeth, and an outer yoke receiving portion for receiving the outer yoke. The flux barrier may be interposed between the inner yoke receiving portion and the outer yoke receiving portion.

The insulator may be formed by coupling an upper insulator and a lower insulator which face each other. The flux barrier may protrude from at least one of the upper insulator and the lower insulator, thus to shield a magnetic force by spacing the inner tooth core and the outer tooth core apart from each other upon coupling of the upper insulator and the lower insulator.

One exemplary embodiment of a method for fabricating a stator of a driving motor for a washing machine according to this disclosure may include a stator core forming step of stacking an inner tooth core having inner teeth and an inner yoke, and an outer tooth core having outer teeth and an outer yoke, a stator core inserting step of inserting the inner tooth core and the outer tooth core in one of an upper insulator and a lower insulator, which are coupled to form an inner tooth receiving part and an outer tooth receiving part and face each other, a stator assembling step of coupling the upper insulator to the lower insulator, and a coil winding step of winding a coil on an outside of inner tooth receiving portions for receiving the inner teeth of the inner stator receiving part, and on an outside of outer tooth receiving portions for receiving the outer teeth of the outer stator receiving part.

In the stator core inserting step, the inner tooth core and the outer tooth core may be inserted with being spaced apart from each other by interposing therebetween a flux barrier, which is formed at at least one of the upper insulator and the lower insulator.

With the configuration, the assembling of the stator can be performed in an easy and simple manner, and the insulator can serve as the bobbin as well, which may allow for reduction of the entire number of components and an entire size of the driving motor. Therefore, even if two stators for driving two independent rotors are employed, an increase in an entire size of the washing machine can be avoided.

In accordance with another exemplary embodiment of the present disclosure, the driving motor may have a bearing housing structure for enhancement of radiation of a dual motor stator. The structure may include a bearing housing assembled to a stator having outer teeth, inner teeth, a yoke and a housing coupling opening, and provided with a body, a bearing shaft hole, a housing fixing opening and a stator coupling opening. The body of the bearing housing may include a protruding portion at a position corresponding to the winding portion of the inner teeth, and a concaved portion at a position corresponding to a slot between the inner teeth.

Preferably, the concaved portion may be formed as a space for convection of heat generated from the winding portion of the inner teeth, and the protruding portion of the body of the bearing housing may be formed as a conducting portion for radiating heat generated from the winding portion of the inner teeth to the outside by conduction.

The protruding portion of the body of the bearing housing may be spaced from the coil wound on the winding portion of the inner teeth by a predetermined insulating distance.

In accordance with another exemplary embodiment of the present disclosure, the driving motor may have a structure of a current connector and a hall sensor for a dual motor. The structure may include a stator having inner teeth and outer teeth, a current connector apply power to an outer winding portion of the outer teeth and an inner winding portion of the inner teeth in an integrated manner; and a hall sensor connector configured to apply power to an outer hall sensor and an inner hall sensor in an integrated manner.

The current connector may supply a current from a power unit to the outer winding portion and the inner winding portion in parallel, and the applied to the outer winding portions and the inner winding portion may be integrally connected to one ground.

The hall sensor connector may supply a current from the power unit to the outer hall sensor and the inner hall sensor in parallel through the integrated hall sensor connector, and hall sensing signals detected from the outer stator and the inner stator may be connected to the integrated hall sensor connector in parallel. The current applied from the outer hall sensor and the inner hall sensor may be connected to one ground.

The driving motor may further include an outer temperature sensor and an inner temperature sensor for detecting temperatures of the outer stator and the inner stator, respectively. The outer temperature sensor and the inner temperature sensor may contact the outer winding portion and the inner winding portion to measure temperatures.

With the configuration, a current from the power unit may be supplied to the outer temperature sensor and the inner temperature sensor, in parallel, through the integrated hall sensor connector, and signals detected from the outer temperature sensor and the inner temperature sensor may be connected to the integrated hall sensor connector in parallel. The hall sensor unit including the outer hall sensor and the inner hall sensor, and a temperature sensor unit including the outer temperature sensor and the inner temperature sensor may be connected to each other in parallel to be integrally connected to one ground.

In accordance with another exemplary embodiment of the present disclosure, the washing machine may include a spring washer inserted into a connection part of the outer shaft and the inner rotor, which results in attenuation of vibrations of the outer shaft to prevent noise, and prevention of separation of the outer shaft 81 due to vibrations.

A stopping ring may further be provided at a connection part of the outer shaft and the inner rotor to secure the spring washer so as to prevent separation of the spring washer in an axial direction. Preferably, the stopping ring may be implemented as a C-ring.

A stopping ring recess may be concaved from an outer circumference of the outer shaft toward the center. The C-ring may be inserted into the stopping ring recess, and prevent separation of the spring washer in the axial direction.

An inner bushing may be installed between the outer shaft and the inner rotor to transfer a rotational force of the inner rotor to the outer shaft. The spring washer may be installed at the connection part of the inner bushing and the outer shaft to prevent vibration and noise in the axial direction of the outer shaft and noise.

Also, a stopping ring may further be provided at the connection part of the outer shaft and the inner bushing to fix the spring washer. The spring washer may be formed as an annular member which encompasses an outer circumference of the outer shaft on an upper surface of the inner bushing.

The spring washer may preferably be implemented as an annular concave-convex member having a protruding portion and a concaved portion.

According to still another embodiment of the present invention, there is provided a shaft structure for a dual drum washing machine, comprising: an outer shaft formed in a hollow type; an inner shaft inserted into the outer shaft; a driving motor having a stator, an outer rotor connected to the inner shaft and rotating outside the stator, and an inner rotor connected to the outer shaft and rotating inside the stator; a spring washer inserted into the outer shaft at a connection part of the outer shaft and the inner rotor; and an inner rotor nut configured to forcibly fix the inner rotor after the spring washer has been insertion-coupled to the outer shaft. Under this configuration, vibrations of the outer shaft in an axial direction can be attenuated to prevent noise, and entangled state releasing due to vibration can be prevented.

The shaft structure of the present invention may further comprise a plain washer insertion-coupled to part between the inner rotor and the spring washer on the outer circumference of the outer shaft.

A male screw portion is formed on the outer circumference of the outer shaft, and a female screw portion is formed on the inner circumference of the inner rotor nut. As the male screw portion and the female screw portion are screw-coupled to each other, the spring washer can be prevented from deviating in an axial direction.

An inner bushing is installed between the outer shaft and the inner rotor, so that a rotation force of the inner rotor can be transferred to the outer shaft.

According to another embodiment of the present invention, the spring washer is implemented in the form of an annular concave-convex member formed on an upper surface of the inner bushing so as to cover the outer circumference of the outer shaft. This can prevent vibrations of the outer shaft in an axial direction, and noise.

The annular concave-convex member includes a protrusion part and a concaved part.

An inner ball bearing is installed between the outer shaft and the inner shaft, so that the driving motor can drive the outer shaft and the inner shaft, independently.

In accordance with another exemplary embodiment of the present disclosure, in the assembly structure of the driving motor including a bearing housing with a housing main body, a bearing shaft hole and a stator coupling opening, and a stator with outer teeth, inner teeth, a yoke and a housing coupling opening, the stator coupling opening may include a fitting protrusion and the housing coupling opening may include a fitting recess such that the fitting protrusion can be inserted into the fitting recess, thereby enhancing an assembly characteristic between the bearing housing and the stator of the dual motor.

The stator coupling opening and the housing coupling opening may be provided with coupling openings communicated with each other when the bearing housing and the stator are assembled to each other. In a state that the fitting protrusion has been insertion-fixed to the fitting recess, the bearing housing and the stator may be assembled to each other by screws through the coupling openings.

The stator coupling opening may protrude from the body of the bearing housing by a predetermined height, and the housing coupling opening may protrude from the yoke of the stator by a predetermined height.

Also, the stator may include a plurality of spacers protruding from the yoke so that the stator can be coupled to the bearing housing with a gap therebetween.

In accordance with another exemplary embodiment of the present disclosure, an a method for driving a washing machine may include a washing step of performing a washing process by supplying washing water and a detergent, a rinsing step of performing a rinsing process by supplying rinsing water, a dehydrating step of discharging rinsing water and performing a dehydrating process, and a laundry arranging step of separating laundry from the main drum and the sub drum and releasing an entangled state of the laundry after the dehydration process. The method may further include a drying step of performing a drying process to dry the laundry, and the laundry arranging step may be performed prior to the drying step.

The laundry arranging step may include a laundry separating process of separating the laundry from inner surfaces of the main drum and the sub drum in response to the relative motions between the main drum and the sub drum, and an entangled state releasing process of releasing an entangled state of the laundry while the laundry rotates by relative motions of the main drum and the sub drum and moves in a circumferential direction and an axial direction. The laundry arranging step may further include a laundry automatic-drawing step of drawing the laundry to the outside by relative motions of the main drum and the sub drum.

In accordance with another exemplary embodiment of the present disclosure, a method for controlling a washing machine may include a laundry separating step of driving by the driving motor the main drum and the sub drum to perform the relative motions to separate the laundry from the inner surfaces of the main drum and the sub drum after the dehydrating step of draining rinsing water and performing a dehydration process, and an entangled state releasing step of driving by the driving motor the main drum and the sub drum to perform the relative motions such that the entangled state of the laundry can be released with rotating and moving in a circumferential direction and an axial direction. And, the method may further include a laundry automatic-drawing step of driving by the driving motor the main drum and the sub drum by the driving motor to perform relative motions so that the laundry may be discharged to the outside of the door after the door has opened.

The driving motor may independently rotate the outer rotor and the inner rotor such that the main drum and the sub drum can perform the relative rotations. Preferably, the sub drum and the main drum may rotate in mutually opposite directions, or rotate at different rotation speeds in the same rotation direction.

In accordance with another exemplary embodiment of the present disclosure, the method for driving the washing machine may include a three-dimensional washing process of rotating laundry and moving the laundry in a circumferential direction and an axial direction by relative motions of the main drum and the sub drum which performs the washing process by supplying the washing water and the detergent.

Also, the washing step may further include a general washing process of moving the laundry in the circumferential direction by the rotations of the main drum and the sub drum.

In accordance with another exemplary embodiment of the present disclosure, the driving motor may drive the main drum and the sub drum to relatively rotate such that the laundry can rotate and move in the circumferential and axial directions, or drive the main drum and the sub drum to integrally rotate each other such that the laundry can move only in the circumferential direction, according to a laundry amount measured in the washing step of performing the washing process by supplying the washing water and the detergent.

In detail, when a laundry amount is less than $\frac{1}{3}$ of the maximum load of the driving motor, the driving motor may rotate the main drum and the sub drum in opposite directions. When a laundry amount is more than $\frac{1}{3}$ and less than $\frac{2}{3}$ of the maximum load of the driving motor, the driving motor may rotate the main drum and the sub drum in the same direction with different speeds. When a laundry amount is more than $\frac{2}{3}$ of the maximum load of the driving motor, the driving motor may integrally rotate the main drum and the sub drum in the same direction.

In accordance with another exemplary embodiment of the present disclosure, the washing machine may further include a control unit to control operations of the outer rotor and the inner rotor, and upon initially operating the driving motor, the control unit may operate the outer rotor and the inner rotor with starting RPM smaller than or the same as each target RPM of the outer rotor and the inner rotor.

The control unit may control the driving motor to sequentially drive the outer and inner rotors, starting from one rotor having a large torque.

In accordance with another exemplary embodiment of the present disclosure, the washing machine may further include comprises a laundry amount detection unit 200 configured to detect a laundry amount. If a predetermined time lapses after the driving motor has started to operate, the control unit may control a rotation direction or an RPM of each of the outer rotor and the inner rotor according to a laundry amount.

When a laundry amount is less than a reference laundry amount, the control unit may rotate the main drum and the sub drum by driving the outer rotor and the inner rotor in opposite directions. When a laundry amount is more than the reference laundry amount, the control unit may rotate the outer rotor and the inner rotor in the same direction.

When a laundry amount is less than a first reference laundry amount, the control unit may rotate the outer rotor and the inner rotor in opposite directions. When a laundry amount is more than a second reference laundry amount greater than the first reference laundry amount, the control unit may rotate the outer rotor and the inner rotor in the same direction.

When a laundry amount is more than the first reference laundry amount and less than the second reference laundry amount, the control unit may control rotation directions or RPMs of the outer rotor and the inner rotor according to a heat generation amount or torque of the driving motor.

In accordance with another exemplary embodiment of the present disclosure, the washing machine may further include a temperature detection unit provided at the outer rotor or the inner rotor, and configured to detect a temperature. When a temperature is more than a reference temperature, the control unit may control the outer rotor and the inner rotor to rotate with the same RPM.

In accordance with another exemplary embodiment of the present disclosure, a method for controlling a washing machine may include initially operating the driving motor with the same starting RPM smaller than target RPMs of the outer rotor and the inner rotor, and operating the outer rotor and the inner rotor with the respective target RPMs when a predetermined time lapses after initially-operating the driving motor.

The method may include comparing torques of the outer rotor and the inner rotor, firstly initial-operating one rotor having a larger torque and then initial-operating another rotor having a smaller torque based on a comparison result, and operating the outer rotor and the inner rotor with respective target RPMs if a predetermined time lapses after the driving motor has started to operate. The method may further include detecting a laundry amount.

The step of operating the outer rotor and the inner rotor may include operating the main drum and the sub drum by rotating the outer rotor and the inner rotor in opposite directions when a laundry amount is less than a reference laundry amount, and rotating the outer rotor and the inner rotor in the same direction with different RPMs when a laundry amount is more than the reference laundry amount.

Also, the method for controlling the washing machine may further include detecting a temperature of the outer rotor or the inner rotor, and controlling the outer rotor and the inner rotor to rotate with the same RPM when the temperature is more than a reference temperature.

A washing machine according to an embodiment of the present invention comprises a main body which forms an outer appearance; a tub disposed within the main body; a main drum rotatably mounted in the tub, and accommodating laundry therein; a sub drum mounted in the main drum so as to be relatively rotatable with respect to the main drum; a driving motor including a stator, an outer rotor connected to the sub drum and rotating outside the stator, and an inner rotor connected to the main drum and rotating inside the stator; and a control unit configured to drive the outer rotor and the inner rotor. The control unit drives the inner rotor and the outer rotor into particular RPMs, respectively, and applies a braking command to the inner rotor and the outer rotor. Then, the control unit detects a first laundry amount inside the main drum and a second laundry amount inside the sub drum based on braking times of the inner and outer rotors.

In a washing machine according to another embodiment of the present invention, the control unit includes a master controller configured to drive the inner rotor, and to detect the first laundry amount based on the braking time of the inner rotor; and a slave controller connected to the master controller, configured to drive the outer rotor, and to detect the second laundry amount based on the braking time of the outer rotor.

The master controller generates a braking command for the outer rotor, and transmits the braking command to the slave controller. Then, the master controller generates a braking command for the inner rotor after a particular time has lapsed.

The washing machine further comprises a current detector configured to detect a first current and a second current applied to the inner rotor and the outer rotor, respectively.

According to an embodiment of the present invention, there is provided a laundry amount detecting method for a washing machine, the washing machine comprising a main body which forms an outer appearance; a tub disposed within the main body; a main drum rotatably mounted in the tub, and accommodating laundry therein; a sub drum mounted in the main drum so as to be relatively rotatable with respect to the main drum; and a driving motor including a stator, an outer rotor connected to the sub drum and rotating outside the stator, and an inner rotor connected to the main drum and rotating inside the stator, the method comprising: initially driving the inner rotor and the outer rotor; braking the inner rotor and the outer rotor when the inner rotor and the outer rotor reach particular RPMs; and detecting a first laundry amount inside the main drum and a second laundry amount inside the sub drum based on braking times of the inner rotor and the outer rotor.

The method further comprises displaying one of the first laundry amount, the second laundry amount, and a final laundry amount determined based on the first and second laundry amounts (S160).

According to another embodiment of the present invention, there is provided a laundry amount detecting method for a washing machine, the washing machine comprising a main body which forms an outer appearance; a tub disposed within the main body; a main drum rotatably mounted in the tub, and accommodating laundry therein; a sub drum mounted in the main drum so as to be relatively rotatable with respect to the main drum; a driving motor including a stator, an outer rotor connected to the sub drum and rotating outside the stator, and an inner rotor connected to the main drum and rotating inside the stator; a master controller configured to drive the inner rotor; and a slave controller configured to drive the outer rotor, the method comprising: initially driving the inner rotor and the outer rotor by the master controller and the slave controller, respectively; braking the inner rotor and the outer rotor by the master controller, when the inner rotor and the outer rotor reach particular RPMs; and detecting a first laundry amount inside the main drum and a second laundry amount inside the sub drum by the master controller and the slave controller, based on braking times of the inner rotor and the outer rotor.

The present disclosure may provide one or more of the following effects with those configurations.

Two drums which rotate independent of each other may be employed to allow laundry within the drums to move three-dimensionally. Accordingly, the three-dimensional motions of the laundry can improve the washing performance of a washing machine and reduce a washing time thereof.

A structure capable of generating the optimal three-dimensional motion of the laundry may be provided in consideration of torque distribution due to driving the two drums, a mechanical force applied to the laundry and overall movements of the laundry, thus to improve the washing performance.

The two drums which rotate independent of each other may be provided with lifters, respectively, to render laundry move more smoothly, thereby improving the washing performance and the washing time of the washing machine.

A protrusion fixing end formed at an inner side toward the center from the rotor teeth may be removed to reduce the occurrence of inferiority due to transformation of a protrusion fixing end. Also, the leakage of a magnetic flux to the upper side may be prevented by virtue of the reduction of the protrusion fixing end. A cut recess as a cut through hole may be formed inside the rotor teeth in an outer circumferential direction to be integrally coupled to a bushing by an injection-molding, thereby simplifying the assembly of the rotor integrated with a rotor core and fixing the core by prevention of separation of the rotor due to a centrifugal force.

An inner rotor of a high torque may be provided in a main drum and an outer rotor of a low torque may be provided in a sub drum, by designing torque of the inner rotor side to be greater than torque of the outer rotor side in a manner that the number of windings of coil increases on inner teeth by making a length of the inner teeth longer than a length of outer teeth.

In the present invention, a ratio between an outer diameter of the rotor and an outer diameter of the stator of the permanent magnet motor may be optimized for a maximum torque within a preset size. This can maximize efficiency of the permanent magnet motor.

In the present invention, cogging torque and torque ripple can be minimized under control of a height of a teeth extension portion of rotor teeth, a distance between neighboring teeth extension portions, an arc angle of the rotor teeth, and an angle of a linear part of the teeth extension portion. This can enhance characteristics of vibration and noise, resulting in stable rotation of the motor.

In a method for fabricating a dual motor stator, redundant parts after punching can be minimized and accordingly waste of components can be reduced, by punching separately fabricated inner stator and outer stator without being integral with each other, and a washing machine employing the same.

Also, two stators for driving two independent rotors may be employed, and an automatic coil winding in an aligned manner may be allowed by use of articulated bobbins, resulting in improvement of a winding space factor and performance of a driving motor, and reduction of working time.

A tooth ring for reducing cogging torque and preventing lowering of an output may be used, so as to improve the performance of the driving motor.

A core having an efficient teeth structure to be used for the articulated bobbins may be provided, thereby reducing wasted pieces, which are generated upon a core fabrication.

Also, as the two stators for driving the two independent rotors may be employed to be integrally assembled by an insulator, and the insulator may serve as a bobbin as well, stator assembling may be carried out in an easy and simple manner, and the number of components and an entire size of the driving motor can be reduced. Therefore, an increase in an entire size of the washing machine can be avoided even if the two stators for driving the two independent rotors are used.

In the aspect of an assembled structure of the bearing housing and the stator of the driving motor in the washing machine, bent portions including protruding portion and concaved portion may be formed at a body of a bearing housing, in order to radiate heat generated from coil on the inner teeth (winding portions) of the stator capable of effectively performing radiation by conduction and convection.

A current connector and a hall sensor connector, which have been provided at an inner stator and an outer stator, respectively, can be combined into one integrated member so as to implement a simplified structure, secure a space and enhancing convenience. This structure may also prevent an erroneous assembling, which may result in an increase in convenience for assembly of a dual motor.

More simplified structure can be employed by improving a shaft structure of a washing machine with such dual drum and dual motor, thereby attenuating vibration between an inner rotor and an outer rotor to prevent unexpected noise and preventing separation of shafts.

In a dual motor including an inner rotor and the outer rotor, employed in a dual drum washing machine, in order to improve the process of assembling the stator having outer teeth and inner teeth with the bearing housing, a fitting protrusion may be provided at a stator coupling opening formed at the bearing housing and a fitting recess may be provided at a housing coupling opening formed at the stator facilitate an assembly process, so as to fix coupling positions of the bearing housing and the stator, thereby facilitating the assembly process.

A function of an inner rotor assembly guide may be performed by employing an assembly auxiliary jig for improvement of assembly when an inner rotor is independently coupled to the outer shaft without coupled to a bearing housing side.

Two drums and a driving motor which can independently drive the two drums may be driven and controlled to allow for three-dimensional motions of laundry, accordingly, the laundry can be easily separated from inner circumferential surfaces of the drums after dehydration and easily released from an entangled state, thereby reducing wrinkles on the laundry.

The laundry can be easily drawn out of the washing machine in an automatic manner after the operation of the washing machine is ended, thereby improving user's convenience.

The laundry can be controlled to perform the three-dimensional motions or typical two-dimensional motions according to a laundry amount, so as to prevent an overload of the driving motor and achieve an optimal washing performance, thereby improving washing efficiency.

The laundry may be controlled to perform three-dimensional motions in consideration of torque distribution due to driving of two drums, a mechanical force applied to the laundry and overall movements of the laundry.

Two rotors of a dual motor may be controlled to have the same RPM or different starting time so as to prevent a starting failure due to over-current, which may be generated upon starting the driving motor, and maintain a minimum amount of heat, thereby improving system stability.

Also, the rotation direction or RPM of the driving motor can be appropriately controlled according to loads such as a laundry amount, temperature and the like so as to allow for three-dimensional motions of the laundry, resulting in improvement of a washing performance.

In the washing machine having two drums and a single driving motor for independently driving the two drums, a laundry amount is detected with respect to each drum. This can result in precise detection of the laundry amount.

In the present invention, the laundry amounts inside the two drums are detected in different manners. This can allow the laundry amounts to be more precisely detected, and can reduce the amount of washing water and electricity required to perform washing, rinsing and dehydrating processes.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
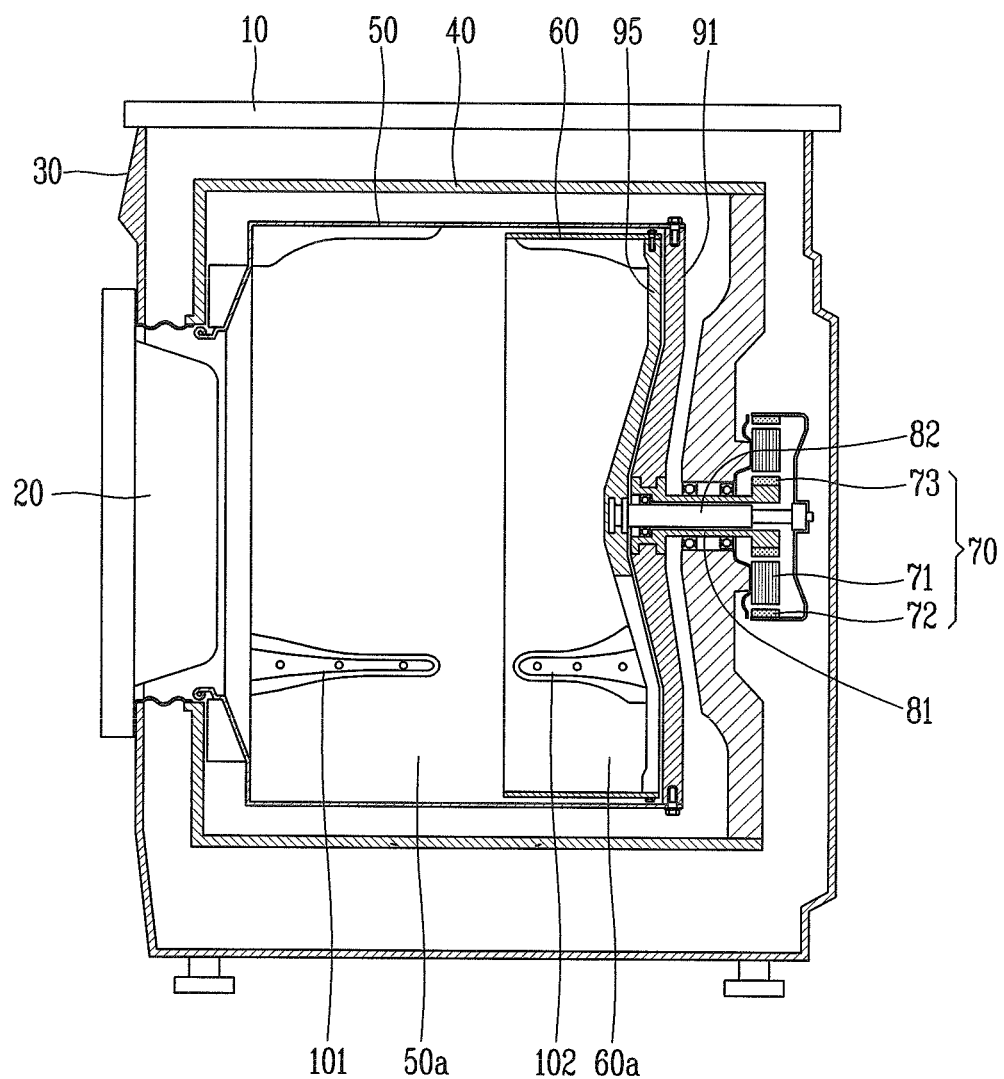
FIG. 1 is a schematic view of a washing machine according to an embodiment of the present invention.

FIG. 1 is a schematic view of a washing machine in accordance with one exemplary embodiment. As shown in FIG. 1, a washing machine may include a cabinet 10 defining an outer appearance corresponding to a main body. A front surface of the cabinet 10 is shown having an introduction opening 20 for introducing clothes (laundry) as a target to be washed (hereinafter, referred to as 'laundry') into the cabinet 10.

The introduction opening 20 may be open or closed by a door rotatably fixed onto the cabinet. A control panel 30, which has various manipulation buttons for manipulating the washing machine, may be located at an upper portion of the cabinet 10, and a detergent supply unit (not shown) for filling the detergent may be provided at one side of the control panel 30.

An accommodation space formed within the cabinet 10 is shown having a cylindrical tub 40 for storing washing water, and a main drum 50 and a sub drum 60 both rotatably installed inside the tub 40 and receiving the laundry therein. A driving motor 70 for driving the main drum 50 and the sub drum 60, may be disposed at the rear of the tub 40.

The tub 40 may be in a cylindrical shape, and receive therein the main drum 50 and the sub drum 60. The front face of the tub 40 may be open so as to communicate with the introduction opening 20 of the cabinet 10. Therefore, a gasket, which encompasses the front face part of the tub and the introduction opening of the cabinet, may be located between the front face part of the tub and the introduction opening of the cabinet, whereby washing water contained in the tub can be prevented from flowing into the cabinet.

The main drum 50 may be in a cylindrical shape, rotatably mounted in the tub 40. The main drum 50 may include a plurality of through holes formed through a side surface thereof such that washing water can flow out therethrough.

The sub drum 60 may be in a cylindrical shape, rotatably mounted in the main drum 50. Here, the sub drum 60 may be mounted to be relatively rotatable with respect to the main drum 50. That is, the main drum and the sub drum may be driven independent of each other, which allows for various relative rotations according to rotation speed and rotation direction of each drum.

The driving motor 70 is a component for generating a driving force to drive the main drum and the sub drum, and mounted at a rear surface of the tub 40. The driving motor 70 may include a secured stator 71, an outer rotor 72 rotatable outside the stator, and an inner rotor 73 rotatable inside the stator. Such driving motor having the two rotors may be referred to as a dual-rotor motor for convenience.

Figure 4:
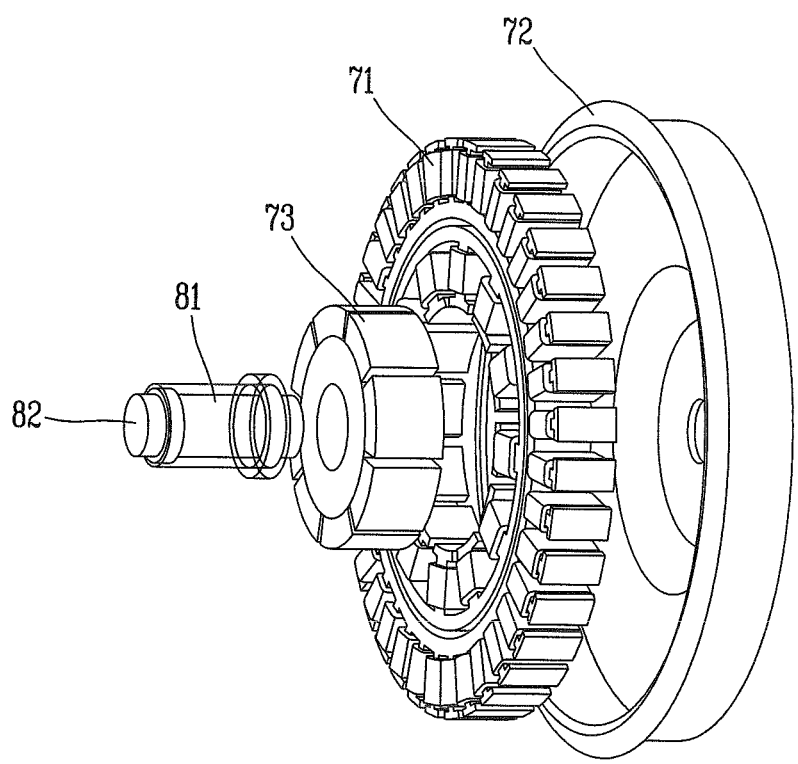
FIG. 4 is a disassembled perspective view of a driving motor.
Figure 5:
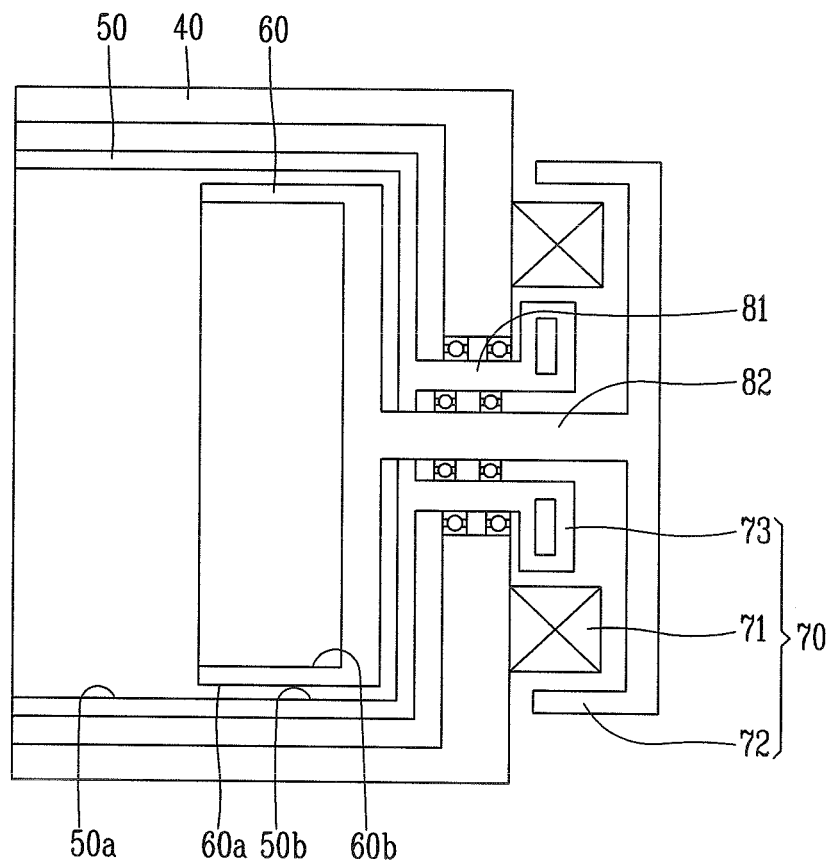
FIG. 5 is a schematic view showing a connected state of the driving motor, the main drum and the sub drum.

FIG. 4 shows the driving motor 70 in more detail. As shown in FIG. 4, the stator 71 has an annular structure to surround the inner rotor 73, and is fixedly coupled to the tub side. FIG. 5 schematically shows a structure capable of transferring a driving force from the driving motor to the main drum and the sub drum. As shown in FIGS. 4 and 5, the inner rotor 73 may be rotatably disposed inside the stator 71, and connected to an outer shaft 81, which will be explained later, so as to get involved in the rotation of the main drum 50. The outer rotor 72 may be rotatably disposed outside the stator 71 and connected to an inner shaft 82, which will be explained later, so as to get involved in the rotation of the sub drum 60. Each of the inner rotor and the outer rotor may include magnets, and accordingly be rotated by magnetic fields generated by current when such current is applied to the inner and outer winding portions of the driving motor.

Upon controlling the current flowing on coils wound on inner and outer teeth, the inner rotor and the outer rotor may be rotated independent of each other. Accordingly, referring to FIG. 5, the single driving motor 70 may allow for the mutually independent rotations of the main drum 50 and the sub drum 60. Namely, the driving motor may independently drive the main drum and the sub drum.

With the configuration, the main drum and the sub drum are driven independently by the driving motor to induce rotations of the laundry by the difference in relative rotation speed between the drums, thereby generating three-dimensional (3D) motions of the laundry while the laundry rotates in the drums.

Figure 2:
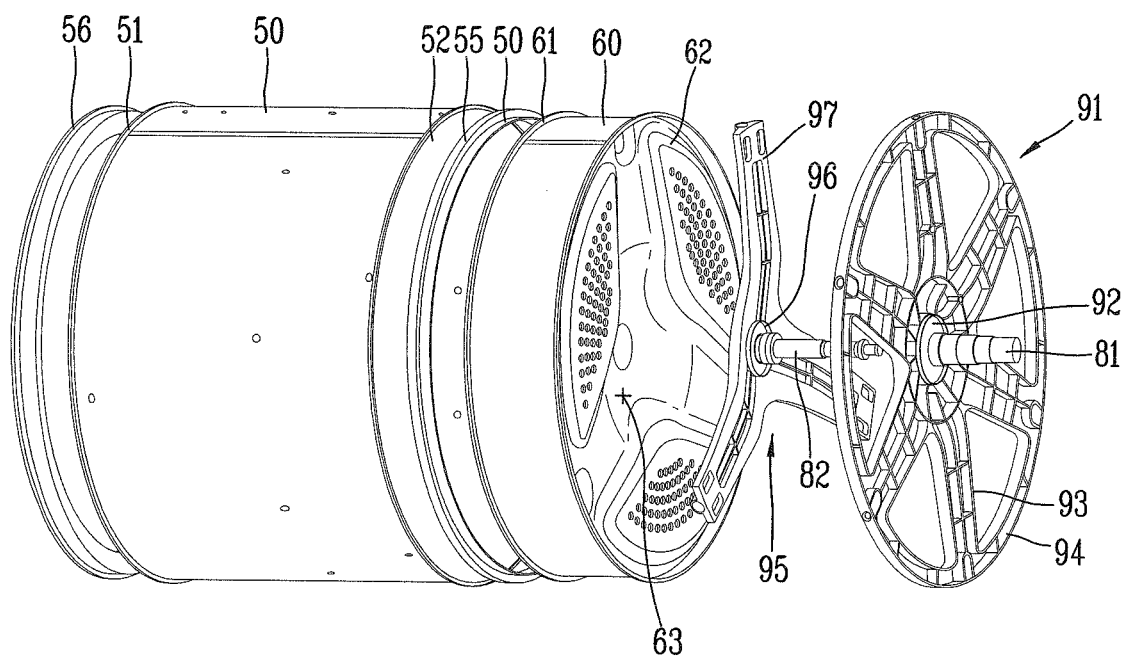
FIG. 2 is a disassembled perspective view of a main drum and a sub drum.
Figure 3:
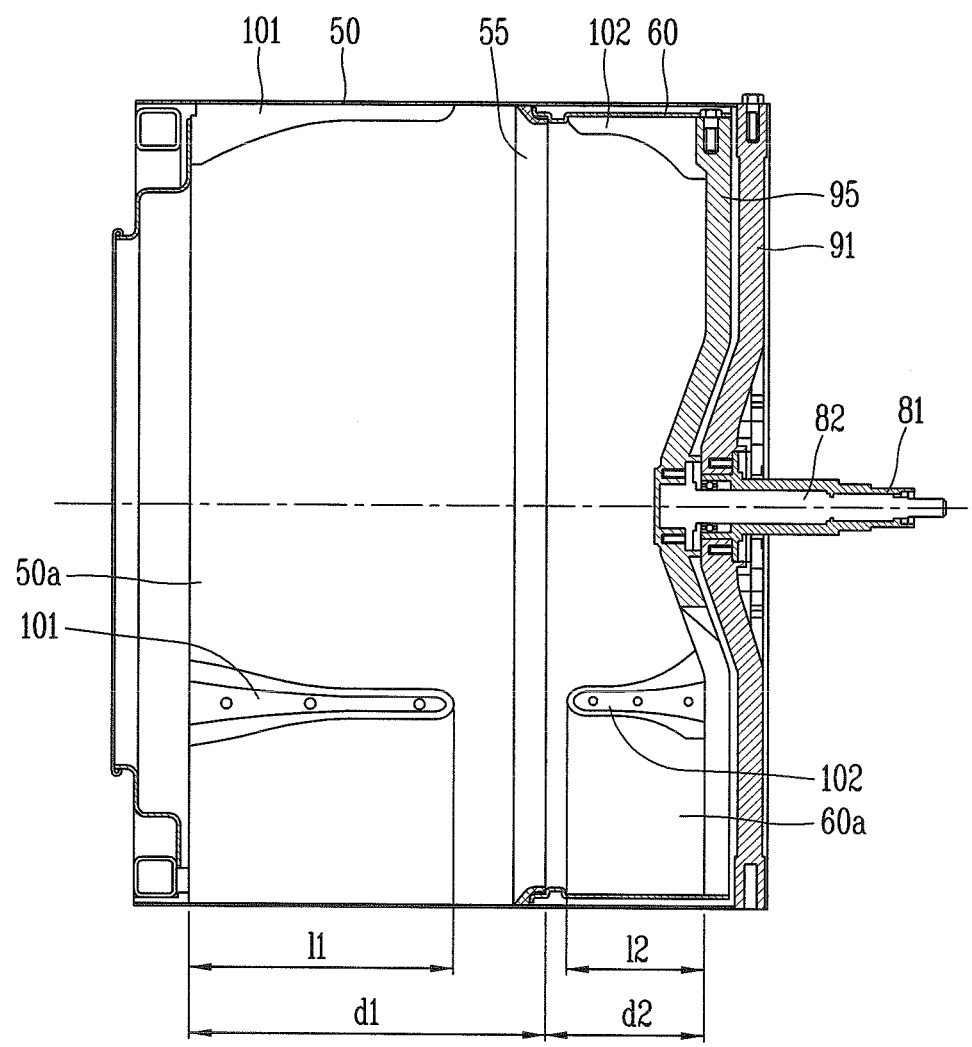
FIG. 3 is a coupled view of the main drum and the sub drum of FIG. 2.

FIGS. 2 and 3 show coupled states between shafts and drums in more detail. Referring to FIGS. 2 and 3, the outer shaft 81 may be inserted through the tub to connect the inner rotor 73 to the main drum 50. The outer shaft 81 corresponds to a hollow shaft, so the inner shaft 82 may be mounted inside the outer shaft 81. The inner shaft 82 may be inserted through the outer shaft 81 to connect the outer rotor 72 to the sub drum 60.

The main drum 50 and the outer shaft 81 may be connected by a main drum spider 91. Referring to FIG. 2, the main drum 50 may have openings at a front side 51 and a rear side 52. The main drum spider 91 may be coupled to the outer shaft 81 and fixed to the main drum 50. The sub drum 60 and the inner shaft 82 may be connected by a sub drum spider 95. The sub drum 60 may include a sub drum back forming its rear surface. The sub drum 60 may have the front side open and the rear side closed by the sub drum back. The sub drum spider 95 may be closely adhered onto the sub drum back.

Referring to FIG. 2, the main drum spider 91 may include a shaft coupling portion 92 coupled to the outer shaft, a spider supporting portion 93 radially extending from the shaft coupling portion 92, and a drum fixing portion 94 provided at an end of the spider supporting portion 93. Here, the drum fixing portion 94 may be fixedly coupled to the main drum 50. The shaft coupling portion 92 may be formed at a central part of the main drum spider 91, and have a coupling groove to which the outer shaft 81 is coupled. The spider supporting portion 93 may include a plurality of cantilevers radially extending from the central part. The drum fixing portion 94 may have a ring shape for connecting ends of the spider supporting portion 93. The spider supporting portion 93 may support the main drum spider so as to allow a driving force to be transferred to the main drum upon transferring the driving force transferred from the outer shaft 81 to the main drum via the main drum spider. Alternatively, as an exemplary variation, the spider supporting portion 93 may be formed in a disk shape extending from the shaft coupling portion.

The main drum spider 91 may be coupled to an outer circumferential surface of the main drum. That is, the drum fixing portion 94 in the ring shape may be fixed to an end portion of the outer circumferential surface of the main drum. The coupling of the drum fixing portion 94 and the outer circumferential surface of the main drum may be implemented, for example, by screws or by welding. As an exemplary variation of the one exemplary embodiment, the main drum may include a bent portion bent from a rear end thereof toward the central part, and the drum fixing portion of the main drum spider may be coupled to the bent portion. The sub drum 60 and the inner shaft 82 may be connected by the sub drum spider 95. Still referring to FIG. 2, the sub drum 60 may have a sub drum back 62 forming its rear surface. The sub drum 60 may have the front side open and the rear side closed by the sub drum back 62. The sub drum spider 95 may be closely adhered onto the sub drum back 62.

The sub drum spider 95 may include a shaft coupling portion 96 coupled to the inner shaft 82, and a plurality of drum fixing portions 97 radially extending from the shaft coupling portion 96. Here, ends of the drum fixing portions 97 may be fixed to the sub drum back 62. The sub drum back 62 may further include a receiving portion 63 recessed inwardly in correspondence with the shape of the sub drum spider 95. The sub drum spider 95 may be received in the receiving portion 63 to be closely adhered onto the sub drum back 62. The coupling of the drum fixing portions 97 and the sub drum back 62 may be implemented, for example, by screws or by welding.

Referring to FIGS. 2 and 3, the sub drum spider 95 may be provided between the sub drum back 62 and the main drum spider 91. However, the sub drum spider 95 can integrally rotate with the sub drum back 62 and independently rotate with respect to the main drum spider 95. That is, the sub drum spider 95 may rotate independent of the main drum spider 91, which allows the main drum 50 and the sub drum 60 to rotate independent of each other. The foregoing configurations provide the structure of the washing machine that each drum can independently be driven by the single driving motor.

Referring to FIG. 5, the outer shaft and the inner shaft may have a mutually independently rotatable structure with interposing a bearing therebetween. The outer rotor and the inner rotor may also have the mutually independently rotatable structure with interposing the stator therebetween. The stator may include winding portions separately at the outer rotor side and the inner rotor side, which allows the driving motor to independently rotate the outer rotor and the inner rotor. Hence, the main drum may be driven by the inner rotor and the sub drum may be driven by the outer rotor, so the main drum and the sub drum can be driven independently by virtue of the driving motor. Also, the independent driving of the outer rotor and the inner rotor may enable the main drum and the sub drum to perform various relative rotations. That is, such various relative rotations can be generated by making a rotation direction different or making speed different in the same rotation direction.

As an exemplary variation of the exemplary embodiment, the main drum and the sub drum may include a main drum back and a sub drum back, respectively, forming their rear surfaces. Here, both the main drum and the sub dram may have the front side open and the rear side closed by the main drum back and the sub drum back, respectively. Here, the main drum spider may be fixed onto the main drum back. Also, the sub drum spider may be fixed onto the sub drum back. The sub drum spider may be provided between the sub drum back and the main drum back. Here, the sub drum spider may integrally rotate with the sub drum back and independently rotate with respect to the main drum back.

An outer circumferential surface of the sub drum may face a part of an inner circumferential surface of the main drum. That is, an inner circumferential surface of the main drum and the inner circumferential surface of the sub drum may have different lengths in an axial direction, and the outer circumferential surface of the sub drum may face a part of an inner circumferential surface of the main drum. Preferably, a structure that the sub drum is shorter than the main drum in view of the length in the axial direction is provided.

FIG. 1 and FIG. 5 schematically show the main drum and the sub drum with the structure. Referring to FIG. 5, the inner circumferential surface of the main drum and the inner circumferential surface of the sub drum may have different lengths in an axial direction. Hence, the sub drum 60 may be mounted inside the main drum 50 so as to extend from one end portion of the main drum 50 in an axial direction, and the main drum 50 may be disposed such that only a part of its inner circumferential surface faces the outer circumferential surface of the sub drum. In this structure, the laundry may contact an interface (boundary surface) between the sub drum and the main drum, and accordingly rotate in one direction due to the difference in the rotation speed between the drums. Here, the laundry may be rotated based on a perpendicular rotation shaft when viewed from the inner circumferential surface of the drums. In addition, the laundry may generate a motion in a circumferential direction of the drum (i.e., circumferential-direction motion) due to the friction against the inner circumferential surface of the drum. Accordingly, the laundry may move in the circumferential direction of the drum and rotate based on the rotating shaft perpendicular to the inner circumferential surface of the drum, thereby performing motions in the axial direction (i.e., axial-direction motion) from a drum side rotated at fast speed to a drum side rotated at slow speed. The axial-direction motion is generated as the laundry rotates based on the rotating shaft perpendicular to the inner circumferential surface of the drum. Consequently, the laundry may perform 3D motions by virtue of the axial-direction motion in addition to the two-dimensional circumferential-direction motion.

Referring to FIG. 3 and FIG. 5, the structure that the sub drum is shorter than the main drum in view of the length in the axial direction is provided. Here, the sub drum may be mounted inside the main drum to extend from one end portion of the main drum in an axial direction. Accordingly, an outer circumferential surface 60a of the sub drum may face an inner circumferential surface 50b of the main drum such that only a part 50b of the inner circumferential surfaces 50a and 50b of the main drum 50 can face the outer circumferential surface 60a of the sub drum 60. In more detail, referring to FIG. 3, a ratio (D2/D1) of a length D2 of the inner circumferential surface of the sub drum in an axial direction with respect to a length D1 of the inner circumferential surface of the main drum in an axial direction may be 0~0.5. That is, the length of the inner circumferential surface of the sub drum in the axial direction may be shorter than a half of the length of the inner circumferential surface of the main drum in the axial direction.

More preferably, the radio (D2/D1) of the length D2 of the inner circumferential surface of the sub drum in the axial direction with respect to the length D1 of the inner circumferential surface of the main drum in the axial direction may be ⅓, which is experimentally derived to cause an optimal 3D motion of the laundry in consideration of torque distribution due to driving two drums, a mechanical force applied to the laundry and overall movements of the laundry. To describe this in a different manner, the inner circumferential surface of the main drum may be divided into a first surface 50a that does not face the outer circumferential surface of the sub drum and the second surface 50b that faces the outer circumferential surface of the sub drum. In this case, the radio (D2/d1) of the length D2 of the inner circumferential surface 60b of the sub drum in the axial direction with respect to the length d1 of the first surface 50a in the axial direction may be 0.5.

Figure 9:
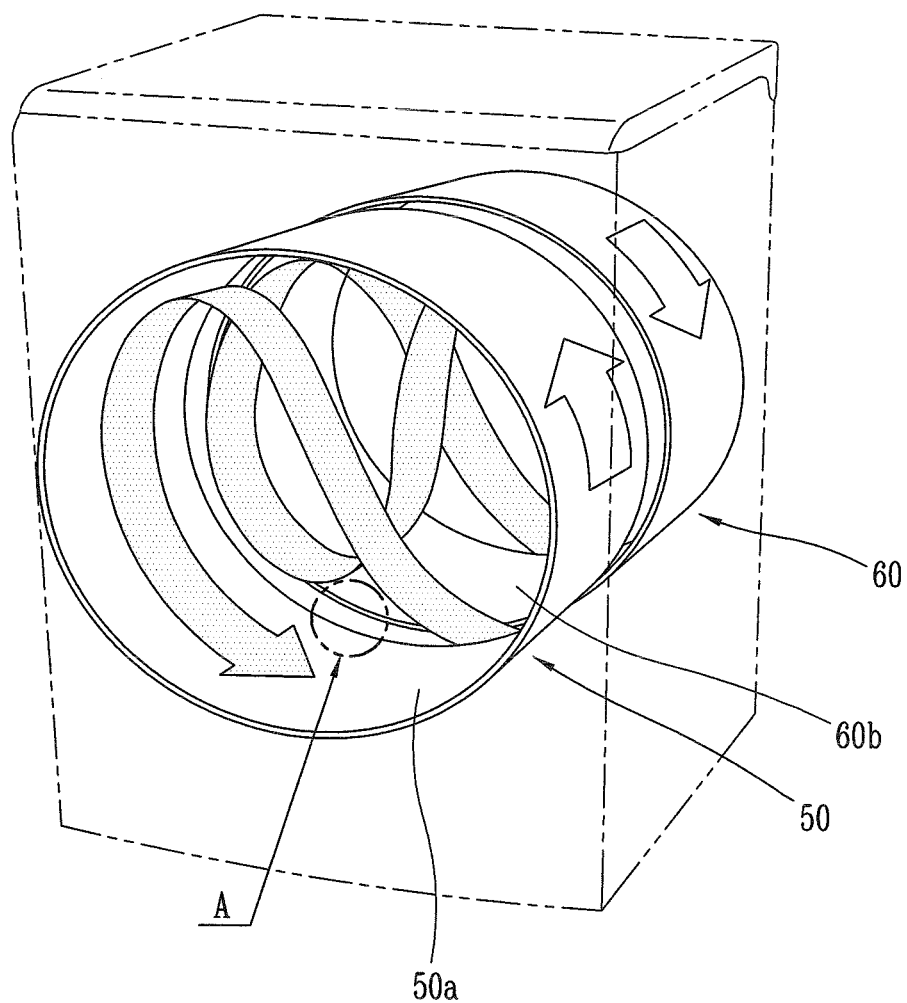
FIG. 9 is a schematic view showing motion of laundry inside the washing machine.
Figure 10:
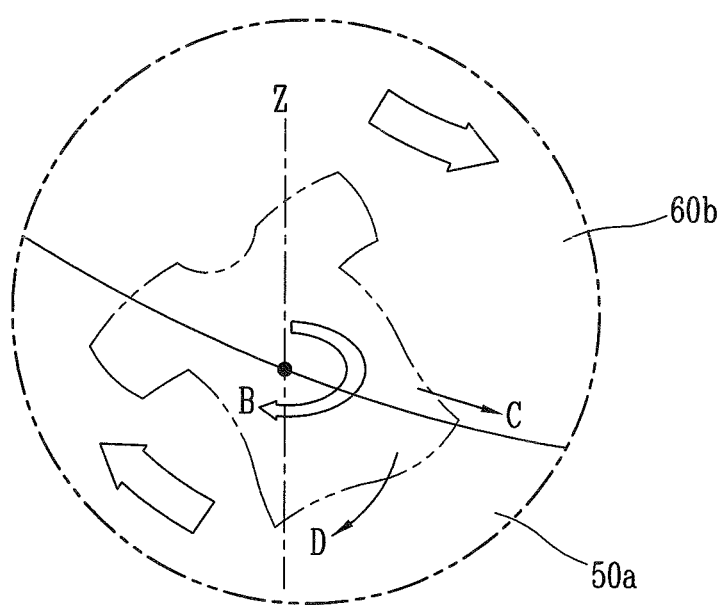
FIG. 10 is a schematic view showing motion of laundry at part A of FIG. 9.

From the perspective of the configuration, a structure that the laundry can contact (be positioned at) an interface between the sub drum and the main drum is provided. FIG. 9 shows the motion of the laundry within the drums merely by illustrating the first surface 50*a* of the main drum and the inner circumferential surface 60*b* of the sub drum with which the laundry is contactable. FIG. 10 is an enlarged view of an interface A where the first surface 50*a* of the main drum and the inner circumferential surface 60*b* of the sub drum are divided. The laundry may generate a motion of being unidirectionally rotated due to a difference in rotation speed between the drums. Referring to FIG. 9, the main drum rotates in a counterclockwise direction and the sub drum rotates in a clockwise direction. Here, it may be preferable that an absolute value of the rotation speed of the sub drum is greater than an absolute value of the rotation speed of the main drum. If the absolute values are the same, the laundry may rotate at the same place at the interface A between the main drum and the sub drum. Therefore, for the 3D motions of the laundry, it may be preferable to make those drums rotated at different speeds such that much rotational force can be applied in a single direction.

As aforementioned, FIG. 10 shows the motion of the laundry in the vicinity of the interface A between the drums when the rotation speed of the sub drum is faster than the rotation speed of the main drum. Here, the laundry may rotate in a clockwise direction B centering around a perpendicular rotation shaft Z, when viewed from the inner circumferential surface of the drum. Also, the laundry may perform circumferential-direction motions due to friction against the inner circumferential surfaces of the drums. Accordingly, the laundry can rotate centering around the rotation shaft perpendicular to the inner circumferential surface of the drum with moving in the circumferential direction of the drum (i.e., performing the circumferential-direction motion), thereby performing an axial-direction motion D from the fast rotating drum 60 to the slowly rotating drum 50.

The axial-direction motion D of the laundry may be generated by mutually relative rotations between the main drum and the sub drum. In more detail, the inner circumferential surface of the main drum is divided into the first surface 50*a* that does not face the outer circumferential surface of the sub drum and the second surface 50*b* that faces the outer circumferential surface 60*a* of the sub drum. Accordingly, the laundry may be rotated (moved) in the axial direction by the relative motions between the first surface 50*a* of the inner circumferential surface of the main drum and the inner circumferential surface 60*b* of the sub drum. From the perspective of the laundry, the laundry may move in the circumferential direction in response to the rotations of the main drum or the sub drum and move in the axial direction in response to the relative motions between the main drum and the sub drum. Here, the axial-direction motion of the laundry may be made by the rotations of the laundry in response to the relative motions between the main drum and the sub drum. In more detail, the axial-direction motion D is caused by the rotations of the laundry based on the rotation shaft Z perpendicular to the inner circumferential surface of the drum. Accordingly, the laundry may be allowed for the axial-direction motion D of the drum in addition to the two-dimensional (2D) circumferential-direction motion D, which results in realization of the 3D motions of the laundry.

The arrow in FIG. 9 schematically indicates the 3D motion of the laundry within the drums. Referring to FIG. 9, the laundry shows a shape of a schematically twisted band, which is a motion shape resulted from the laundry generating the circumferential-direction motion and a falling motion by the force of gravity with rotating within the drums. From the perspective of the aforesaid configuration, the main drum and the sub drum can be driven by the driving motor, independently of each other, so as to cause the laundry to be rotated by the difference in the rotation speed between the drums, thereby enabling the laundry to perform the 3D motions with rotating within the drums.

Figure 8:
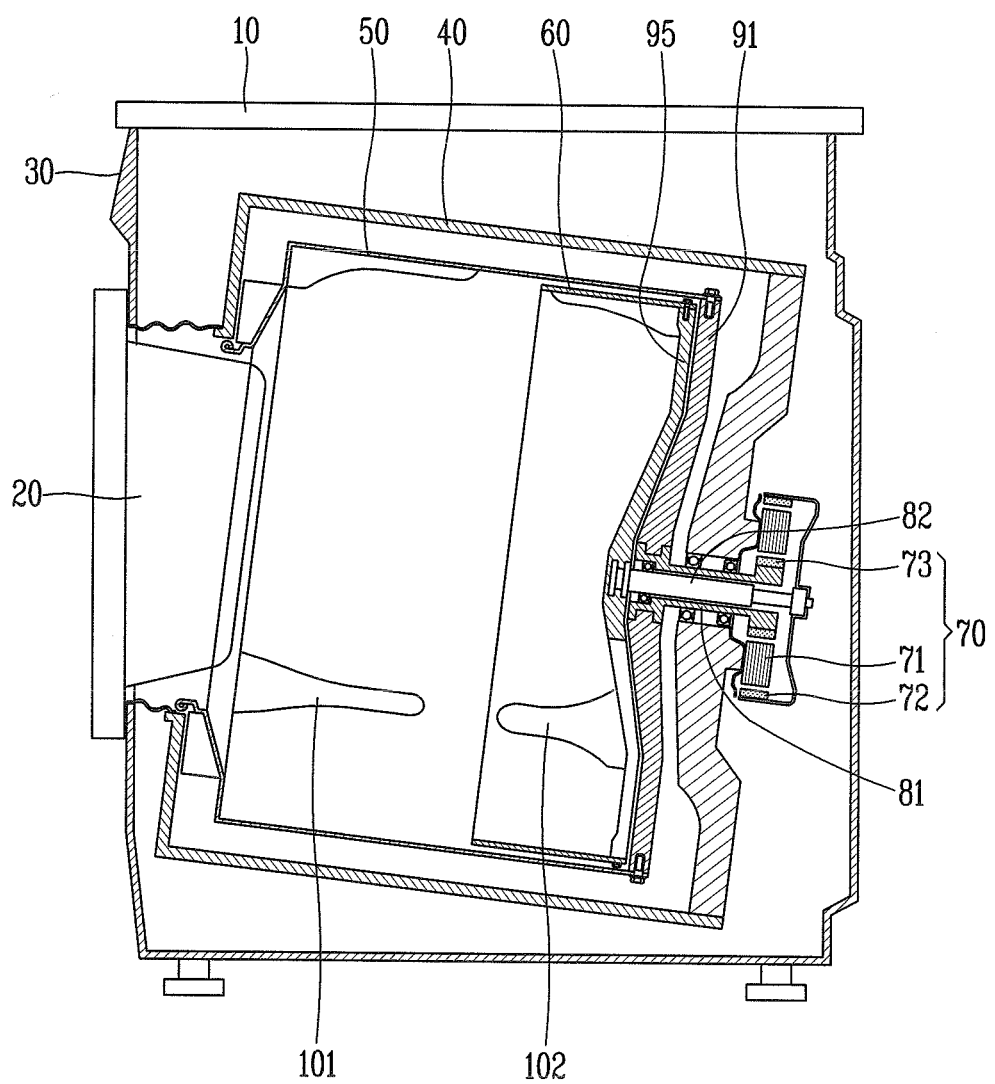
FIG. 8 is a schematic view showing a washing machine having a drum whose rotation shaft is inclined according to another embodiment of the present invention.

Also, as the sub drum has the length in the axial direction shorter than the main drum, the laundry can contact the interface between the sub drum and the main drum, and accordingly, generate the motion of being rotated by the difference in the rotation speed between the drums, which results in realization of the 3D motions of the laundry. Consequently, the realization of the 3D motions of the laundry may arouse improvement of washing efficiency and reduction of a washing time of the washing machine. A washing machine in accordance with another exemplary embodiment shown in FIG. 1 has a structure that the rotation shaft of the drums is perpendicularly disposed. However, the present disclosure may not be limited to the structure. A washing machine may alternatively have a structure that a rotation shaft of drums is inclined by a predetermined angle. FIG. 8 shows an exemplary embodiment of the structure that the rotation shaft is inclined. This structure may derive more various movements of the laundry in response to the rotations of the main drum and the sub drum. That is, when the laundry is fallen from an upper side of the drums by the force of gravity while moving in the circumferential direction along the inner circumferential surfaces in response to the rotations of the main drum or the sub drum, the laundry is fallen on a position out of the existing circumferential direction route. Accordingly, the axial-direction motion may be enabled by the force of gravity, resulting in more efficient motions of the laundry.

Hereinafter, a structure of a sub drum and a coupling method thereof will be described in detail with reference to FIGS. 77 to 80. A sub drum 60', 60'' may include a cylindrical portion forming an outer circumferential portion, and a drum back disposed on a rear surface thereof and coupled with a sub drum spider. Each drum back may include a receiving portion 63*a*, 63*b* recessed toward a front side such that the sub drum spider is received therein. A spider 95*a*, 95*b* may include a plurality of cantilevers radially extending from a center of an inner shaft, being coupled to the drum back of the sub drum 60', 60''.

Figure 6:
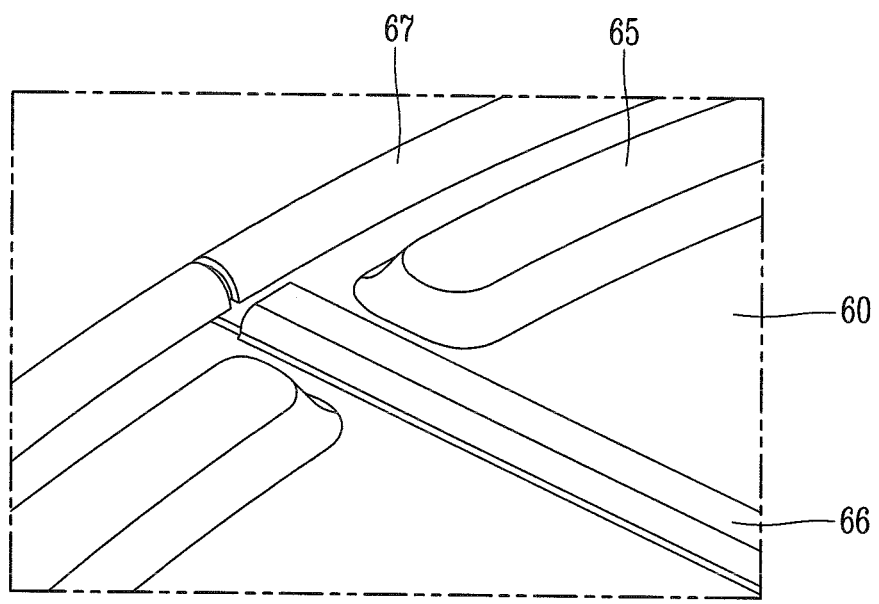
FIG. 6 is an enlarged view showing a reinforcing bead of the sub drum and a processed state thereof.
Figure 7:
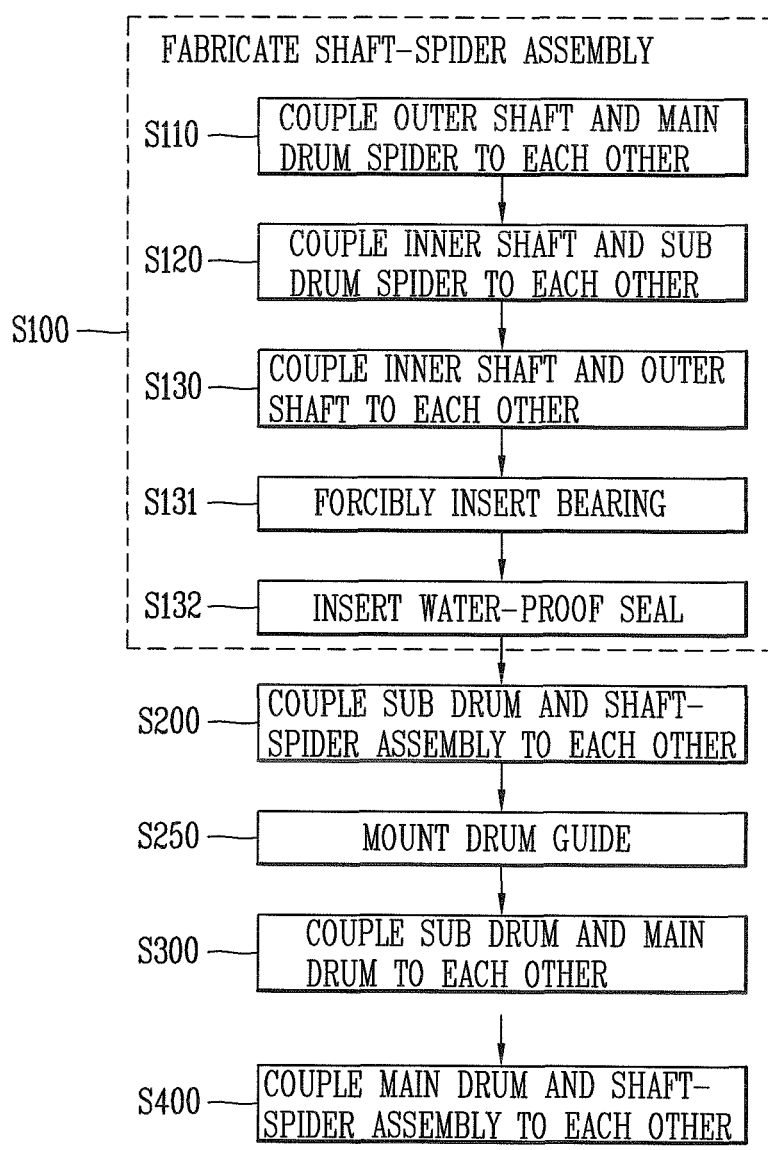
FIG. 7 is a flowchart showing a method for assembling drums of a washing machine according to an embodiment of the present invention.
Figure 77:
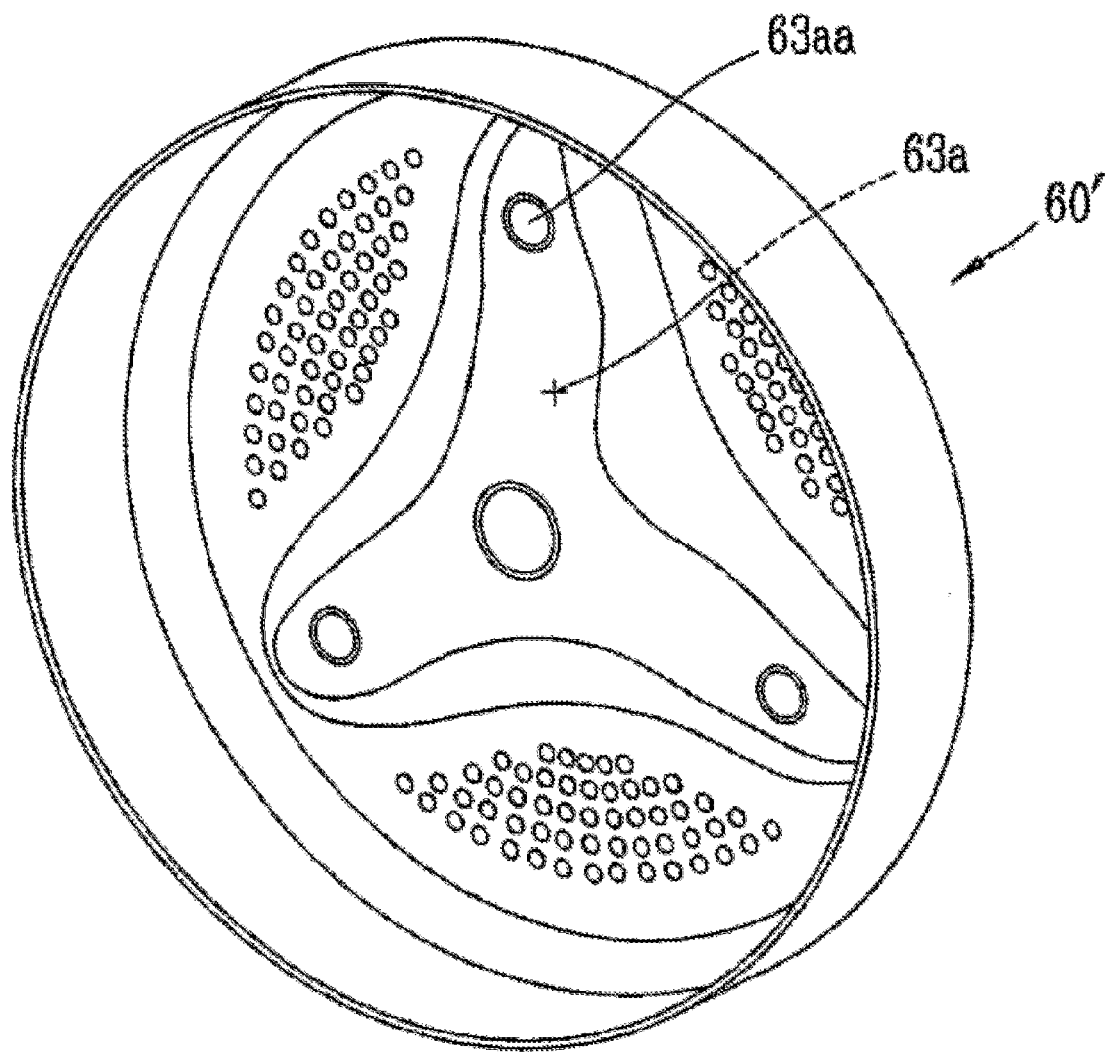
FIGS. 77 to 80 are schematic views showing a sub-drum according to another embodiment of the present invention.
Figure 78:
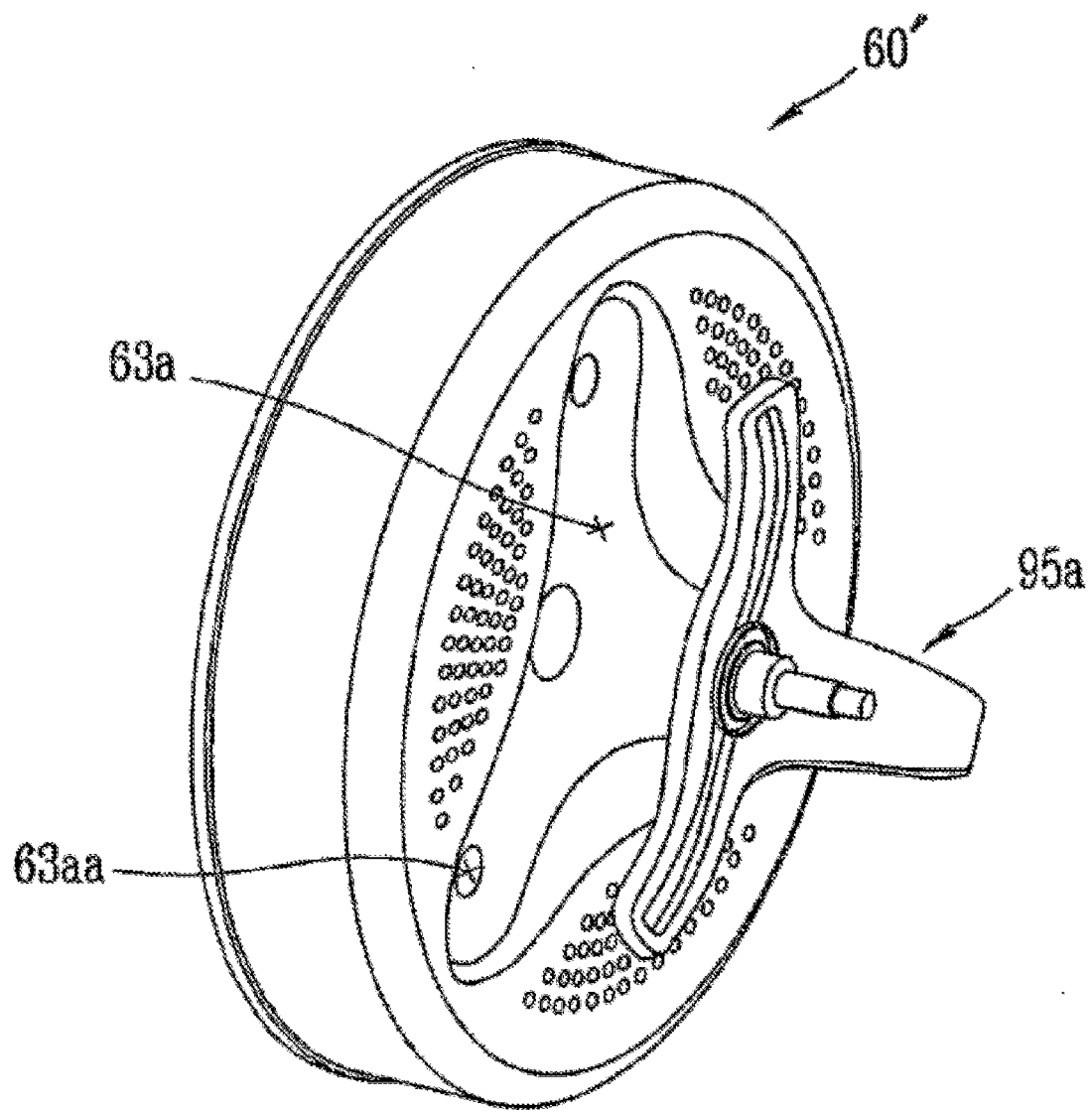

As one exemplary embodiment, FIGS. 77 and 78 show a sub drum having an integral structure of a cylindrical portion and a drum back. As shown in FIGS. 6 and 7, the sub drum 60' may have the cylindrical portion and the drum back which are integrally formed with each other as one member. When molding the sub drum 60' using the one integral member, several advantages may be obtained, such as an increased strength of the member, and improved durability due to non-existence of separate coupling. Also, vibration may be reduced or avoided because any collision is not caused between assembly components due to vibration, which is generated during high speed rotation of the drum of the washing machine.

In this exemplary embodiment, since the sub drum 60' has to be molded using the one member, a contact portion between the cylindrical portion of the sub drum and the outer circumference of the drum back should be formed in a curved form. Accordingly, an inner space of the sub drum 60' may have a slightly small capacity due to the curved portion. With the integral structure of the sub drum 60', the inner capacity of the drum of the washing machine may be designed by approximately 90 L. Also, the sub drum 60' is fabricated using one member in this exemplary embodiment. This may make it difficult to form drain openings or patterns at the sub drum. Referring to FIG. 78, the receiving portion 63a may include spider coupling openings 63aa for coupling of the sub drum spider 95a. The sub drum spider 95a may have coupling openings corresponding to the coupling openings 63aa of the receiving portion 63a.

The receiving portion 63a may receive the sub drum spider 95a having the plurality of radial cantilevers such that a rotational force of the spider can be transferred to the sub drum. The sub drum spider 95a may be firmly coupled, by coupling bolts or the like, with being inserted in the receiving portion 63a. To this end, the receiving portion 63a may have the coupling openings 63aa, and the spider 95a may have the corresponding coupling openings (not shown in the drawing).

Figure 79:
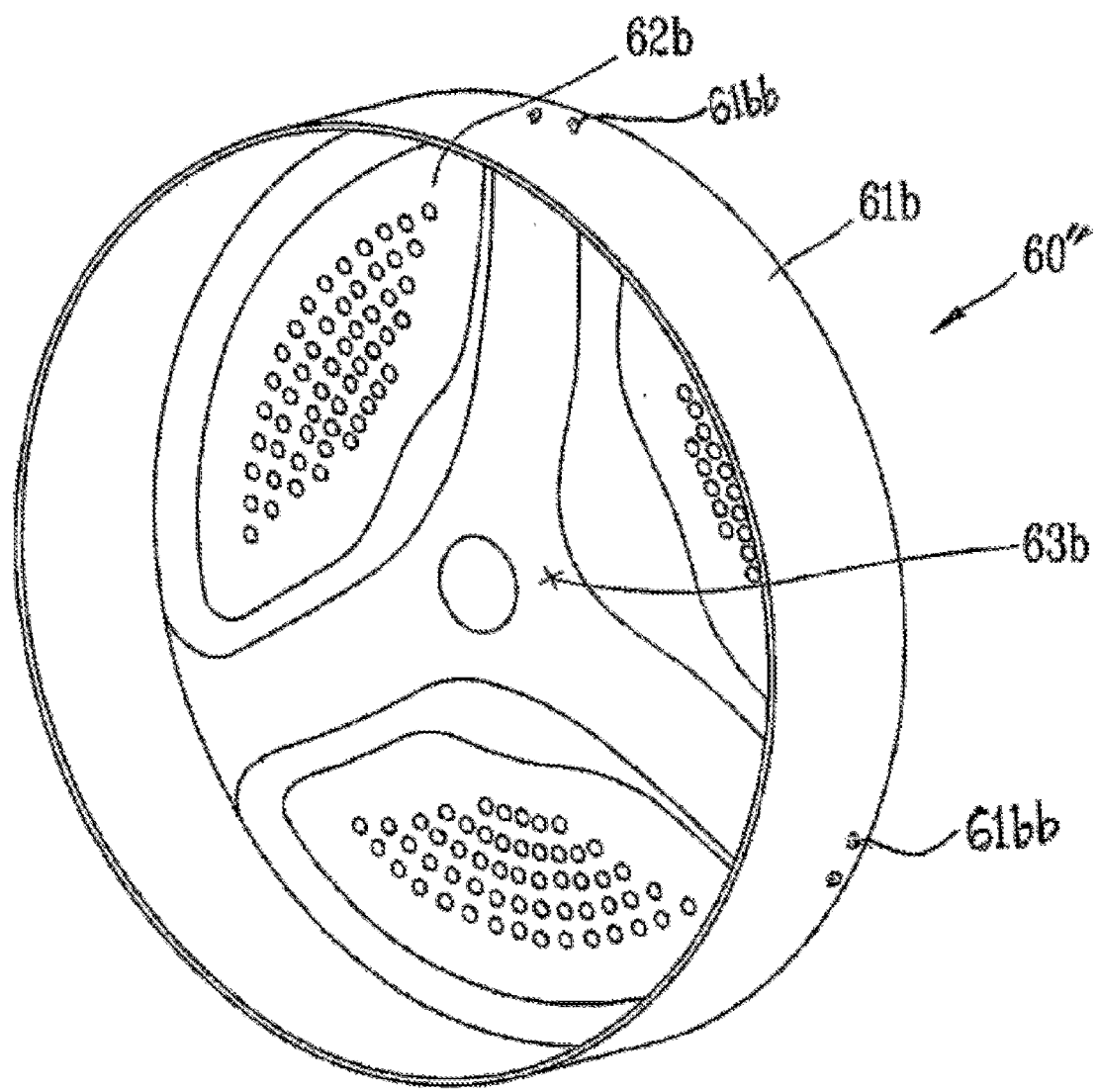
Figure 80:
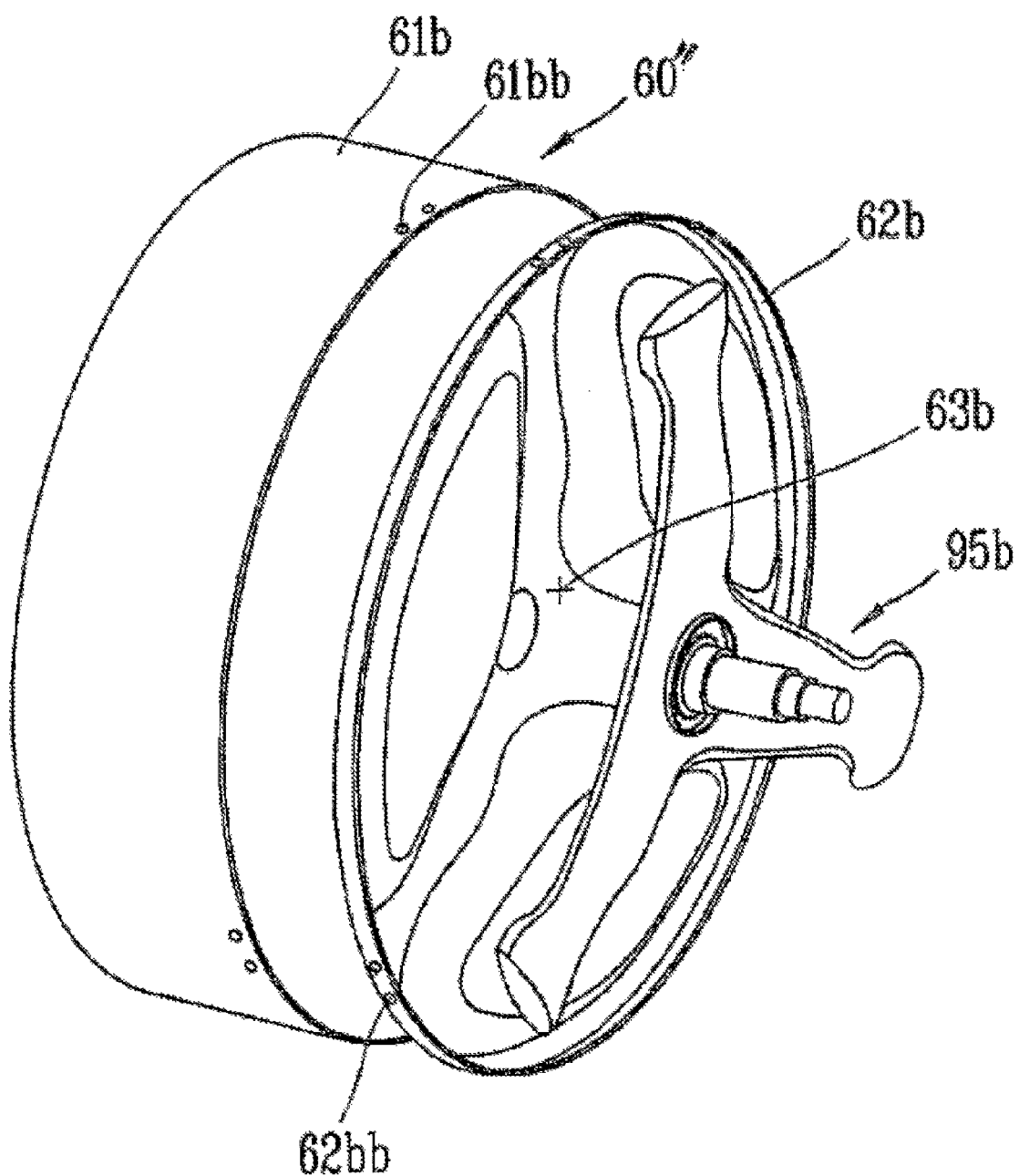

Referring to FIG. 78, preferably, the receiving portion 63a may be formed not to reach (contact) the outer circumference of the sub drum, and the cantilevers of the sub drum spider 95a may be formed to be smaller than a radius of the sub drum back so as to be inserted into the receiving portion. As another exemplary embodiment, FIGS. 79 and 80 show a sub drum having an independent structure of a cylindrical portion and a drum back. As shown in FIGS. 79 and 80, a sub drum 60" may have a cylindrical portion 61b and a drum back 62b as independent members of each other. The drum back 62b may be coupled to an outer circumference of a rear side of the cylindrical portion 61b to close the rear side. Referring to FIG. 80, for coupling of the assembly type sub drum, drum back coupling openings 61bb may be formed at a rear end portion of the cylindrical portion 61b, and the outer circumference of the drum back 62b may be bent in a lengthwise direction of the drum. Cylindrical portion coupling openings 62bb may be formed at the bent portion.

With the structure of the assembly type sub drum, the drum back 62b and the cylindrical portion 61a may be firmly coupled to each other by coupling bolts or the like with the coupling openings 61bb and the coupling openings 62bb aligned with each other. Also, the receiving portion 63b of the drum back 62b may extend up to the outer circumference of the drum back 62b. The cantilevers of the sub drum spider 95b may extend up to the outer circumference of the sub drum back 62b, and end portions of the cantilevers of the sub drum spider 95b may be coupled to the rear outer circumference of the cylindrical portion 61b. Preferably, as shown in FIG. 80, the end portions of the cantilevers of the sub drum spider 95b may be integrally firmly assembled by use of coupling bolts or the like, which are inserted through the coupling openings 61bb and 62bb from the bent portion of the outer circumference of the drum back 62b.

In accordance with the exemplary embodiment shown in FIGS. 8 and 9, comparing with the sub drum with the integral structure, the greater inner space of the drum of the washing machine may be ensured because the curved portion may not have to be formed at the contact portion between the cylindrical portion 61b and the outer circumference of the drum back 62b. When applying the assembly type sub drum of this exemplary embodiment to a dual drum washing machine, an inner space with a capacity of about 94 L may be ensured, increasing the capacity of the sub drum by approximately 4 L as compared with the integral type sub drum. Also, in this exemplary embodiment, the sub drum 60" may be fabricated by assembling the cylindrical portion with the drum back. Accordingly, the processing task such as forming drain openings or patterns at each member may be performed prior to an assembly process. Consequently, the processing of the drain openings and patterns may be facilitated as compared to the sub drum with the integral structure.

However, this exemplary embodiment may allow the independent members to be assembled with each other to fabricate the sub drum 60". This may be disadvantageous as compared to the one integral member in view of the assembly strength of the members. Also, the collision between assembly components may be caused due to vibration generated during high speed rotation of the drum of the washing machine. This may have a disadvantage in view of vibration. Another exemplary embodiment of the present disclosure may provide a method for assembling an assembly type sub drum structure shown in FIGS. 79 and 80.

As shown in FIG. 80, a method for assembling a sub drum of a washing machine may include coupling the drum back 62b, which is disposed on the rear surface of the sub drum and coupled with the sub drum spider 95b, to the cylindrical portion 61b which forms the outer circumferential portion of the sub drum 60". Next, the method may further include receiving the sub drum spider 95b in the spider receiving portion 63b recessed toward the front of the drum back 62b, and coupling the end portions of the cantilevers of the sub drum spider 95b by inserting bolts through the coupling openings formed at the rear end portion of the cylindrical portion 61b of the sub drum and the curved outer circumference of the drum back 62b, respectively.

Meanwhile, referring to FIG. 3, the inner circumferential surface of the main drum is shown having a drum guide 55 to seal an interval from the outer circumferential surface of the sub drum. The drum guide 55 may be provided along the inner circumferential surface of the main drum and seal the interval from the outer circumferential surface of the sub drum. This is for preventing the laundry from being jammed between the drums.

Referring to FIG. 3, the sub drum is smaller than the main drum in radius. The sub drum may accordingly be mounted within the main drum. Hence, some interval may be generated between the inner circumferential surface of the main drum and the inner circumferential surface of the sub drum.

Figure 11:
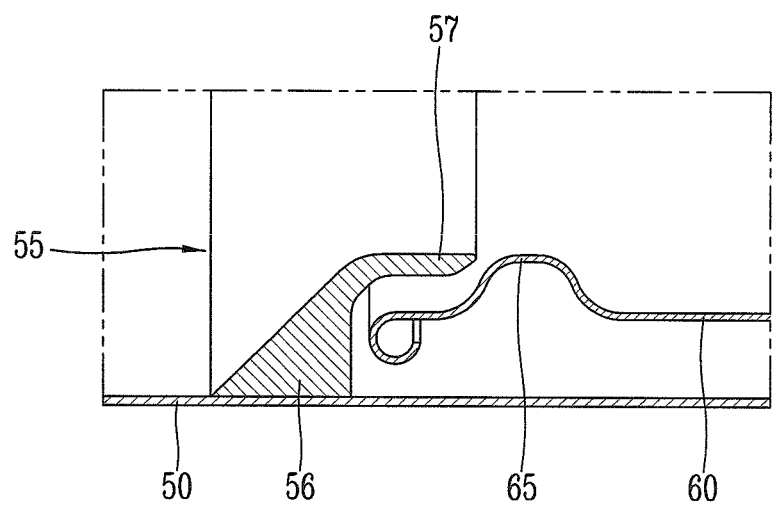
FIGS. 11 to 14 are schematic views showing different exemplary embodiments of shielding a gap (interval) between a main drum and a sub dram.

FIG. 11 shows an exemplary embodiment of the drum guide. The drum guide 55 may include a body portion 56 coupled onto the inner circumferential surface of the main drum to protrude into the main drum, and a guide portion 57 extending toward the inner circumferential surface of the sub drum. As aforementioned, the interval is generated between the inner circumferential surface of the main drum and the inner circumferential surface of the sub drum. The guide portion 57 of the drum guide 55 may seal the interval by extending up to the inner circumferential surface of the sub drum. That is, the inner circumferential surface of the main drum and the inner circumferential surface of the sub drum form a discontinuous surface due to the difference in radius. The drum guide can allow those inner circumferential surfaces to be continuous. Accordingly, the laundry may be prevented from being damaged due to being jammed into the interface between the drums even though generating the aforementioned axial-direction motion in the drums. Especially, when two drums are independently driven as shown in the washing machine of this specification, the main drum and the sub drum perform the relative rotations. Thus, when the laundry is jammed into the interface, there may be much room for causing damage on the laundry, so the drum guide can be more efficient for protection of the laundry.

More preferably, the body portion 56 may have an inclination or curved surface to some degree, thereby forming an easy inclination or continuous surface from the bottom surface of the main drum up to the guide portion 57. With this configuration, the resistance with respect to the axial-direction motion of the laundry within the drums can be reduced, resulting in more smooth motions of the laundry.

Also, a reinforcing bead 65 for preventing torsion of the sub drum may be provided on the inner circumferential surface of the outer circumferential surface of the sub drum. Referring to FIG. 11, the sub drum 60 may preferably be provided with the reinforcing bead 65 protruding into the sub drum along the circumferential surface with being spaced apart from an end portion of the sub drum with a predetermined interval. Of course, the reinforcing bead 65 may protrude toward the outer circumferential surface of the sub drum. The reinforcing bead 65 may serve to prevent the torsion of the drum by reinforcing the strength of the sub drum. Here, the guide portion of the drum guide may extend up to the bead of the sub drum. Therefore, the bead for reinforcing the strength of the sub drum can prevent the inner circumferential surface of the sub drum from being discontinuous, and form the continuous surface to be helpful for the motions of the laundry.

Figure 12:
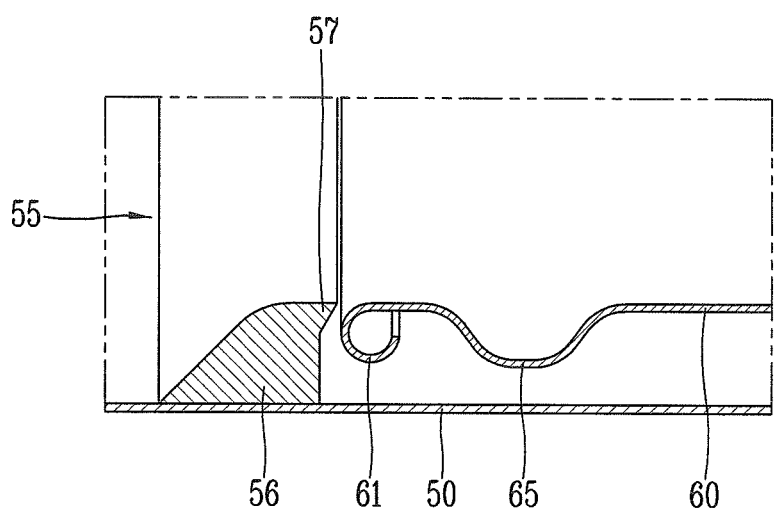

FIG. 12 shows another exemplary embodiment of the drum guide. Referring to FIG. 12, the sub drum 60 may include a bead 65 protruding to the outside of the sub drum along the circumferential surface with being spaced apart from an end portion 61 of the sub drum 60 with a predetermined interval. The guide portion 57 of the drum guide 55 may extend upon the end portion 61 of the sub drum. Unlike the aforementioned exemplary embodiment, the bead 65 does not protrude into the sub drum, so the guide portion 57 does not have to extend up to the bead 65. Hence, the guide portion 57 of the drum guide 55 may extend only up to the end portion 61 of the sub drum. This configuration may prevent the laundry from being jammed into the interface where the main drum and the sub drum independently driven by the drum guide perform the relative rotations.

Figure 13:
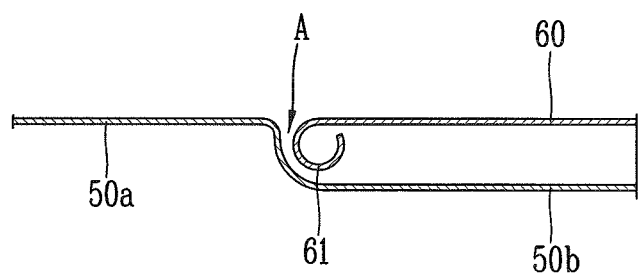

FIGS. 11 and 12 show that the end portion 61 of the sub drum is curled to the outside along the circumferential surface. This is for preventing the laundry from being jammed due to the end portion of the sub drum by way of processing the end portion of the sub drum to have a curved surface. FIG. 13 shows another exemplary embodiment of a washing machine. Referring to FIG. 13, the main drum 50 may be divided into a first portion 50a and a second portion 50b having different inner diameters from each other. Here, the inner diameter of the first portion 50a may be the same as the inner diameter of the sub drum, and the inner diameter of the second portion 50b may be greater than an outer diameter of the sub drum 60. This is intended to extend the part (i.e., 50b) of the main drum such that the radius of the portion 50a of the main drum can be the same as the radius of the inner circumferential surface of the sub drum, whereby the inner circumferential surface of the main drum and the inner circumferential surface of the sub drum can be flush with each other. Here, the sub drum may be mounted inside the second portion 50b of the main drum, to be rotatable within the main drum. Here, the end portion 61 of the sub drum may also be curled to the outside along the circumferential surface, with being located within the second portion 50b.

Figure 14:
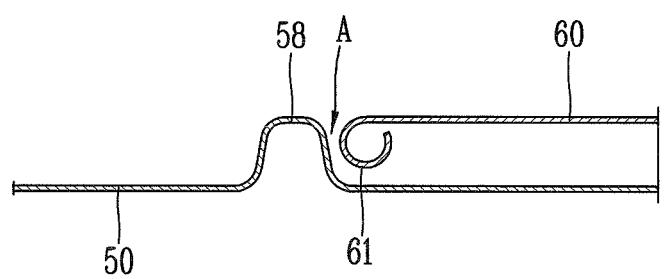

With the configuration, the structure of preventing the laundry from being jammed is produced during formation of the drums without use of a separate guide or the like, thereby shielding the interface between the main drum and the sub drum. Also, the inner circumferential surfaces of the main drum and the sub drum where the laundry contacts can be continuous, thus to reduce resistance against the motions of the laundry, thereby making the laundry moved (rotated) more smoothly. In the meantime, FIG. 14 shows another exemplary embodiment of a washing machine. As shown in FIG. 14, the main drum 50 may further include a drum guide unit 58 protruding into the drum along the inner circumferential surface thereof. In this structure, the inner circumferential surface of the drum guide unit 58 is flush with the inner circumferential surface of the sub drum, thereby shielding the interface between the main drum and the sub drum. The end portion of the sub drum may also be curled to the outside along the circumferential surface, with being located outside more than the inner circumferential surface of the drum guide unit.

A place (position) where the laundry is jammed or the motion of the laundry is disturbed is where an interval is formed due to a difference in radius between the main drum and the sub drum. Hence, the part of the main drum may be formed to protrude before the interface where the interval is formed. Such protruded part may allow the radiuses of the inner circumferential surfaces of the main drum and the sub drum to be the same at the interface between the main drum and the sub drum and be flush with each other. Consequently, the inner circumferential surfaces of the main drum and the sub drum that the laundry contacts may become a continuous surface, whereby the laundry cannot be easily jammed into the interface and the resistance against the motions of the laundry can be reduced, resulting in more smooth motions of the laundry. The structure of preventing the jamming of the laundry can also be produced during the formation of the drums without use of a separate guide or the like. Referring to FIG. 1, a plurality of main drum lifters 101 are protruding from an inner circumferential surface of the main drum toward the inside in a radial direction, and a plurality of sub drum lifters 102 are protruding from an inner circumferential surface of the sub drum toward the inside in a radial direction. This may allow laundry to smoothly move in the drum.

An inner circumferential surface of the main drum may be divided into a first surface 50a not facing an outer circumferential surface of the sub drum, and a second surface 50b facing the outer circumferential surface of the sub drum. The main drum lifters 101 are provided on the first surface 50a. The main drum lifters 101 may be disposed with the same interval therebetween along an inner circumferential surface of the main drum. And, the sub drum lifters 102 may be disposed with the same interval therebetween along an inner circumferential surface of the sub drum. A plurality of lifters are provided on the inner circumferential surface of the drum so that laundry inside the drum may perform 3D motions.

A length ratio of the main drum lifters 101 and the sub drum lifters 102 in an axial direction may be proportional to a length of the first surface 50a of an inner circumferential surface of the main drum, and a length of an inner circumferential surface 60a of the sub drum. Referring to FIG. 3, a length of the main drum lifters 101 in an axial direction may be defined as 'l1', a length of the sub drum lifters 102 in an axial direction may be defined as 'l2', a length of the first surface 50a of the inner circumferential surface of the main drum may be defined as 'd1', and a length of the inner circumferential surface 60a of the sub drum may be defined as 'd2'. In this case, a ratio of l1:l2 may be proportional to a ratio of d1:d2. This is in order to respectively provide the lifters at the main drum and the sub drum having different lengths in an axial direction, and to allow the lifters to effectively contact laundry.

Figure 15:
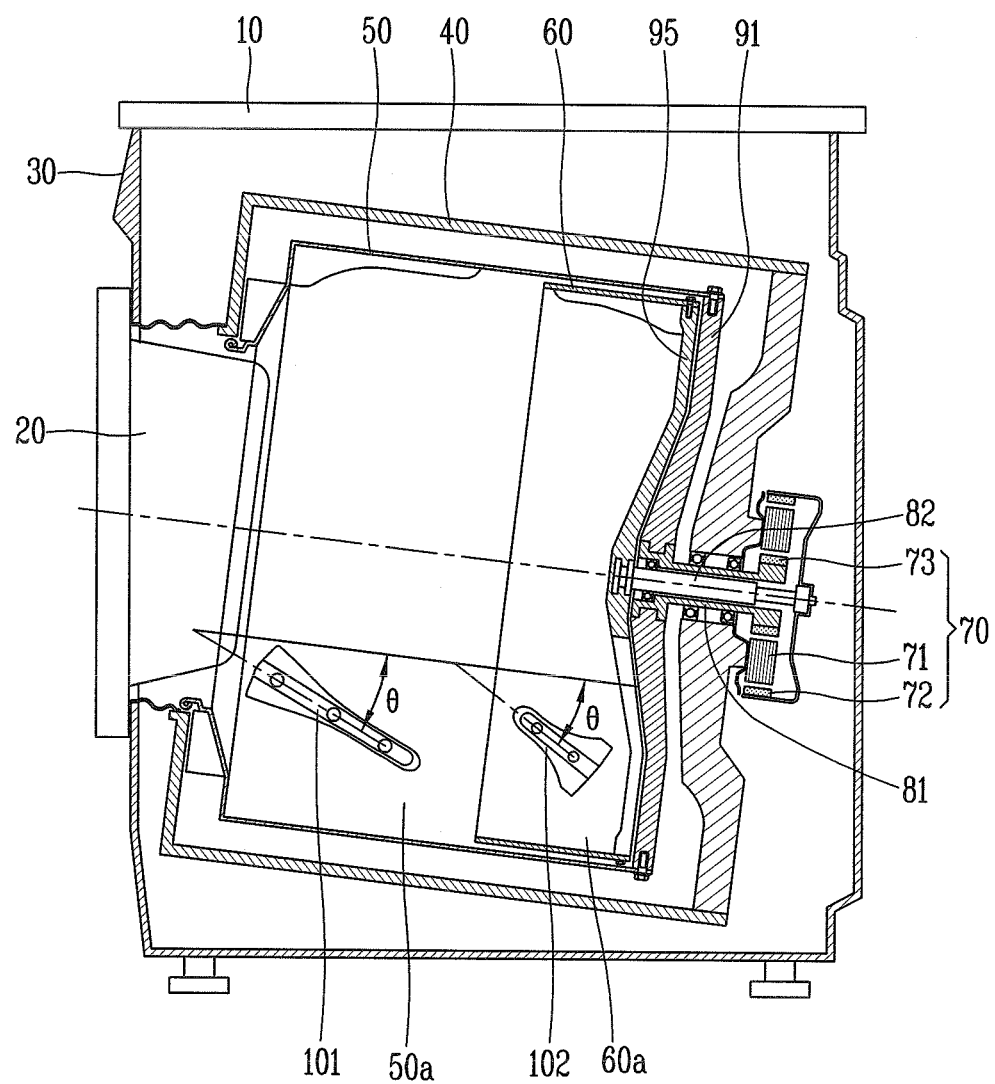
FIG. 15 is a schematic view of a washing machine showing a case that the rotation shaft of the drum is inclined and a case that a lifter has an inclination in accordance with another exemplary embodiment.

Referring to FIG. 3, the main drum lifters 101 and the sub drum lifters 102 are provided in the drum in parallel with an axial direction. However, the present disclosure is not limited to this. For instance, the main drum lifters and the sub drum lifters may be disposed with a predetermined angle from an axial direction. FIG. 15 illustrates that the main drum lifters and the sub drum lifters are disposed with a predetermined angle from an axial direction. Referring to FIG. 15, the main drum lifters and the sub drum lifters are inclined with a predetermined angle (θ) from an axial direction. In this case, a rotation direction of the main drum is determined according to an angle direction of the main drum lifters with respect to an axial direction, and a rotation direction of the sub drum is determined according to an angle direction of the sub drum lifters with respect to an axial direction. That is, a rotation direction of the drum is determined based on an inclined direction of the lifters so that laundry inside the drum may smoothly perform 3D motions by the lifters. When the washing machine of FIG. 15 is viewed from an introduction opening side, the main drum 50 clockwise rotates but the sub drum 60 counterclockwise rotates. However, the present disclosure is not limited to this. That is, an inclination direction of the lifters may be controlled. Under this configuration, laundry may move in an axial direction toward the center of the drum thus to perform 3D motions when the drum rotates.

Referring to FIGS. 1 and 3, the main drum lifters 101 are backward extending from a front end of the main drum, and the sub drum lifters 102 are forward extending from a rear end of the sub drum. And, the main drum lifters and the sub drum lifters have inclinations which become lower toward the opposite direction. This is in order to prevent laundry to be concentratively disposed at an inner side or an outer side of the drum due to its motions in an axial direction, but in order to allow the laundry to be posited at the center of the drum for 3D motions of the laundry.

Figure 16A:
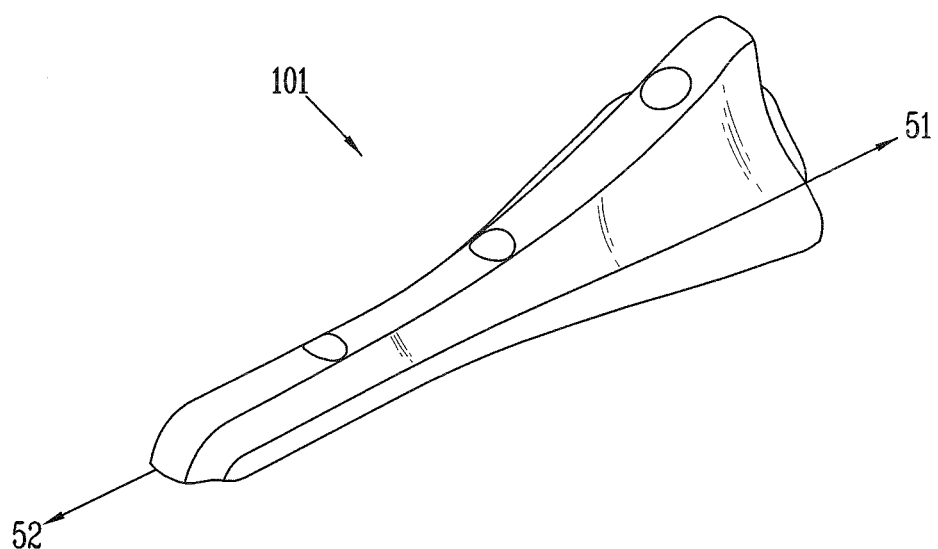
FIG. 16A is a perspective view showing a first example of a main drum lifter.
Figure 16B:
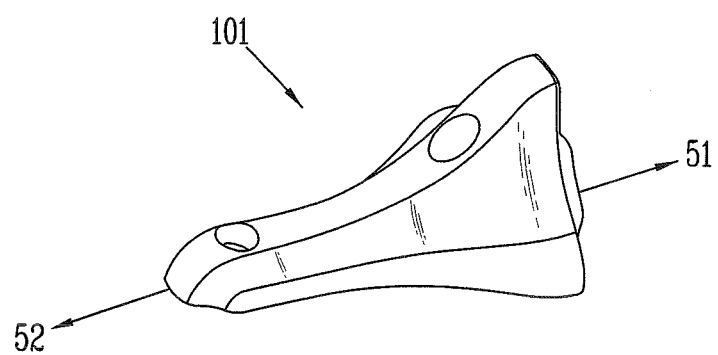
FIG. 16B is a perspective view showing a second example of a main drum liter, formed shorter than the example of FIG. 16A.

FIG. 16 illustrates examples of the main drum lifters 101. Referring to FIG. 16, the main drum lifter of FIG. 16a is longer than the main drum lifter of FIG. 16b in an axial direction. The reason is because a washing machine to which the main drum lifter of FIG. 16a is applied has a greater ratio than a washing machine to which the main drum lifter of FIG. 16b is applied. Here, the ratio indicates a ratio of a length of the first surface 50a of the inner circumferential surface of the main drum in an axial direction, with respect to a length of the inner circumferential surface 60a of the sub drum in an axial direction. Sectional heights in a radial direction of the main drum lifters 101 become lower toward a rear side of the main drum along an axial direction. Referring to FIG. 16 viewed from an introduction opening side of the washing machine, the main drum lifters 101 have heights which become lower toward a rear side 52 from a front side 51 of the main drum.

FIG. 17 illustrates examples of the sub drum lifters 102. Referring to FIG. 17, like the main drum lifters, the sub drum lifters may have different lengths according to a ratio of a length of the first surface 50a of the inner circumferential surface of the main drum in an axial direction, with respect to a length of the inner circumferential surface 60a of the sub drum in an axial direction. Sectional heights in a radial direction of the sub drum lifters 102 become lower toward a front side of the sub drum along an axial direction. Referring to FIG. 17 viewed from an introduction opening side of the washing machine, the sub drum lifters 102 have heights which become lower toward a front side 61 from a rear side 62 of the sub drum. This configuration is implemented in order to allow laundry inside the drum to move in an axial direction thus to perform 3D motions.

Figure 17A:
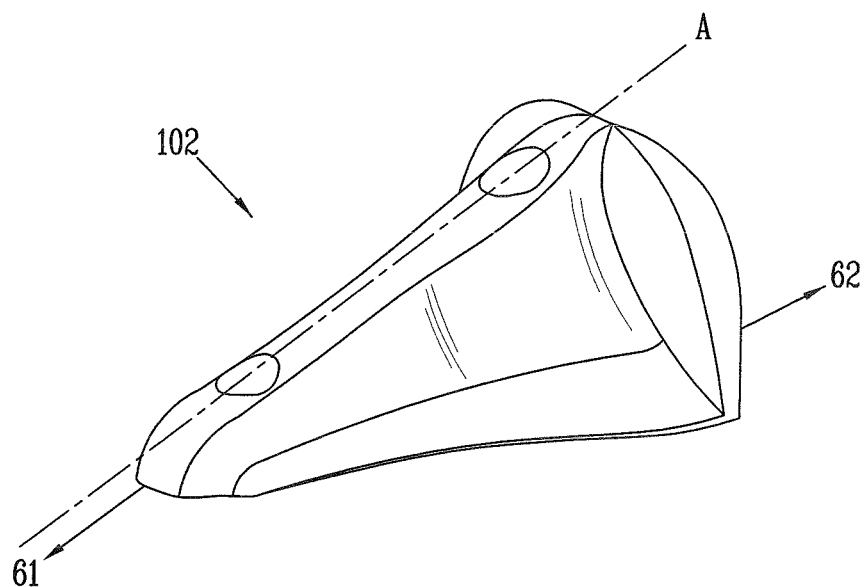
FIG. 17A is a perspective view showing an example of a sub drum lifter in which a straight line type inclination has been applied.
Figure 17B:
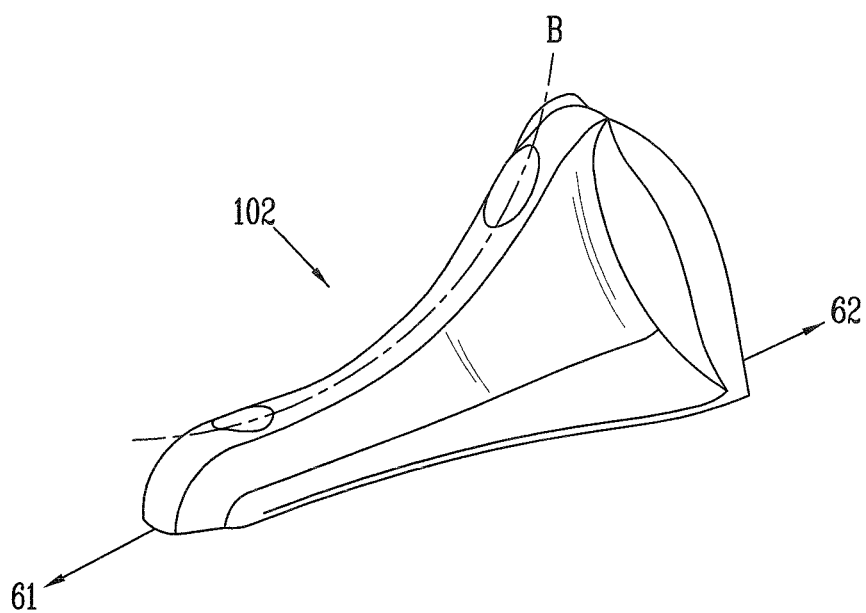
FIG. 17B is a perspective view showing an example of a sub drum lifter in which a curve type inclination has been applied.

The main drum lifters 101 or the sub drum lifters 102 may be formed to have a straight inclination or a curve inclination along an axial direction. FIG. 17 illustrates inclined sub drum lifters. More concretely, FIG. 17a illustrates a sub drum lifter to which a straight line type inclination (A) has been applied, and FIG. 17b illustrates a sub drum lifter to which a curve type inclination (B) has been applied. These various inclination types are implemented so as to allow laundry inside the drum to move in an axial direction to perform 3D motions. In the aspect of functions, the main drum lifters 101 and the sub drum lifters 102 may guide motions of the laundry in a circumferential direction. Since the lifters are protruding from an inner circumferential surface of the drum in a radial direction, laundry may be forcibly moved in a circumferential direction of the drum according to rotation of the drum. Facing inclinations of the main drum lifters and the sub drum lifters may guide motions of the laundry in an axial direction. As aforementioned, these inclinations of the lifters in an axial direction are implemented so as to allow laundry inside the drum to move in an axial direction thus to perform 3D motions. Referring to FIG. 2, a balancer 56 for preventing vibration and an eccentric state of the drum may be provided at the front side 51 of the main drum.

Figure 19:
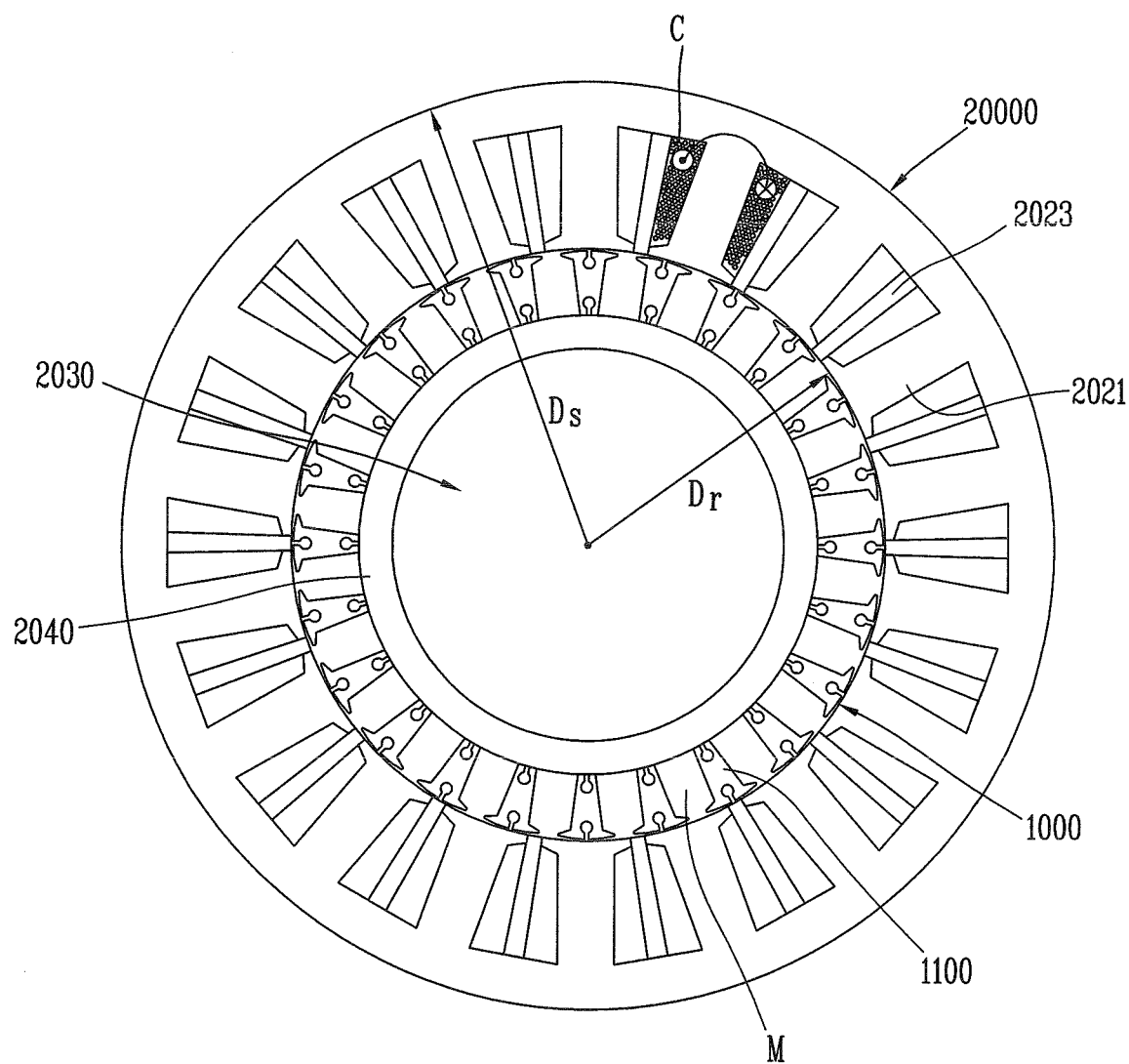
FIG. 19 is a view showing an outer diameter of a stator and an outer diameter of a rotor of a permanent magnet motor according to the present invention.

Hereinafter, a driving motor 70 applied to the washing machine of the present disclosure will be explained in more details with reference to various embodiments. As shown in FIG. 19, a stator 2000 of a permanent magnet motor is formed in a ring shape, and includes stator teeth 2021 protruding towards the core center and stator slots 2023 each formed between the stator teeth 2021. A rotor 1000 is installed inside the stator 2000 in a spaced state from an inner circumferential surface of the stator 2000, and is formed in a ring shape. A coil (C) is wound on the stator teeth 2021, and an induced electromotive force is generated as current flows to the coil (C).

The rotor includes a plurality of rotor teeth 1100 disposed in a ring shape with a constant gap therebetween, and each permanent magnets (M) is installed between the rotor teeth 1100. The rotor teeth 1100 is integrally mounted to a rotor shaft 2030 by a bushing 2040. The rotor teeth 1100 and the busing 2040 are integrally coupled to each other as an injection molding material of the bushing is inserted into a bushing side recess of the rotor teeth 1100. The stator 2000 and the rotor 1000 are disposed to be concentric with each other in a spaced state from each other. The rotor rotates by current applied to the coil (C) wound on the stator teeth 2021, and a magnetic force of the permanent magnet (M) mounted between the rotor teeth 1100.

According to one embodiment of the present invention, there is provided a permanent magnet motor comprising: a stator 2000 including stator teeth 2021 and stator slots 2023, and fixedly-installed as a coil (C) is wound on the stator teeth 2021; and a rotor 1000 including rotor teeth 1100, a permanent magnet (M) and a bushing 2040, the rotor spaced from an inner circumference of the stator 2000 and rotating centering around a rotor shaft 2030 by a magnetic force. A ratio of an outer diameter (Dr) of the rotor 1000 with respect to an outer diameter (Ds) of the stator 2000 is in the range of 0.7~0.8. A rotational force, torque of the rotor of the permanent magnet motor is calculated by the following formula.

$$T \propto k \cdot L_{st} \cdot N_{ph} \cdot R_{ro} \cdot B_g \cdot I$$

T: Torque
k: Constant
Lst: Teeth lamination height
Nph: The number of winding turns of coil
Rro: Outer diameter of rotor (=Dr)
Bg: Magnetic density of permanent magnet
I: Current applied to coil According to the Formula I, torque (T), a rotational force of the rotor is proportional to each lamination height ($L_{st}$) of stator teeth and rotor teeth, and the number of winding turns ($N_{ph}$) of a coil. That is, when the lamination height ($L_{st}$) of the stator teeth is increased, the amount of coil winding is increased. And, when the number of winding turns ($N_{ph}$) is increased, the amount of coil winding is increased. The reason is because the torque (T) is increased as current has higher intensity due to a large amount of current applied to the coil.

The rotor torque (T) is increased as current applied to the coil wound on the outer circumference of the stator teeth is increased. Therefore, current (I) applied to the coil, the teeth lamination height ($L_{st}$) and the number of winding turns ($N_{ph}$), serve as factors to increase the intensity of current. A magnetic force of the permanent magnet (M) is increased in proportion to magnetic density ($B_g$) of the permanent magnet of the rotor, and an outer diameter of the rotor ($R_{ro}=D_r$). Therefore, the torque (T) of the rotor is increased in proportion to the outer diameter of the rotor ($R_{ro}=D_r$) and the magnetic density ($B_g$) of the permanent magnet.

In an assumption that the teeth lamination height ($L_{st}$), the magnetic density ($B_g$) of the permanent magnet, and the intensity of current (I) applied to the coil are constant, the intensity of the torque (T) can be increased by two factors, the number of winding turns ($N_{ph}$) and the outer diameter of the rotor ($R_{ro}=D_r$). Generally, a permanent magnet motor applied to a washing machine has a limited size. Therefore, the teeth lamination height ($L_{st}$) and the outer diameter ($D_s$) of the stator 2000 are limited to some degrees. Furthermore, since the magnetic density ($B_g$) of the permanent magnet and the intensity of current (I) can be arbitrarily input from the outside, they are excluded from the factors when designing the permanent magnet motor of the present invention. Under this configuration, the intensity of torque (T) can be determined by the number of winding turns ($N_{ph}$) and the outer diameter of the rotor ($R_{ro}=D_r$). The number of winding turns ($N_{ph}$) is proportional to the length of the stator teeth 2021 of FIG. 19, which is determined by a ratio between the diameter of the rotor ($D_r$) and the outer diameter ($D_s$) of the stator ($D_r/D_s$).

Figure 20:
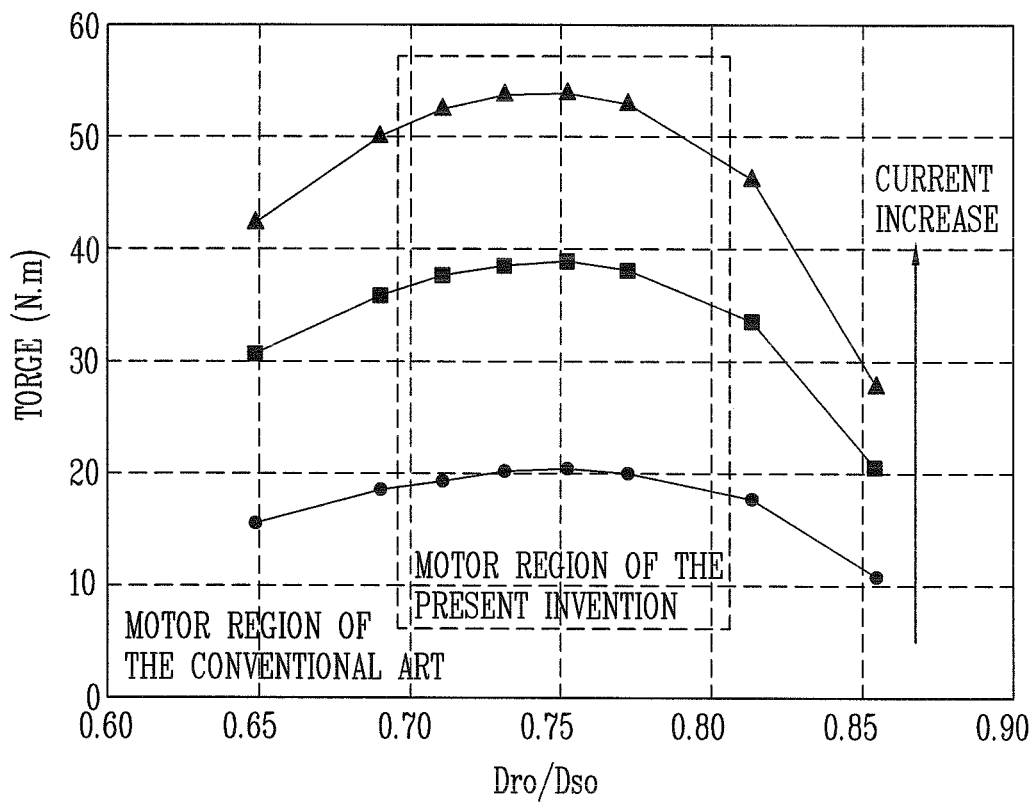
FIG. 20 is a graph showing torque when a ratio between an outer diameter of a rotor and an outer diameter of a stator is in the range of 0.7~0.8.

FIG. 20 is a graph showing a torque value (N·m) of the motor according to the ratio between the diameter of the rotor ($D_r$) and the outer diameter ($D_s$) of the stator ($D_r/D_s$), in a state where the intensity of current (I) applied to the coil has three different values. Referring to FIG. 20, the torque value is maximum when the ratio ($D_r/D_s$) is in the range of 0.7~0.89. In the present invention, the rotational force of the permanent magnet motor is maximized when the ratio between the diameter of the rotor ($D_r$) and the outer diameter ($D_s$) of the stator ($D_r/D_s$) is maintained in the range of 0.7~0.8. According to another embodiment of the present invention, the rotor teeth 1100 includes teeth extension portions 1110 protruding from the right and left sides of the rotor teeth 1100 in an outer diameter direction. The end of the teeth extension portion 1110 has a height (DH) less than 0.3 mm, and a distance (DW) between teeth extension portions 1110 of neighboring rotor teeth 1100 is in the range of 5.5 mm~6.5 mm. Preferably, an outer diameter end portion of the rotor teeth 1100 is formed such that the rotor teeth 1100 have an arc angle of 60°.

Figure 21:
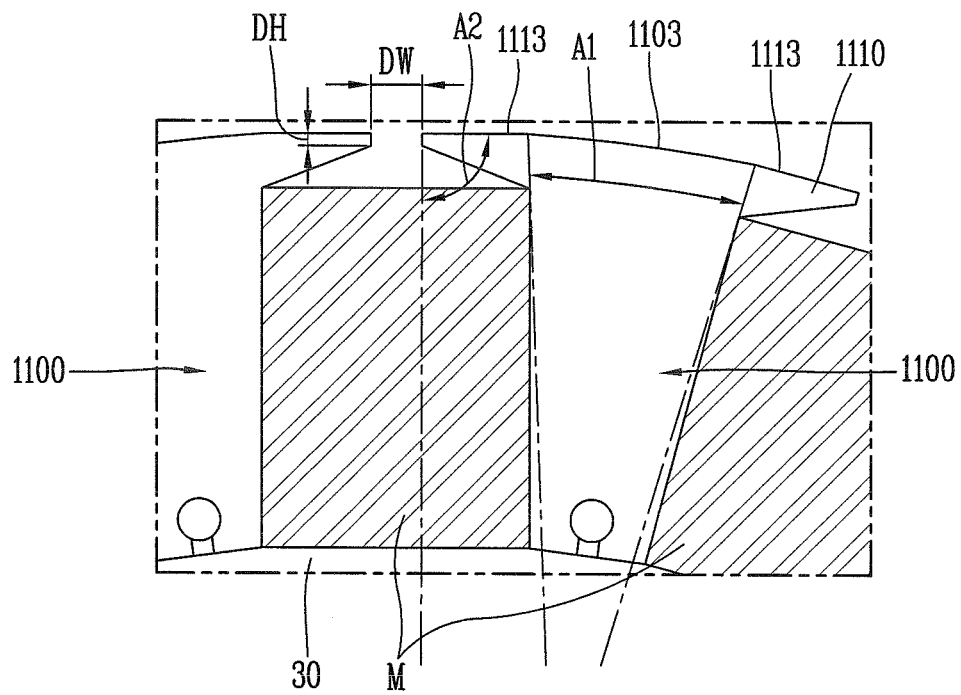
FIG. 21 is a view showing a dimension of a teeth extension portion of rotor teeth according to the present invention.

Referring to FIG. 21, the rotor teeth 1100 of the present invention is provided with teeth extension portions 1110 protruding from the right and left sides of the rotor teeth 1100 in an outer diameter direction. An upper surface of the teeth extension portion 1110 forms a linear portion 1113, and the linear portion 1113 is curved towards a central upper surface 1103 of the rotor teeth 1100 and the core center. The central upper surface 1103 of the rotor teeth 1100 has an arc angle (A1) of 60° so as to minimize cogging torque and torque ripple. As shown in FIG. 21, the height (thickness, DH) of the end of the teeth extension portion 1110 is set to be small so as to reduce cogging torque and the torque ripple. However, the height (DH) is preferably set to be 0.3 mm or less than, as a minimum value for processing.

Figure 22:
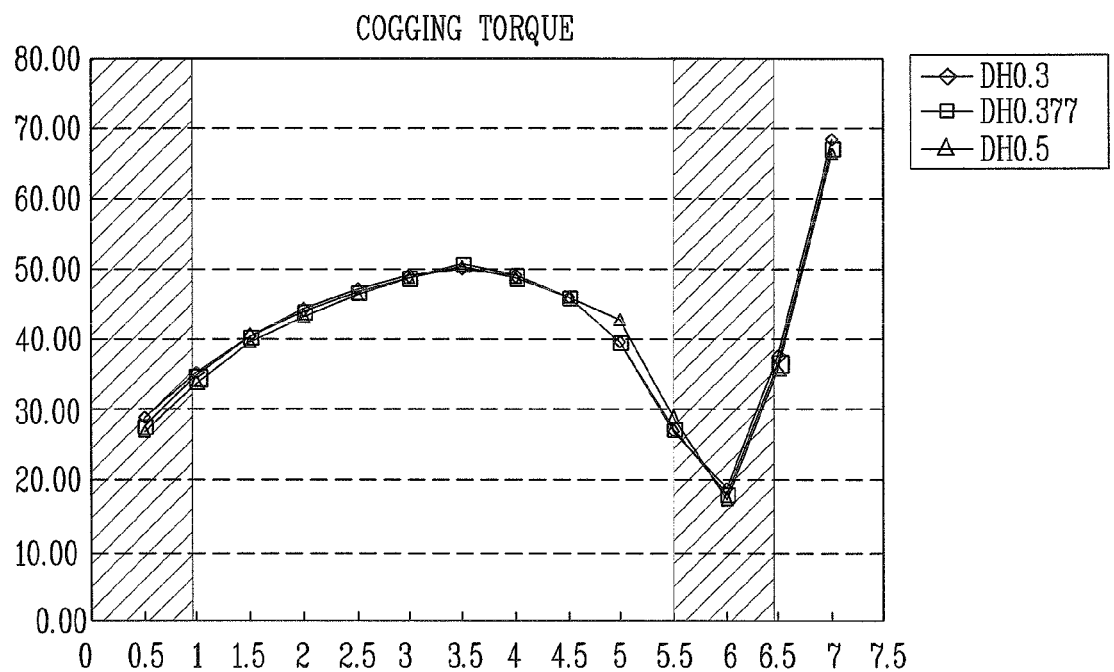
FIGS. 22 and 23 are views showing minimized cogging torque and torque ripple through gap adjustment between teeth extension portions of rotor teeth according to the present invention.
Figure 23:
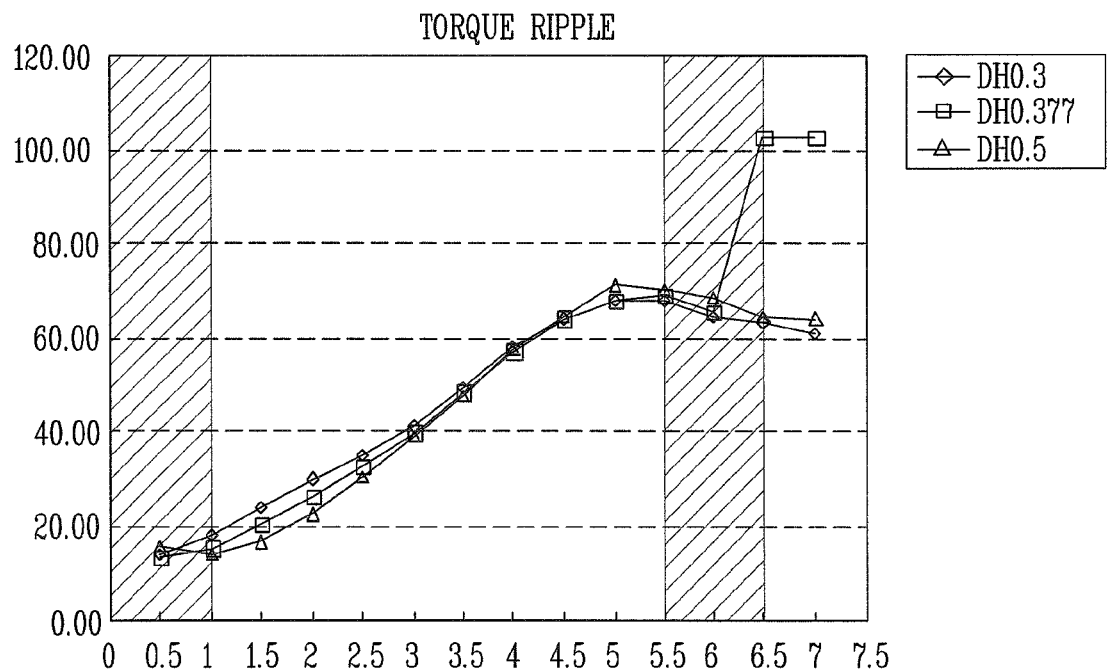

FIGS. 22 and 23 are graphs showing cogging torque and torque ripple according to a distance (DW) between teeth extension portions 1110 of neighboring rotor teeth 1100 of FIG. 21. Referring to FIG. 22, cogging torque is minimum (refer to oblique line) when the distance (DW) between teeth extension portions 1110 of neighboring rotor teeth 1100 is 1.0 mm or less than, or is in the range of 5.5 mm~6.5 mm. As shown in FIG. 23, torque ripple is minimum when the distance (DW) is 1.0 mm or less than. And, the torque ripple is gradually increased, but is decreased when the distance (DW) is in the range of 5.0~6.5. Preferably, the distance (DW) between teeth extension portions of neighboring rotor teeth is 1.0 mm or less than. However, this configuration for fabricating a motor is substantially very difficult. Therefore, the distance (DW) is set to be in the range of 5.5 mm~6.5 mm.

Figure 24:
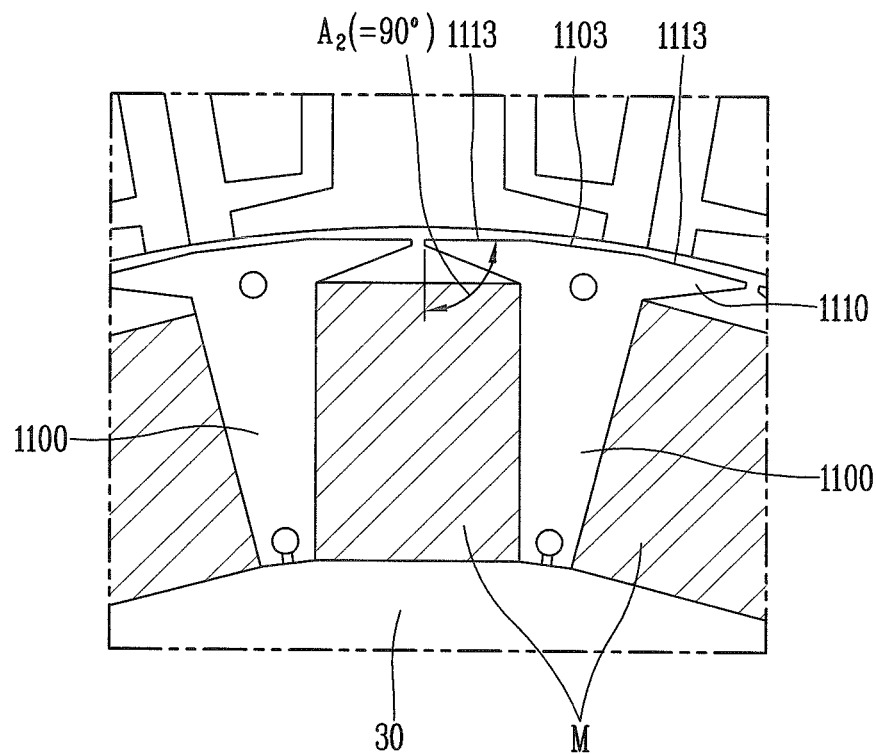
FIGS. 24 and 25 are views showing an angle between rotor teeth and a linear part of a teeth extension portion according to the present invention.
Figure 25:
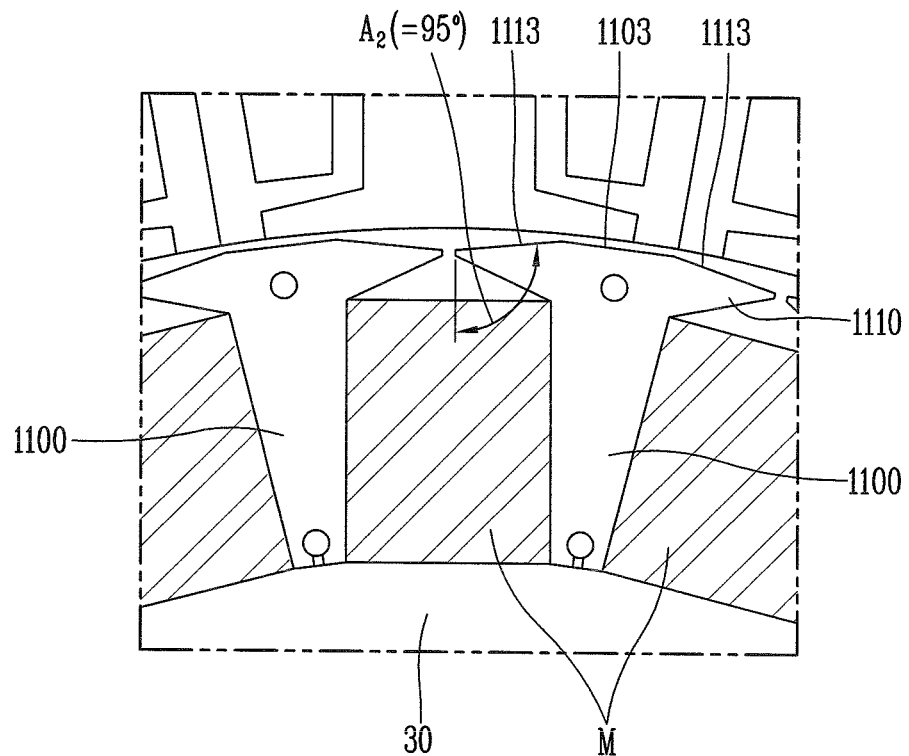

According to still another embodiment of the present invention, the teeth extension portion 1110 of the rotor teeth 1100 is provided with an extension linear portion 1113 on an outer circumference thereof. An angle between the extension linear portion 1113 and a straight line from the end of the teeth extension portion to the core center is in the range of 90°~100°. As shown in FIG. 24) (A2=90° and FIG. 25) (A2=95°, the angle (A2) between the extension linear portion 1113 and a straight line from the end of the teeth extension portion to the core center can be set in various manners. If the angle (A2) is in the range of 90°~100°, cogging torque and torque ripple can be minimized. The occurrence of cogging torque or torque ripple may be influenced by a curved degree of the teeth extension portion 1110 from an inner diameter of the stator 2000 towards the core center. That is, when the teeth extension portion 1110 is formed to be parallel to the inner diameter of the stator 2000, cogging torque can be reduced due to no leakage of magnetic flux. However, in this case, it is difficult to reduce vibrations and noise due to torque ripple. On the other hand, when the teeth extension portion 1110 is excessively curved towards the core center, torque ripple can be reduced. However, in this case, it is difficult to prevent leakage of magnetic flux and reduce cogging torque. This may result in the occurrence of large cogging torque. In the present invention, the angle (A2) is set to be in the range of 90°~100° for minimization of cogging torque and torque ripple. This can minimize vibrations and noise when the permanent magnet motor rotates, thereby implementing a stable operation.

First of all, a structure of a rotor of the driving motor 70 applied to the washing machine of the present disclosure will be explained in more details. As the driving motor 70 of the washing machine, used is a permanent magnet motor. The rotor structure of the permanent magnet motor is to attenuate vibration due to rotation damping and to decrease cogging torque by improving a shape of an outer circumferential surface of rotor teeth 1100, and to prevent separation of the rotor teeth 1100 and the permanent magnet (M) due to a centrifugal force by a cut recess 1150.

Figure 18:
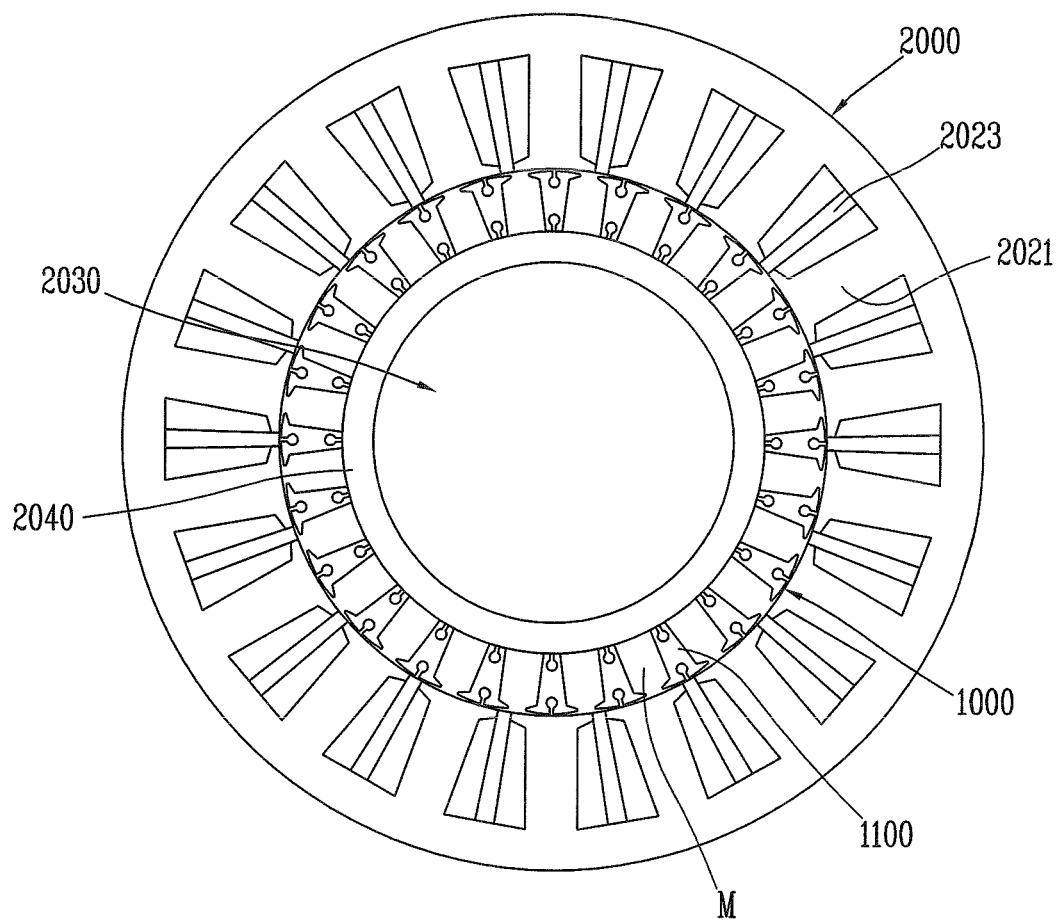
FIG. 18 is a view showing a driving motor applied to the washing machine.
Figure 26:
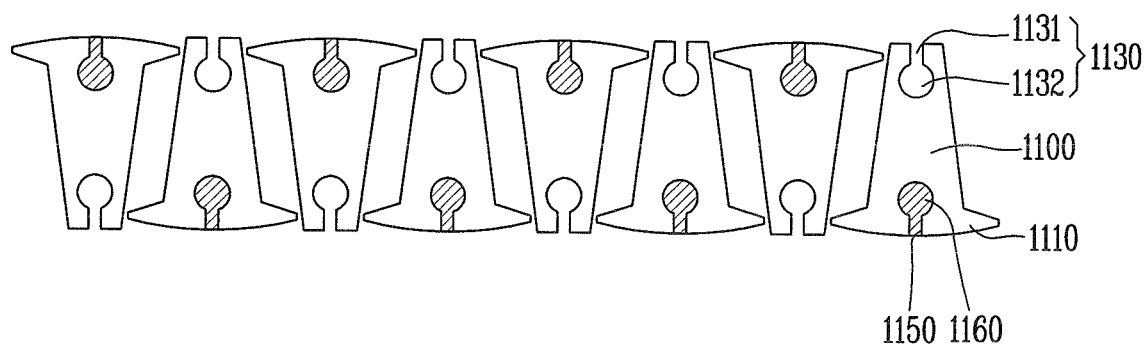
FIG. 26 is a planar view showing an arrangement for fabricating rotor teeth of a driving motor in a punching manner according to the present invention.
Figure 27:
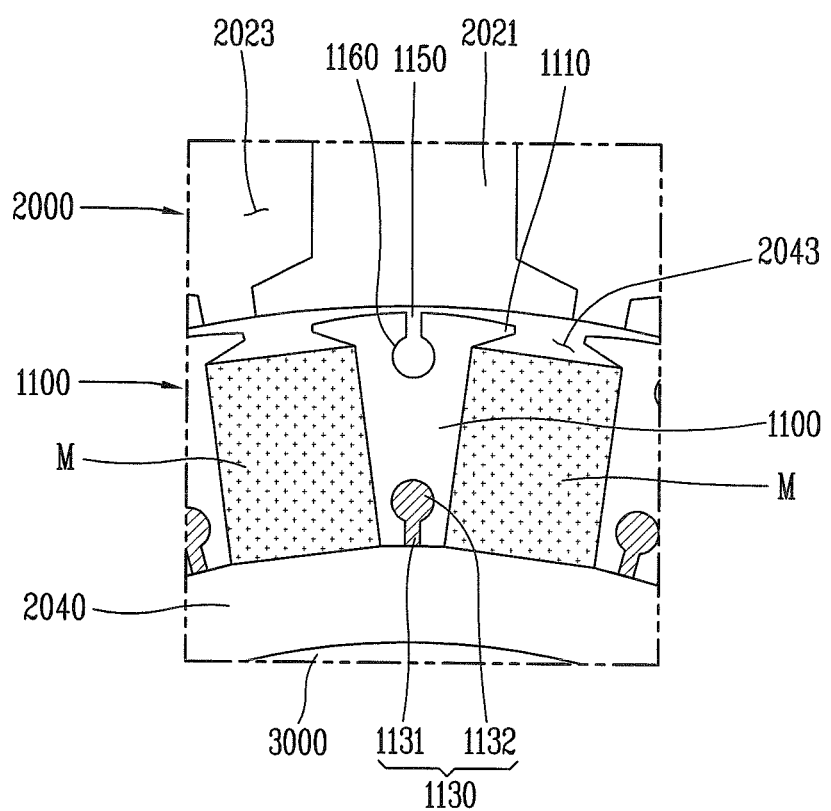
FIG. 27 is a partial view showing a stator and a rotor of a driving motor according to the present invention.
Figure 28:
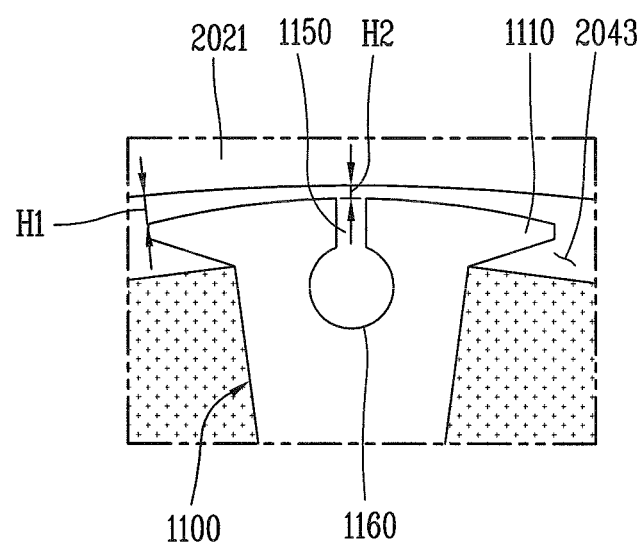
FIG. 28 is a partially detailed view showing a cut recess, a cut hole and an outer circumferential curvature of rotor tooth of a driving motor according to the present invention.
Figure 29A:
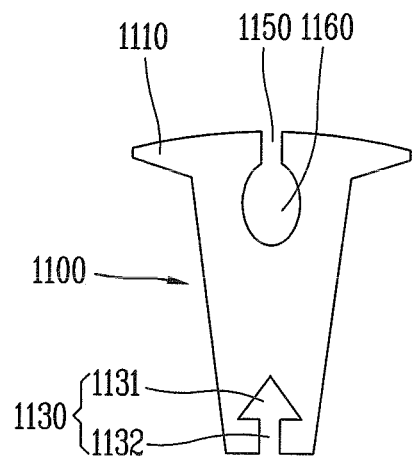
FIG. 29A is a planar view showing a first example of rotor tooth of a driving motor according to the present invention.

Hereinafter, the rotor structure of the permanent magnet motor applied to the washing machine of the present disclosure will be explained in more details with reference to FIGS. 18, 26 to 29. FIG. 18 is a view showing an inner core of the permanent magnet motor applied to the washing machine, FIG. 26 is a planar view showing an arrangement for fabricating rotor teeth in a punching manner, FIG. 27 is a partial view showing a stator and a rotor of the permanent magnet motor, FIG. 28 is a partial detailed view showing a cut recess, a cut opening and an outer circumferential curvature of the rotor tooth, and FIG. 29 is a planar view showing different exemplary embodiments of the rotor tooth.

The permanent magnet motor of the present disclosure includes a stator 2000 and a rotor 1000. The stator 2000 has stator teeth 2021 and stator slots 2023, and fixedly-installed as a coil is wound on the stator teeth. The rotor has rotor teeth 1100, a permanent magnet (M) and a bushing 2040, is spaced from an inner circumference of the stator 2000, and rotates centering around a rotor shaft by a magnetic force. The rotor teeth 1100 consists of a teeth extension portion 1110 extending from a side end of an outer circumference of the rotor teeth in a circumferential direction, a cut recess 1150 cut in a concaved manner from the outer circumference of the rotor teeth toward the center of the rotor shaft, and an insertion recess 1130 cut in a concaved manner in a radial direction from an inner circumference of the rotor teeth, and configured to insert an injection-molding material of the bushing thereinto.

Basic configurations of the stator 2000 and the rotor 1000 have been aforementioned. Therefore, the present disclosure will be explained mainly with the rotor teeth 1100. FIGS. 18, 26 to 29 illustrate a permanent magnet motor having a single rotor structure. However, the permanent magnet motor may have a dual rotor structure including an inner rotor and an outer rotor. As shown in FIGS. 18 and 26, the rotor teeth 1100 is formed in an approximate trapezoid shape, and is formed in a tapered shape such that an upper surface has a predetermined curvature and two sides have widths gradually narrowed toward the downside. The cut recess 1150 is concavely-formed at the center of an upper surface of the rotor teeth 1100, and the insertion recess 1130 is concavely-formed at the center of a lower surface of the rotor teeth 1100. The teeth extension portion 1110 is protruding from an upper part of the rotor teeth 1100 in left and right directions.

Firstly, the fabrication processes of the rotor teeth 1100 will be explained. As shown in FIG. 26, a plurality of the rotor teeth 1100 are disposed to face each other in a zigzag direction, and then are punched. In the present disclosure, the protrusion fixing end is removed from the conventional rotor teeth, and the insertion recess 1130 is inwardly formed to fabricate the rotor teeth 1100 in a punching manner. This may reduce the amount of redundant parts after punching, thereby reducing waste of components and enhancing an economic characteristic.

Referring to FIG. 27, the insertion recess 1130 includes a first insertion recess 1131 through which an injection-molding material of the bushing 2040 is inserted into the rotor teeth 1100, and a second insertion recess 1132 extending from the first insertion recess 1131 to a radial direction of the rotor shaft, and integrally-fixing the bushing 2040 and the rotor teeth 1100 after hardening the injection-molding material of the bushing 2040 inserted thereinto is hardened. The first insertion recess 1131 serves as a path along which a liquid injection-molding material of the busing is inserted. As shown in FIG. 27, the first insertion recess 1131 is concavely formed at an inner side of the rotor teeth 1100. The insertion recess 1130 may be formed in various shapes, and may have any shapes to integrate the bushing 2040 and the rotor teeth 1100 with each other after an injection-molding material of the bushing 2040 inserted thereinto is hardened.

Referring to FIGS. 27 and 29, the second insertion recess 1132 may be formed as a circular or oval through hole having a diameter larger than a width of the first insertion recess 1131. Alternatively, the second insertion recess 1132 may be formed as a polygonal through hole having a width wider than a width of the first insertion recess 1131. Preferably, the second insertion recess 1132 is formed as a triangular through hole, so that the second insertion recess 1132 and the first insertion recess 1131 entirely form a cut opening having an arrow shape. In the present disclosure, a protrusion fixing end formed at an inner side toward the center is removed from the rotor teeth 1100. This may reduce the occurrence of inferiority due to transformation of the protrusion fixing end, may facilitate an assembly, and may prevent leakage of a magnetic flux to the upper side.

Furthermore, the rotor teeth and the bushing 2040 are integrally injection-molded through the insertion recess 1130. This may allow the rotor teeth to be simply assembled with the rotor core. As shown in FIGS. 27 and 28, the cut recess 1150 may be concaved from the center of an upper surface of the rotor teeth 1100. This is in order to reduce inconsecutive rotations of the rotor teeth 1100, the inconsecutive rotations occurring due to a magnetic force difference between the stator slot 2023 and the stator teeth 2021 when the rotor teeth 1100 spaced from the stator 2000 rotates by a magnetic flux formed by the coil wound on the stator teeth 2021 and the permanent magnet. Therefore, the cut recess 1150 is preferably concaved from an upper surface of the rotor teeth 1100.

Figure 29B:
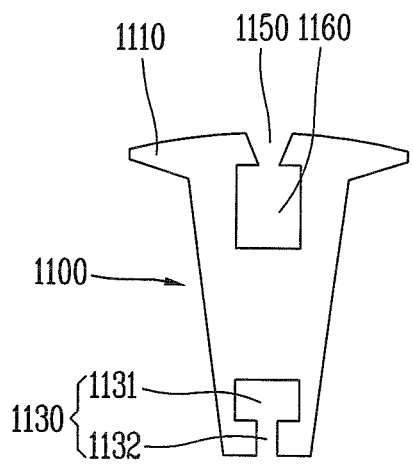
FIG. 29B is a planar view showing a second example of rotor tooth of a driving motor according to the present invention.
Figure 29C:
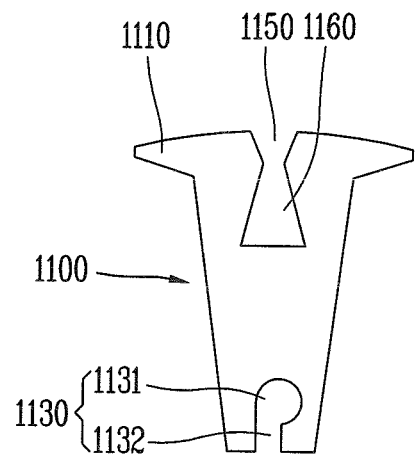
FIG. 29C is a planar view showing a third example of rotor tooth of a driving motor according to the present invention.

As shown in FIGS. 29B and 29C, the cut recess 1150 is cut in a tapered shape that a width becomes narrow toward the center from an upper surface of the rotor teeth 1100, thereby having a controlled distance from an inner circumferential surface of the stator 2000. This may minimize the occurrence of inconsecutive points of a rotational force. The rotor teeth 1100 may further include a cut opening 1160 extending from the cut hole 1150 toward the center, and forming a flux barrier as an injection-molding material of the bushing is filled therein. Preferably, the cut opening 1160 which forms a flux barrier is formed in a circular or oval shape having a diameter larger than a width of the cut recess 1150, so as to prevent leakage of a magnetic flux of the permanent magnet (M) positioned between the rotor teeth 1100 and the rotor teeth 1100.

A magnetic flux is formed on the rotor teeth 1100 by a magnetic flux of the permanent magnet (M) positioned between the rotor teeth 1100 and the rotor teeth 1100. And, the rotor teeth 1100 has a rotational force by a magnetic flux formed by the coil wound on the stator teeth 2021 and the permanent magnet (M). In order to maximize a magnetic force between the rotor teeth 1100 and the stator teeth 2021, leakage of a magnetic flux of the permanent magnet (M) is preferably minimized. Therefore, an additional flux barrier is generally installed at the teeth extension portion 1110 of the rotor teeth 1100.

However, in the present disclosure, the cut opening 1160 is additionally formed at a point extending from the cut recess 1150 of the rotor teeth 1100, and serves as a flux barrier. This may simplify the entire structure and facilitate the fabrications. Preferably, the cut opening 1160 serving as a flux barrier is formed to have a width greater than that of the cut recess 1150 in order to prevent leakage of a magnetic flux. As shown in FIG. 29, the cut opening 1160 may be formed in various shapes.

As shown in FIG. 28, the cut recess 1150 and the cut opening 1160 of the rotor teeth 1100 are filled with an injection-molding material 2043 of the bushing 2040. This may prevent separation of the rotor teeth 1100 from the rotor core, and may reduce cogging torque as aforementioned. As shown in FIGS. 27 and 28, since a space between the teeth extension portion 1110 of the rotor teeth 1100 and the permanent magnet (M) is filled with the injection-molding material 2043 of the bushing 2040, the rotor teeth 1100 and the permanent magnet (M) are integrally fixed to each other. This may prevent separation of the rotor teeth 1100 from the rotor core due to a centrifugal force.

Referring to FIG. 28, an outer circumferential end of the rotor teeth 1100 has a curvature larger than that of the annular rotor. This may change a spacing distance between an outer circumferential surface of the rotor teeth 1100 and an inner circumferential surface of the stator 2000. More concretely, a spacing distance between an outer circumference of the rotor teeth 1100 and an inner circumference of the stator 2000 is controlled by setting a curvature of the teeth extension portion 1110 to be different from that of a curvature of the rotor core. This may attenuate vibrations by rotation damping, and may reduce cogging torque. Furthermore, a spacing distance (H1) between two ends of the teeth extension portion 1110 and an inner circumferential surface of the stator 2000 is preferably formed to be longer than a spacing distance (H2) between the end of the cut recess 1150 and the inner circumferential surface of the stator 2000. As shown in FIG. 28, when the rotor 1000 approaches to the stator teeth 2021 while rotating along the outer circumferential surface of the rotor teeth 1100, the spacing distance decreases to 'H2' from 'H1'. As the spacing distance gradually decreases, a magnetic force gradually increases. Furthermore, as a drastic change of a rotational force is minimized to reduce vibrations.

In the permanent magnet motor of the present disclosure, the rotor teeth 1100 and the permanent magnet (M) are arranged in a ring shape, and an injection-molding material of the bushing 2040 is filled in a space therebetween to be hardened. This may implement the rotor in an integrated manner. Then, the injection-molding material is filled in the cut recess 1150 and the insertion recess 1130 of the rotor teeth 1100, and is filled in a space formed by the teeth extension portion 1110 of the rotor teeth 1100 and the permanent magnet (M). This may fix the core since the rotor teeth and the permanent magnet are integrally formed so as to prevent separation due to a centrifugal force.

Figure 30:
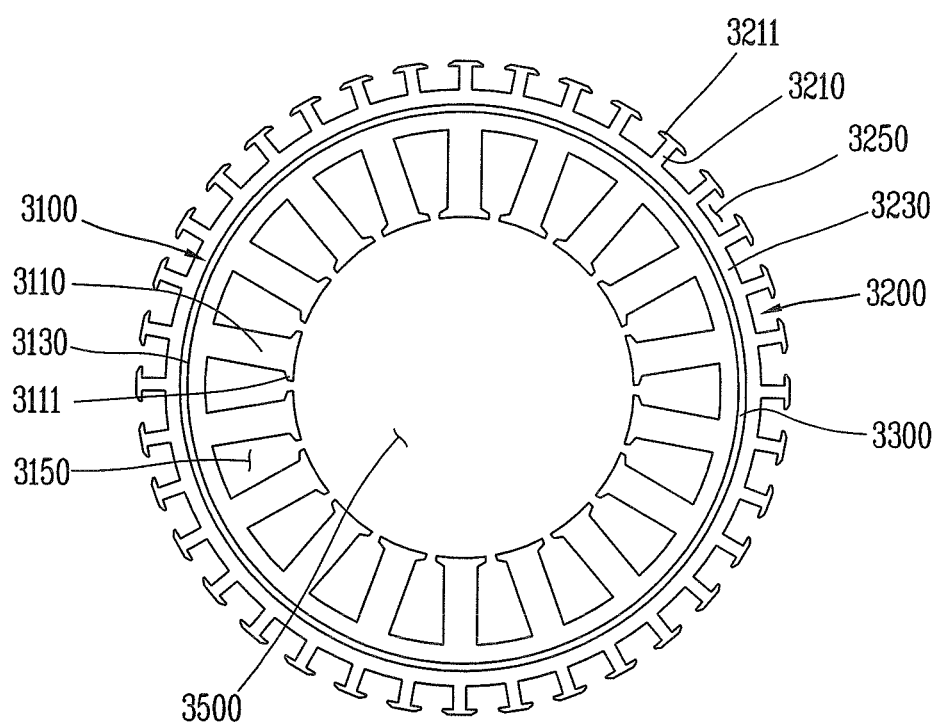
FIG. 30 is a view showing a stator of a dual motor formed by coupling of an inner stator and an outer stator of a driving motor according to the present invention.

Before explaining a method for fabricating a dual motor stator of the driving motor 70 applied to the washing machine of the present disclosure, will be explained a configuration of a dual motor stator of the present disclosure. Referring to FIG. 30, the dual motor stator of the present disclosure includes an inner stator 3100 including a plurality of inner teeth 3110 protruding toward the center in a ring shape, an inner yoke 3130 which forms a ring shape of an inner stator, and inner slots 3150 serving as spaces between the inner teeth 3110 and the inner yoke 3130; an outer stator 3200 including a plurality of outer teeth 3210 protruding in a radial direction in a ring shape, an outer yoke 3230 contacting an outer circumferential surface of the inner yoke 3130 and forming a ring shape of the outer stator, and outer slots 3250 serving as spaces between the outer teeth 3210 and the outer yoke 3230; and an insulator 3300 installed between an outer circumferential surface of the inner yoke 3130 and an inner circumferential surface of the outer yoke 3230, and shielding a magnetic force.

As shown in FIG. 30, the inner stator 3100 is provided therein with an inner rotor mounting portion 3500 for mounting an inner rotor, and is provided with a rotor shaft at the center thereof. The inner stator 3100 includes an inner yoke 3130 formed in an annular (annular) belt. A plurality of the inner teeth 3110 are protruding, toward the center, from an inner circumferential surface of the inner yoke 3130 of the inner stator 3100 with a predetermined gap therebetween. The inner teeth 3110 is provided with an inner teeth extension portion 3111 extending from right and left sides thereof, so that a plurality of the inner slots 3150, spaces formed by the inner teeth 3110, the inner teeth extension portions 3111 and the inner yoke 3130 may be repeatedly implemented with a predetermined gap therebetween.

As shown in FIG. 30, the outer stator 3200 is formed in a ring shape which encompasses an outer circumferential surface of the inner yoke 3110 of the inner yoke 3100, and is provided with an outer rotor mounted on an outer surface thereof. Although not shown, the outer rotor implements a dual rotor system together with the inner rotor as it rotates. The outer stator 3200 includes an outer yoke 3230 formed in an annular belt. As an outer circumferential surface of the inner yoke 3130 contacts an inner circumferential surface of the outer yoke 3230, an integrated dual motor stator is implemented. On an outer circumferential surface of the outer yoke 3230 of the outer stator 3200, the outer teeth 3210 are protruding in a radial direction with a predetermined gap therebetween.

The outer teeth 3210 is provided with an outer teeth extension portion 3211 extending from right and left sides thereof, so that a plurality of the outer slots 3250, spaces formed by the outer teeth 3210, the outer teeth extension portions 3211 and the outer yoke 3230 may be repeatedly implemented with a predetermined gap therebetween. The insulator 3300 may be installed between an outer circumferential surface of the inner yoke 3130 and an outer circumferential surface of the outer yoke 3230 fixedly-coupled to each other in a facing manner with a gap therebetween. In order to shield an electromagnetic force, the inner yoke and the outer yoke are coupled to each other with a gap therebetween, and an insulating member is preferably inserted to the gap therebetween.

Due to the insulator 3300, a magnetic force between the inner motor and the outer motor is not transmitted. This may implement a dual motor system where the inner motor and the outer motor independently operate. The insulator 3300 may be implemented as a member serving as a flux barrier which shields a magnetic force. Preferably, the insulator 3300 is formed of a PBT-based plastic material. With reference to FIG. 30, will be explained the dual motor stator of the present disclosure, and a method for efficiently implementing a proper torque by differently setting lengths of the outer teeth 3210 and the inner teeth 3220 from each other.

Generally, a coil wound on teeth generates a rotational force in correspondence to a permanent magnet of the rotor. Here, the rotational force is proportional to a magnetic force of the permanent magnet, and the number of windings of the coil. The more increased the number of windings of the coil is, the more increased the rotational force (torque) of the rotor is. According to still another embodiment of the present disclosure, as shown in FIG. 30, the dual motor stator is formed such that a length of the inner teeth 3220 is longer than that of the outer teeth 3210. As the length of the inner teeth 3220 is longer than that of the outer teeth 3210, the number of windings of the coil wound on the inner teeth 3220 is larger than that of the coil wound on the outer teeth 3210.

Since the number of windings of the coil wound on the inner teeth 3220 is larger than that of the coil wound on the outer teeth 3210, a rotational force (torque) of the inner rotor is greater than that of the outer rotor. In the dual drum washing machine of the present disclosure, the inner rotor is connected to an outer shaft to rotate a main drum, and the outer rotor is connected to an inner shaft to rotate a sub drum. Here, the inner rotor of a high torque rotates the main drum, and the outer rotor of a low torque rotates the sub drum. More concretely, in the dual drum washing machine of the present disclosure, the main drum requiring a high torque receives a high torque by the inner teeth 3220 which receives a high rotational force due to its longer length, and the sub drum requiring a low torque receives a low torque by the outer teeth 3210 which receives a low rotational force due to its shorter length. Under this configuration, torques may be effectively applied to the main drum and the sub drum.

Hereinafter, a method for fabricating the dual motor stator according to the present disclosure will be explained in more details with reference to FIGS. 30 to 32. The conventional dual motor stator is fabricated in a punching manner through one integrated inner stator and outer stator. This may cause redundant parts after punching corresponding to the inner slot and redundant parts after punching corresponding to the outer slot to occur. Furthermore, in the conventional method for fabricating a dual motor stator, a dual motor stator of a preset size and shape is punched by integrating the inner stator and the outer stator with each other. As a result, there is a problem that a size and a shape of the dual motor stator cannot be changed. The redundant parts after punching result in wastes of the components and lowering of an economic aspect. Accordingly, the present disclosure proposes a method for fabricating a dual motor stator capable of minimizing the amount of redundant parts after punching and having various shapes and sizes.

The method for fabricating a dual motor stator according to the present disclosure will be explained. As shown in FIGS. 30 to 32, the inner stator 3100 and the outer stator 3200 are individually fabricated in a punching manner. Then, the inner stator 3100 is formed in a ring shape such that the inner yoke 3130 is toward the outside, and the inner teeth 3110 are toward the center. Then, the outer stator 3200 is wound on an outer circumference of the inner stator 3100 in a ring shape such that the outer yoke 3230 is toward the center, and the outer teeth 3210 is toward the outside. The inner stator 3100 and the outer stator 3200 integrated with each other operate as stators positioned at the inside and the outside. An inner rotor 50 is disposed at the inside, and an outer rotor is disposed at the outside.

A method for fabricating the inner stator 3100 and the outer stator 3200 will be explained. A pair of inner stators 3100 are fabricated in a punching manner in a state that the inner teeth 3110 are disposed to be engaged with each other in a lengthwise direction. And, a pair of outer stators 3200 are fabricated in a punching manner in a state that the outer teeth 3210 are disposed to be engaged with each other in a lengthwise direction. This may minimize the amount of redundant parts after punching (B) in the inner stators 3100 and the outer stators 3200, thereby minimizing the loss of components.

Figure 31:
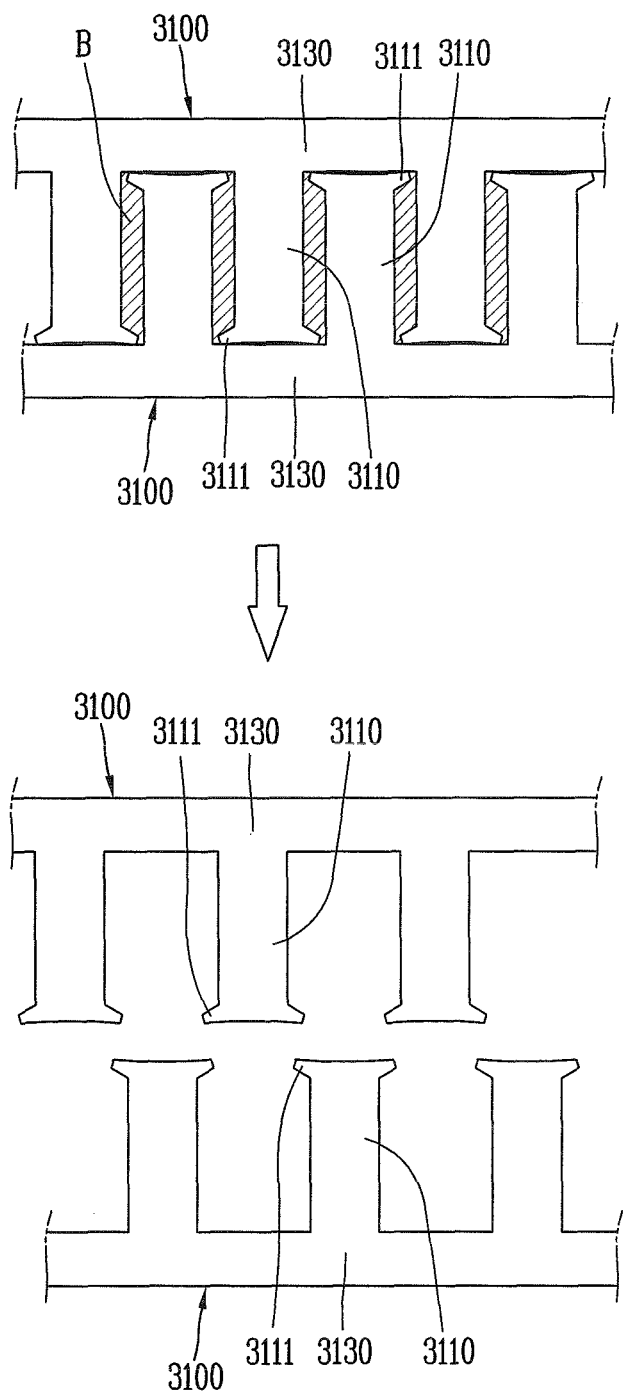
FIGS. 31 and 32 are views showing a method for punching an inner stator and an outer stator in a method for fabricating a stator of a dual motor according to the present invention.

Referring to FIG. 31, the processes for fabricating the inner stator 3100 will be explained. The inner stator 3100 may be fabricated as a straight-line type member extending in a lengthwise direction. A pair of the inner stators 3100 are disposed to face the reciprocal inner teeth 3110, and the inner teeth 3110 are inserted into the inner slots 3150. This may minimize the amount of redundant parts after punching (B) when fabricating the inner stator in a punching manner. As the amount of redundant parts after punching (B) is minimized, wastes of the components may be reduced and an economic aspect may be enhanced.

Figure 32:
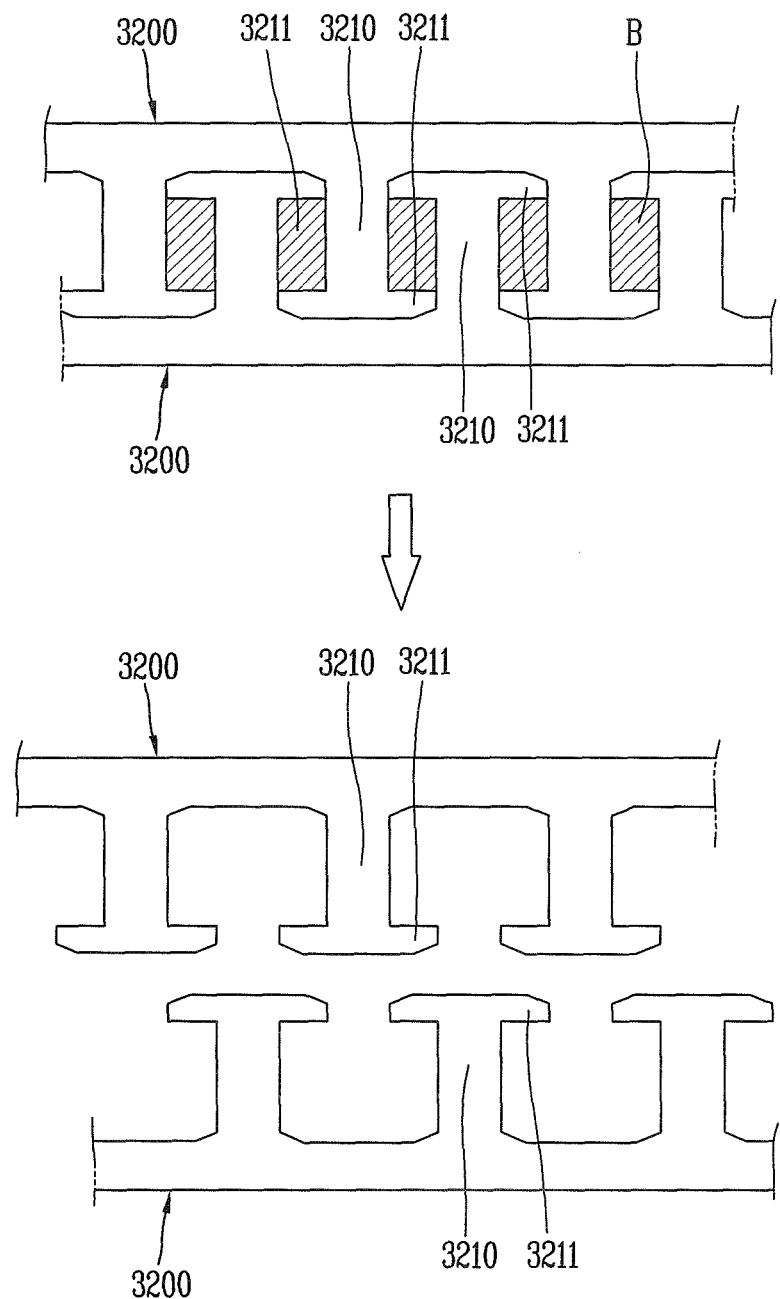

As shown in FIG. 32, the outer stator 3200 is fabricated in the same manner as the inner stator 3100 of FIG. 31. As the amount of redundant parts after punching (B) is minimized, wastes of the components may be reduced and an economic aspect may be enhanced. The dual motor stator of the present disclosure is fabricated by the inner stator 3100 and the outer stator 3200. Firstly, the inner stator 3100 straightly-extending in a lengthwise direction is cut by a predetermined length, and the outer stator 3200 is also cut by a predetermined length. As a result, the dual motor stator of a preset size is fabricated.

Referring to FIG. 30, the inner stator 3100 extending in a lengthwise direction and cut by a predetermined size is implemented in a ring shape as one end and another end thereof are connected to each other. And, the outer stator 3200 extending in a lengthwise direction and cut by a predetermined size is wound on an outer circumference of the inner stator 3100 in a ring shape. An outer circumferential surface of the inner stator 3100 and an inner circumferential surface of the outer stator 3200 are coupled to each other with a spacing distance therebetween due to an insulating distance as the inner yoke 3130 and the outer yoke 3230 face each other.

As shown in FIG. 32, in this integrally-assembled dual motor stator, the inner teeth 3110 of the inner stator 3100 are protruding toward the center to drive the inner rotor. And, the outer teeth 3210 of the outer core 3200 are protruding toward the outside in a radial direction to drive the outer rotor. The inner yoke 3130 and the outer yoke 3230 may be coupled to each other in a state that the insulator 3300 which shields a magnetic force is disposed therebetween. As aforementioned, the insulator 3300 is formed of a PBT-based plastic material such that the inner rotor and the outer rotor operate independently from each other.

Hereinafter, description will be given of a stator structure in accordance with another exemplary embodiment with reference to the accompanying drawings. An inner stator 471a may have a ring shape, and an outer stator 471b of a ring shape may be disposed outside the inner stator 471a. That is, the outer stator 471b may surround an outer circumferential portion of the inner stator 471a. Each of the inner stator 471a and the outer stator 471b may include a plurality of articulated bobbins connected together into a ring shape, a plurality of teeth inserted into the articulated bobbins, respectively, and a tooth ring for annularly connecting end portions of the plurality of teeth.

Figure 33:
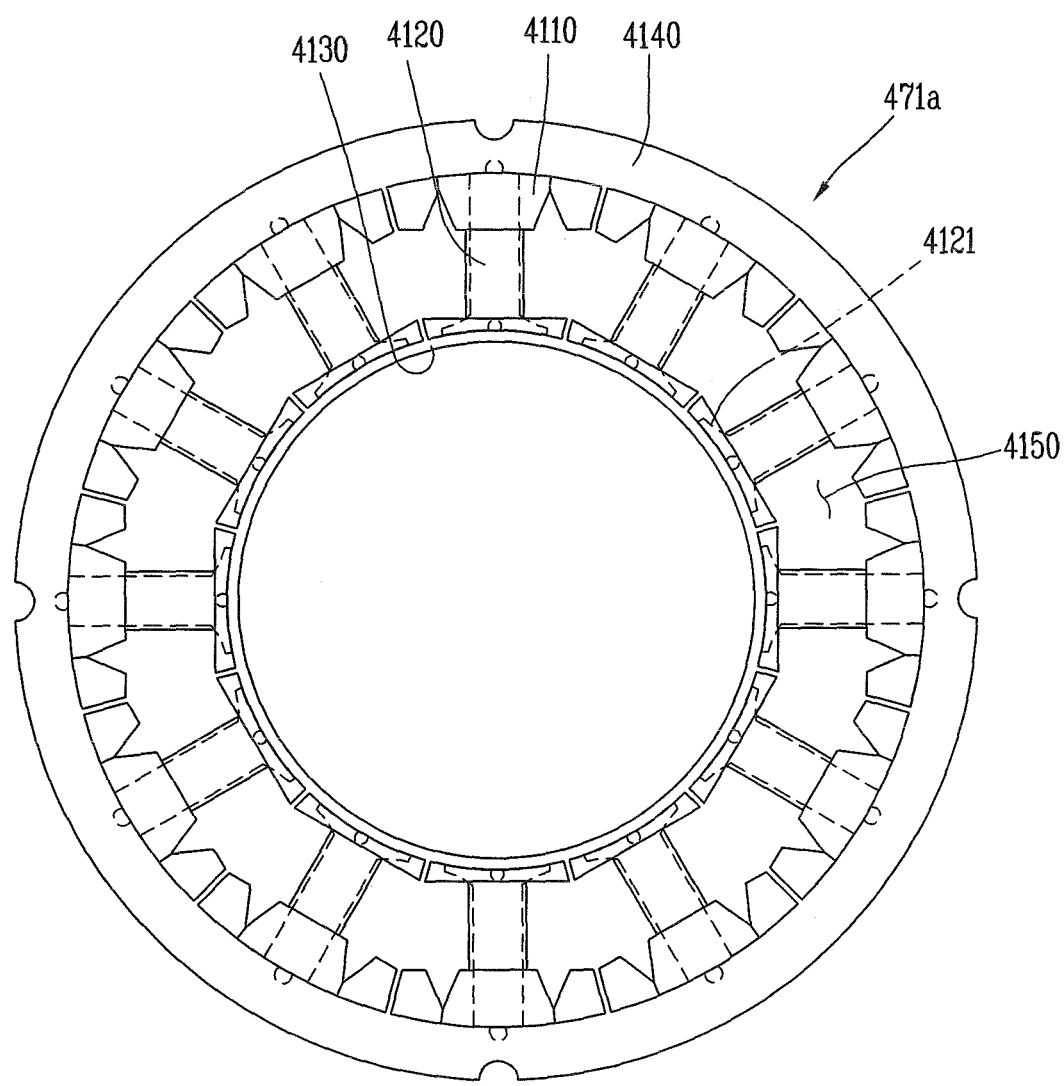
FIG. 33 is a schematic view showing one exemplary embodiment of an inner stator having segment type teeth in a driving motor.

FIG. 33 is an exemplary view of the inner stator 471a of the stators. Without the present disclosure being limited thereto, the outer stator may be formed along the outer circumferential portion of the inner stator of FIG. 33 according to the same method. Also, a wound coil has been omitted from FIG. 33 for helping understanding. As shown in FIG. 33, the inner stator 471a may include a plurality of articulated bobbins 4110 connected into a ring shape, and a plurality of inner teeth 4120 inserted into the plurality of bobbins, respectively. The inner stator 471a may further include a tooth ring 4130 for connecting inner end portions of the plurality of inner teeth 4120 into a ring shape, and an inner yoke 4140 for connecting outer end portions thereof. Similar to the inner stator 471a, the outer stator 471b may also include a plurality of articulated bobbins connected into a ring shape, a plurality of outer teeth inserted into the plurality of articulated bobbins, respectively, a tooth ring for connecting outer end portions of the plurality of outer teeth into a ring shape, and an outer yoke for connecting inner end portions thereof. A flux barrier for shielding a magnetic force may be disposed between the inner yoke and the outer yoke. Typically, the inner yoke and the outer yoke are preferably connected to each other with a spaced distance therebetween in order to shield an electromagnetic force. Therefore, the use of the flux barrier may prevent movement of the magnetic force between the inner stator and the outer stator, which may result in implementation of a dual motor system in which inner rotor and outer rotor can independently work without interference with each other.

In the meantime, when a current is applied to a coil wound on a stator (inner and outer stators), a rotor is rotated by a magnetic field generated by the applied current. Hence, a stator core as a magnetic substance to form a magnetic path may be provided. That is, this exemplary embodiment employs an inner tooth core and an outer tooth core. In FIG. 33, the inner tooth core may include a plurality of inner teeth having a ring shape and protruding toward the center. Here, FIG. 33 shows one exemplary embodiment employing each tooth consisting of a plurality of segment type teeth. Those segment type teeth are stacked to form one inner tooth 4120. Each segment type tooth may include extending portions 4121 extending from an end thereof to both left and right sides.

Figure 34:
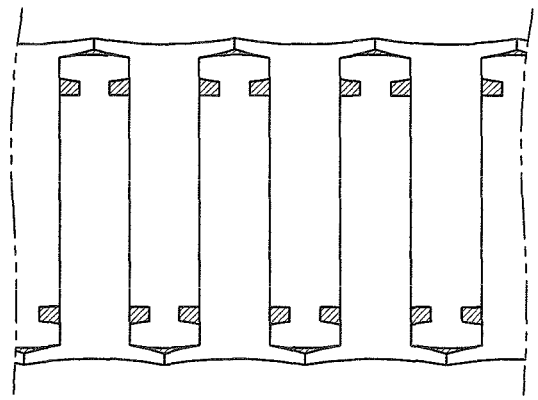
FIG. 34 is a schematic view showing a process of fabricating the segment type teeth.
Figure 34:
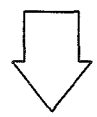
Figure 34:
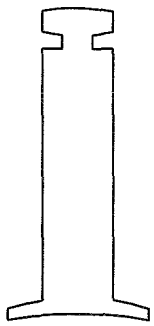
Figure 34:
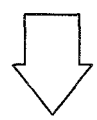
Figure 34:
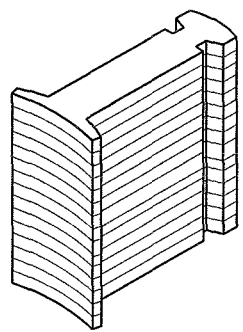
Figure 35A:
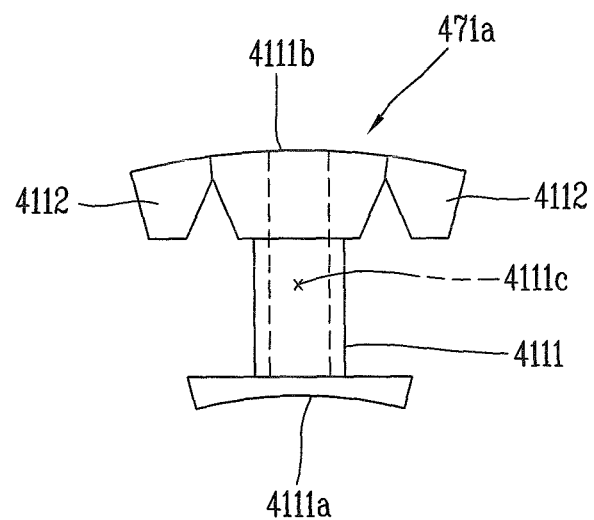
FIG. 35A is a schematic view showing a structure of an articulated bobbin.

FIG. 34 shows a process of stacking segment type teeth constructing the stator core. As shown in FIG. 34, teeth (the upper part of FIG. 34) in the form of a flat plate are punched out (the middle part of FIG. 34) and stacked by one another (the lower part of FIG. 34), thereby forming one inner tooth or outer tooth. The stator teeth of the segment type teeth (the lower part of FIG. 34) stacked in FIG. 34 form a stator core. Each segment type tooth may include extending portions extending from an end thereof to both left and right sides. The stacked teeth, as shown in the lower part of FIG. 34, are inserted into the articulated bobbin 4110. FIG. 35 shows an articulated bobbin. As shown in FIG. 35A, the articulated bobbin 4110 may include a body part 4111 having a receiving portion 4111c in which the corresponding tooth is inserted, and articulated parts 4112 formed at both side surfaces of the body part 4111 to be bent.

The receiving portion 4111c indicates a space formed within the body part 4111. Both end portions 4111a and 4111b of the body part 4111 are open. Therefore, the receiving portion 4111c may be defined as a space having both sides open. The inner tooth or outer tooth may be received in the receiving portion 4111c. In FIG. 33, the segment type inner tooth 4120 is received in the receiving portion 4111c. Here, the inner tooth 4120 is inserted into a lower end portion 4111a of the body part 4111, and the extending portions 4121 of the inner tooth are located at the lower end portion 4111a of the body part 4111.

Figure 35B:
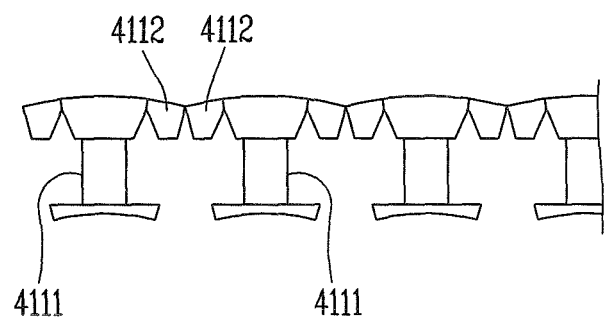
FIG. 35B is a schematic view showing connected state of articulated bobbins.

The articulated bobbin 4110 may be provided in plurality. FIG. 35B shows a state that a plurality of articulated bobbins are connected together. The articulated parts 4112 of the bobbin may be interconnected to the articulated parts 4112 of the adjacent bobbins. That is, the articulated parts 4112 may be bent with respect to the body part 4111, and capable of being coupled to the articulated parts of other bobbins. The coupling between the adjacent articulated parts may be implemented by well-known coupling methods such as hinge-coupling. After inserting the teeth into the articulated bobbins 4110 connected together as shown in FIG. 35B, each of the articulated bobbin 4110 may be wound by a coil. That is, the coil may be wound around the body part 4111 of the articulated bobbin 4110.

The connected form of the articulated bobbins shown in FIG. 35B may be allowed for automatic winding. In the related art, teeth were received in an annular insulator and a coil was wound on the insulator. Accordingly, there was no way but winding the coil inside the annular insulator using a needle. This caused a concentrated winding that the coil wound was concentrated on a specific portion. However, upon use of the articulated bobbins, which can be bent, as shown in FIG. 35B, winding may be allowed by use of an automatic winding machine. This allows an aligned winding that a coil is wound on a circumference of the body part with being well-aligned. This can improve a winding space factor and thereby enhance performance of a driving motor. In addition, when two stators are employed for driving two independent rotors as shown in the present disclosure, the enhancement of the performance of the driving motor by the improvement of the winding space factor may bring an opportunity for size reduction of the driving motor.

Figure 36:
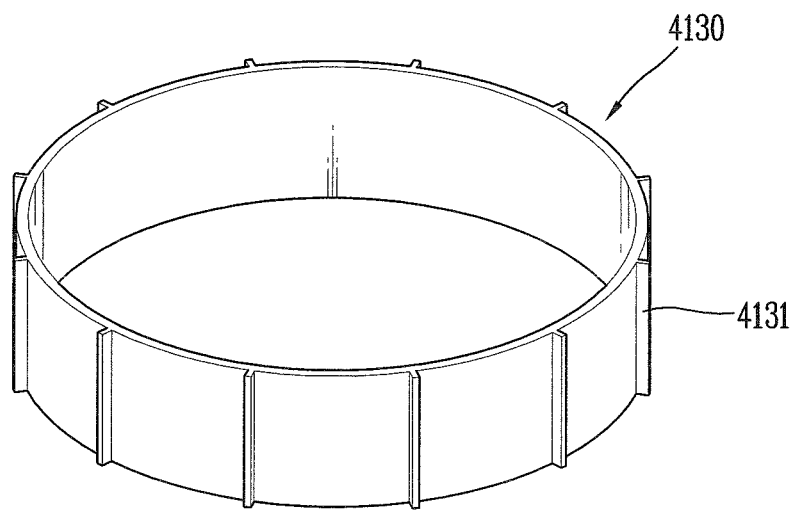
FIG. 36 is a schematic view of a tooth ring.

Meanwhile, the articulated bobbins, in which teeth are inserted and on which the coil is wound, are fixed onto an annular yoke. FIG. 36 shows the inner yoke 4140 having the annular shape. The articulated bobbins are connected to an inner circumferential surface of the inner yoke of FIG. 36. The inner yoke 4140 may include a plurality of connection slits 4141 formed along the inner circumferential surface thereof. Protrusions may be formed at ends of the inner teeth or ends of the articulated bobbins so as to be inserted into the connection slits 4141. FIG. 33 shows the articulated bobbins 4110 connected to the inner yoke 4140. As aforementioned, the outer stator may be formed in the similar manner. That is, the outer yoke of the annular shape is provided and the articulated bobbins are connected to an outer circumferential surface of the outer yoke.

Figure 37:
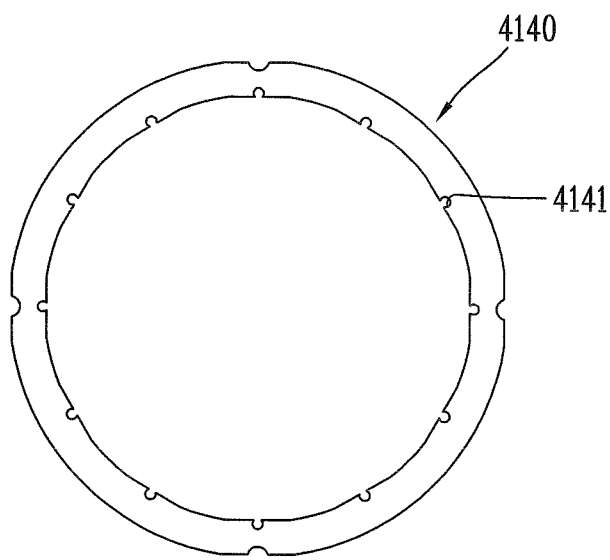
FIG. 37 is a schematic view of an inner yoke.

The tooth ring may be press-fit in another end of the articulated bobbin, opposite to the end connected with the inner yoke. FIG. 37 shows the tooth ring 4130 used in the inner stator. The tooth ring may have a cylindrical shape and include a plurality of protrusions 4131 formed along an outer circumferential subsurface thereof. The protrusions 4131 may be formed to press-fit the tooth ring, and accordingly be press-fitted between the articulated bobbins or in slits formed at the inner teeth. The outer stator may be formed similarly, as aforementioned. That is, a plurality of protrusions are formed along an inner circumferential surface of the cylindrical tooth ring, thus to be press-fitted between the articulated bobbins or the like. The tooth ring may reduce cogging torque and prevent lowering of an output of the driving motor. That is, the cogging torque is generated during rotation of the rotor due to discontinuity of magnetic field, which is caused by an interval between teeth. Such discontinuity may be reduced by virtue of the tooth ring, thereby reducing the cogging torque and preventing the lowering of the output of the driving motor.

With the plurality of articulated bobbins being mounted between the yoke and the tooth ring, the plurality of articulated bobbins can be maintained in a stable mounted state. In FIG. 33, a space may be defined between the body part of the articulated bobbin, which is fixed between the inner yoke and the tooth ring, and a body part of an adjacent articulated bobbin. The space may be referred to as an inner slot 4150. On the inner slot 4150 may be located the coil wound. An outer slot may be formed similar to this, and a coil wound may be located on the outer slot.

Figure 38:
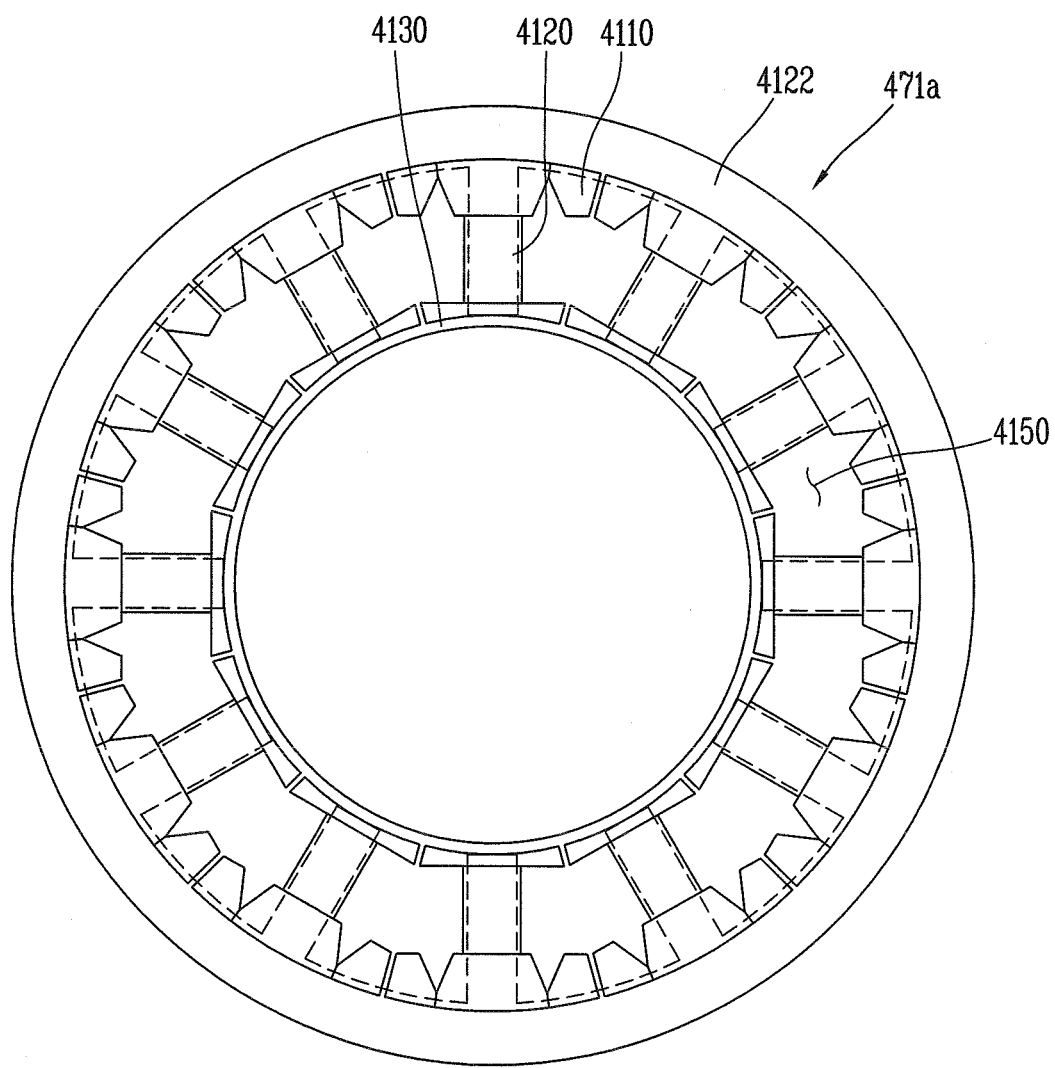
FIG. 38 is a schematic view showing one exemplary embodiment of an inner stator having integral teeth in a driving motor.

FIG. 38 shows another exemplary embodiment of a stator according to this specification, which shows that the teeth are integrally formed with an articulated yoke for connecting end portions of the teeth. In the exemplary embodiment of FIG. 38, overlapped parts with the exemplary embodiment of FIG. 33 will not be repeatedly explained herebelow. FIG. 38 exemplarily shows an inner stator 471a of stators. Without the present disclosure being limited thereto, an outer stator may be formed along an outer circumferential portion of the inner stator according to the same way. Also, for easy understanding, a wound coil is omitted from FIG. 38.

As shown in FIG. 38, the inner stator 471a may include a plurality of articulated bobbins 4110 connected into a ring shape, and inner teeth 4120 inserted into the plurality of articulated bobbins, respectively. The inner stator 471a may further include a tooth ring 4130 for connecting inner end portions of the plurality of inner teeth into a ring shape. However, a separate inner yoke may not be needed because the inner teeth are integrally formed with the articulated yoke 4122. In FIG. 38, an inner tooth core may include a plurality of inner teeth integrally formed with the articulated yoke 4122 and protruding from the articulated yoke 4122. This may be referred to as an integral tooth. The plurality of integral teeth may be stacked to form one inner tooth 4120. This exemplary embodiment illustrates that the integral tooth does not have extending portions extending from an end thereof to both left and right sides. This is because the integral tooth is inserted from an upper portion 4111*b* of the body part of the articulated bobbin 4110 when being inserted into the articulated bobbin 4110.

Figure 39:
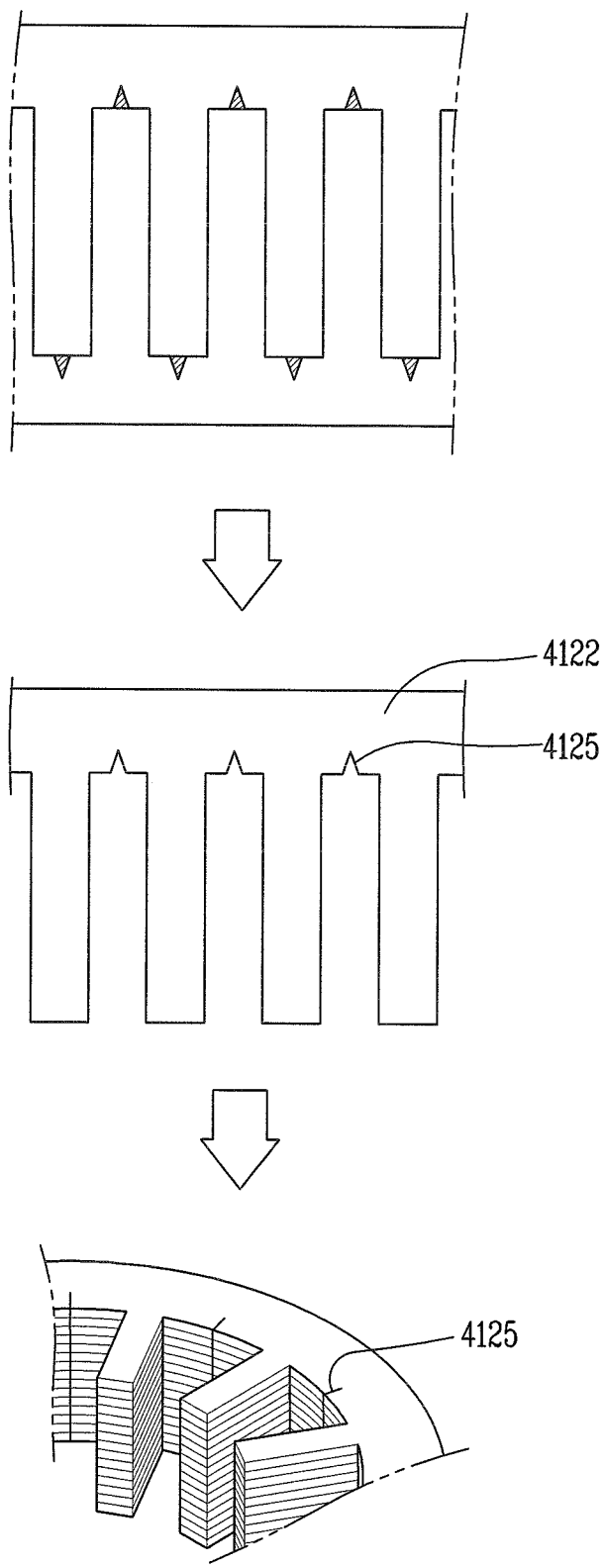
FIG. 39 is a schematic view showing a process of fabricating the integral teeth.
Figure 40:
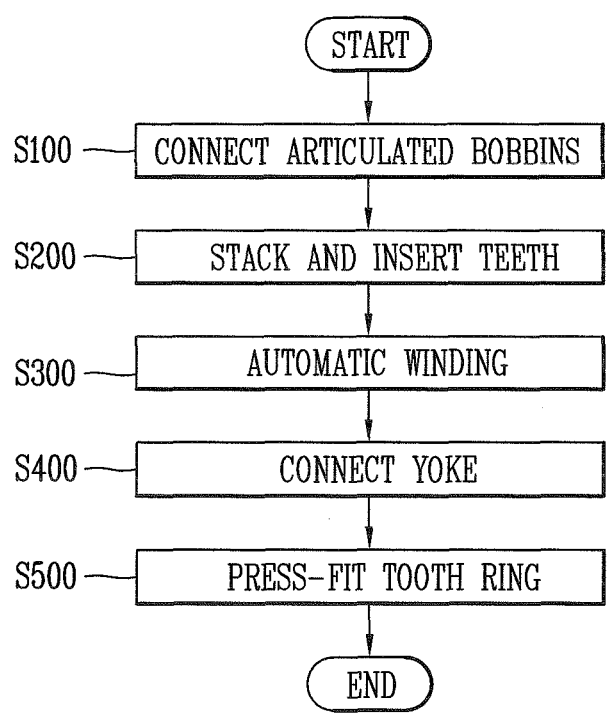
FIG. 40 is a flowchart showing one exemplary embodiment of a method for assembling a stator of a driving motor.

FIG. 39 shows a process of stacking the integral teeth constructing the stator core. As shown in FIG. 39, teeth in the form of a flat plate (the upper part of FIG. 39) are punched out (the middle part of FIG. 39) and stacked by one another (the lower part of FIG. 39), thereby forming one inner tooth or outer tooth. The stacked integral teeth (the lower part of FIG. 39) thus form the stator core. Here, wedge-shaped recesses 4125 may be formed at the articulated yoke 4122. The articulated yoke has to be bent into a ring shape after the integral teeth are inserted into the articulated bobbins. Hence, the wedge-shaped recesses 4125 may form bent portions where the articulated yoke can be bent into the ring shape. The wedge-shaped recesses 4125 may thusly be formed in the direction that the articulated yoke is bent. That is, FIG. 39 shows the process of forming the inner teeth, so the wedge-shaped recesses 4125 may be recessed into an inner surface of the articulated yoke, from which the teeth protrude. However, when an outer tooth is formed, the wedge-shaped recess may be recessed into an outer surface of the articulated yoke.

This exemplary embodiment also allows the tooth ring 4130 to be press-fitted. That is, the tooth ring may be press-fitted in another side of the articulated bobbins opposite to the articulated yoke being located. Therefore, the articulated yoke may be bent into the ring shape, and the plurality of articulated bobbins may be mounted between the articulated yoke of the ring shape and the tooth ring. FIG. 38 shows a space defined between the body part of the articulated bobbin, which is fixed between the articulated yoke and the tooth ring, and a body part of an adjacent articulated bobbin. This space may be referred to as an inner slot 4150. On the inner slot 4150 may be located the coil wound.

FIG. 35 shows an exemplary embodiment of a method for fabricating a stator of a driving motor for a washing machine. As shown in FIG. 35, a method for fabricating a stator of a driving motor for a washing machine according to the one exemplary embodiment may include a bobbin connecting step (S100) of connecting a plurality of articulated bobbins in the form of a belt, a tooth inserting step (S200) of inserting teeth into the plurality of connected articulated bobbins, respectively, an automatic winding step (S300) of automatically winding a coil on each tooth-inserted articulated bobbin (S400), a yoke connecting step (S400) of connecting the coil-wound articulated bobbins into a ring shape, and a tooth ring connecting step (S500) of connecting a tooth ring of a ring shape for connecting end portions of the teeth.

The bobbin connecting step (S100) indicates a step of connecting the plurality of articulated bobbins in the form of the belt. This is to connect the articulated bobbins as shown in FIG. 35B. The tooth inserting step (S200) indicates a step of inserting the teeth into the plurality of articulated bobbins, respectively. Here, segment type teeth may first be stacked in the form of each (inner or outer) tooth as shown in the lower part of FIG. 34, to be then inserted into the articulated bobbin. Here, in the exemplary embodiment of employing the segment type teeth of the aforementioned embodiments, the teeth are inserted into the lower sides of the articulated bobbins. On the contrary, in the exemplary embodiment of employing the integral teeth, the teeth are inserted into the upper sides of the articulated bobbins.

The automatic winding step (S300) indicates a step of automatically winding a coil on each tooth-inserted articulated bobbin. As aforementioned, since the articulated bobbins are capable of being bent, the coil can be wound using an automatic winding machine. This allows the coil to be wound on the articulated bobbin in an aligned state. With the configuration, the coil may be automatically wound on the articulated bobbin in order to improve a winding space factor, which may result in enhancement of the performance of the driving motor and optimization of the driving motor.

The yoke connecting step (S400) indicates a step of connecting the coil-wound articulated bobbins into the ring shape. Here, when the teeth are the segment type teeth, the yoke connecting step may be performed to connect the articulated bobbins to the yoke of the ring shape. However, for the integral teeth integrally formed with the articulated yoke for connecting the end portions of the teeth, the yoke connecting step may be performed to bend the articulated yoke into the ring shape. The tooth ring connecting step (S500) indicates a step of press-fitting the tooth ring for connecting the end portions of the teeth into the ring shape. This, as aforementioned, can reduce the cogging torque and prevent the lowering of the output of the driving motor.

Referring to FIG. 30, an inner stator 471*a* may include an inner tooth core having a plurality of inner teeth 4100, and an inner yoke 4110. The inner yoke may have a ring shape, and serve as a base from which the inner teeth 4100 protrude toward the center. That is, the inner teeth may protrude toward the center with being fixed to the inner yoke. The plurality of inner teeth 4100 protruding toward the center may be fixed to the inner yoke 4110 with predetermined intervals therebetween. Here, a space between the inner teeth may be referred to as an inner slot 4120, which provides a space where the inner tooth core is received in an insulator 478 to be explained later and thereafter a coil is wound on the insulator 478.

Figure 41:
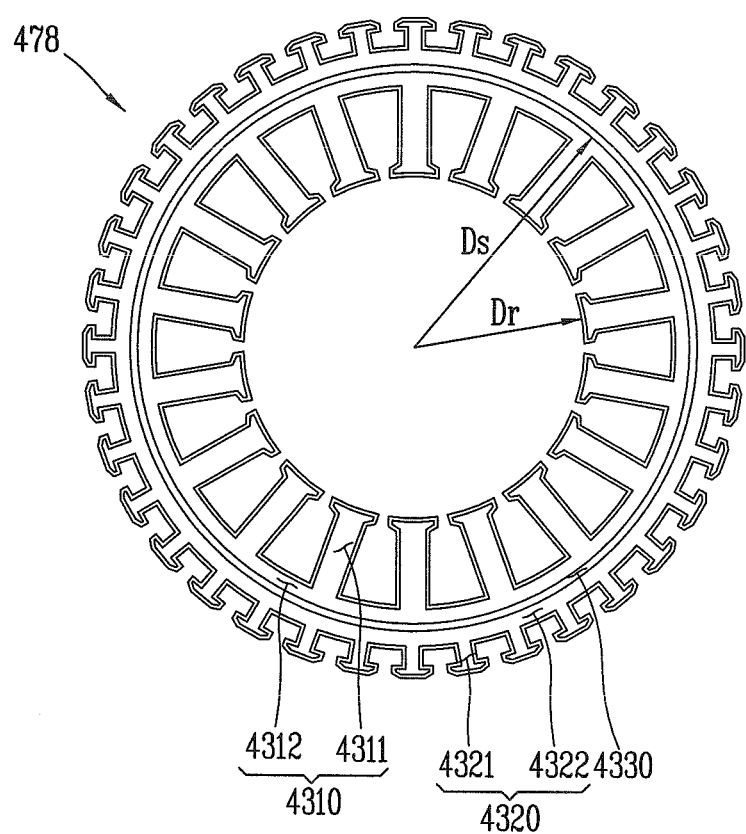
FIG. 41 is a schematic view showing an insulator of the driving motor.

Extending portions 4115 may extend from an end of each inner tooth 4100 in both left and right directions. Accordingly, a space defined by the inner teeth 4100, the extending portions 4115 of the inner teeth and the inner yoke 4110 may form the inner slot 4120. Therefore, as shown in FIG. 30, the plurality of inner slots may be repeatedly formed with predetermined intervals along a circumference formed by the inner yoke. Similar to the inner stator, an outer stator may be formed. Referring to FIG. 41, the outer stator 471*b* may include an outer tooth core having a plurality of outer teeth 200, and an outer yoke 4210.

The outer yoke 4210 may have a ring shape and serve as a base from which the outer teeth 420 protrude in a radial direction. That is, the outer teeth may radially protrude with being fixed to the outer yoke. The plurality of radially-protruded outer teeth 4200 may be fixed to the outer yoke 4210 with predetermined intervals therebetween. Here, a space between the outer teeth may be referred to as an outer slot 4220, which provides a space where the outer tooth core is received in an insulator 478 to be explained later and thereafter a coil is wound on the insulator 478. Extending portions 4215 may extend from an end of each outer tooth 4200 in left and right directions. Accordingly, a space defined by the outer teeth 4200, the extending portions 4215 of the outer teeth and the outer yoke 4210 may form the outer slot 4220. Therefore, as shown in FIG. 30, the plurality of outer slots may be repeatedly formed with predetermined intervals along a circumference formed by the outer yoke.

Here, the inner tooth core and the outer tooth core are generally formed by punching out teeth in the form of a flat plate and stacking the teeth. Therefore, required is a configuration for fixing them and allowing a coil to be wound thereon. The insulator 478 may fix those inner and outer tooth cores and allow a coil to be wound on the inner and outer tooth cores. The insulator 478 has the structure of receiving the inner tooth core and the outer tooth core, and, for example, may be formed by coupling an upper insulator and a lower insulator to face each other. Alternatively, the insulator 478 may include an insulator case and a cover.

FIG. 41 shows an insulator 478. The insulator 478 may include an inner tooth core receiving part 4310 having inner tooth receiving portions 4311 for receiving the plurality of inner teeth, and an inner yoke receiving portion 4312 for receiving the inner yoke, and an outer tooth core receiving part 4320 having outer tooth receiving portions 4321 for receiving the plurality of outer teeth, and an outer yoke receiving portion 4322 for receiving the outer yoke. Each of the inner tooth receiving portion 4211 and the outer tooth receiving portion 4321 may have a partition wall protruding along an outline of a tooth for receiving the inner tooth and the outer tooth. Accordingly, the inner tooth receiving portion and the outer tooth receiving portion may form lattice-shaped spaces, respectively, for receiving the teeth by the partition walls. Each of the inner yoke receiving portion 4312 and the outer yoke receiving portion 4322 may also have a partition wall protruding along an outline of the annular yoke for receiving the inner yoke and the outer yoke. Accordingly, the inner yoke receiving portion and the outer yoke receiving portion may form cylindrical spaces, respectively, for receiving the yokes by the partition walls.

The insulator 478 may further include a flux barrier 4330 for shielding a magnetic force by spacing the inner tooth core received in the inner tooth core receiving part apart from the outer tooth core received in the outer tooth core receiving portion. The flux barrier 4330 may protrude in a ring shape between the inner yoke receiving portion 4312 and the outer yoke receiving portion 4322. That is, an outer circumferential surface of the inner yoke received in the inner yoke receiving portion and an inner circumferential surface of the outer yoke received in the outer yoke receiving portion may be fixed to face each other, with the flux barrier 4330 interposed therebetween. In general, to shield an electromagnetic force, the inner tooth core and the outer tooth core are preferably coupled to each other with a spaced distance therebetween. Therefore, formation of the flux barrier 4330 may prevent movement of a magnetic field between the inner stator and the outer stator, which may result in implementation of a dual motor system in which an inner rotor and an outer rotor can independently work without interference with each other For example, the flux barrier 4330 may protrude from at least one of the upper insulator and the lower insulator, and make the inner tooth core and the outer tooth core spaced apart from each other as the upper and lower insulators are coupled to each other. Accordingly, the flux barrier 4330 may shield magnetic field interference between the inner tooth core and the outer tooth core. To this end, the insulator 478 may be formed of PBT-based plastic. In the meantime, after the inner tooth core and the outer tooth core are received in the inner tooth core receiving part 4310 and the outer tooth core receiving part 4320, the upper insulator and the lower insulator are assembled to each other, thereby completely producing the insulator. Here, as aforementioned, the inner slots 4120 may be formed between the inner tooth receiving portions for receiving the plurality of inner teeth, and the outer slots 4220 may be formed between the outer tooth receiving portions for receiving the plurality of outer teeth.

A wound coil may be located in the inner slot and the outer slot, respectively. That is, when the coil is wound based on the inner tooth receiving portions for receiving the inner teeth and the outer tooth receiving portions for receiving the outer teeth, the wound coil may be located in the inner slots and the outer slots. Therefore, the inner stator may be formed by receiving the inner tooth core in the insulator and winding the coil on the insulator, and the outer stator may be formed by receiving the outer tooth core in the insulator and winding the coil on the insulator. Here, a coil-wound portion of the inner stator becomes an inner winding portion, and a coil-wound portion of the outer stator becomes an outer winding portion. From the perspective of the configuration, the insulator may serve as a bobbin for winding coil thereon as well. Also, the flux barrier may be integrally formed with the insulator. Accordingly, a bobbin and a flux barrier are not required, which may result in reduction of the entire number of components and an entire size of the driving motor. In addition, even if two stators for driving two independent rotors are employed, an increase in an entire size of the washing machine can be avoided.

Figure 42:
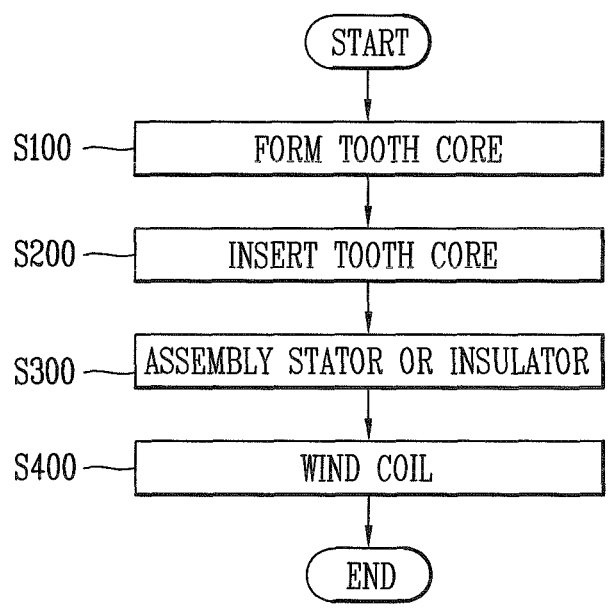
FIG. 42 is a flowchart showing one exemplary embodiment of a method for fabricating a driving motor for a washing machine.

FIG. 42 shows one exemplary embodiment of a method for fabricating a stator of a driving motor for a washing machine. As shown in FIG. 42, a method for fabricating a stator of a driving motor for a washing machine according to the one exemplary embodiment may include a stator core forming step (S100) of stacking an inner tooth core having inner teeth and an inner yoke, and an outer tooth core having outer teeth and an outer yoke, a stator core inserting step (S200) of inserting the inner tooth core and the outer tooth core in one of an upper insulator and a lower insulator, which are coupled to form an inner tooth receiving part and an outer tooth receiving part and face each other, a stator assembling step (S300) of coupling the upper insulator to the lower insulator, and a coil winding step (S400) of winding a coil on an outside of inner tooth receiving portions for receiving the inner teeth of the inner stator receiving part, and on an outside of outer tooth receiving portions for receiving the outer teeth of the outer stator receiving part.

The stator core forming step (S100) indicates a step of forming the inner tooth core and the outer tooth core. As aforementioned, according to the method of forming the inner tooth core and the outer tooth core, teeth in the form of a flat plate are punched out and stacked. That is, the inner tooth core having the inner teeth and the inner yoke and the outer tooth core having the outer teeth and the outer yoke are stacked each other. The stator core inserting step (S200) indicates a step of inserting the inner tooth core and the outer tooth core stacked in the tooth core forming step (S100) into the inner stator receiving part and the outer stator receiving part of the insulator. Here, the tooth cores may be inserted into one of the upper insulator and the lower insulator.

In the stator core inserting step (S200), the inner tooth core and the outer tooth core are inserted with being spaced apart from each other by interposing therebetween a flux barrier, which is formed at at least one of the upper insulator and the lower insulator. The stator assembling step (S300) indicates a step of completing the assembling of the insulator by coupling the upper insulator and the lower insulator. Accordingly, the insulator may cover the inner tooth core and the outer tooth core, and serve as a bobbin on which the coil is wound in the winding step to be explained later. The coil winding step (S400) indicates a step of winding the coil on the outside of the inner tooth receiving portions for receiving the inner teeth of the inner tooth receiving part, and the outer tooth receiving portions for receiving the outer teeth of the outer tooth receiving part. With the configuration, the assembling of the stator can be performed in an easy and simple manner, and the insulator can serve as the bobbin as well, which may allow for reduction of the entire number of components and an entire size of the driving motor. Therefore, even if two stators for driving two independent rotors are employed, an increase in an entire size of the washing machine can be avoided.

Figure 43:
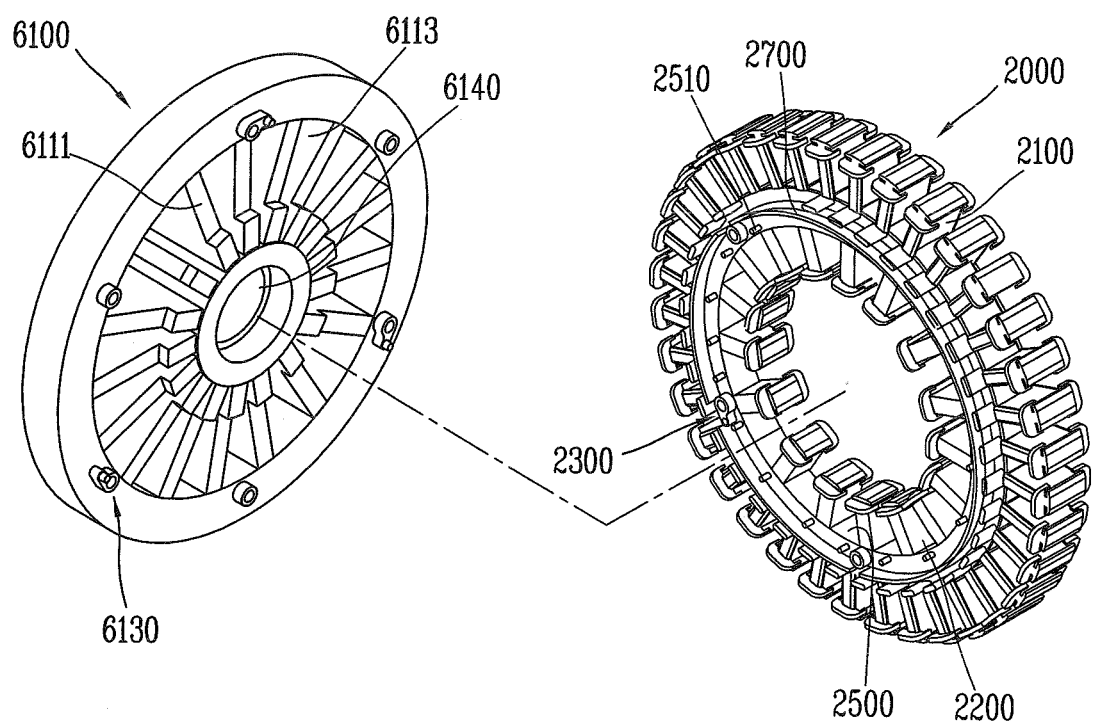
FIG. 43 is a view showing assembly of a bearing housing and a stator of a driving motor applied to the washing machine of the present invention.
Figure 44:
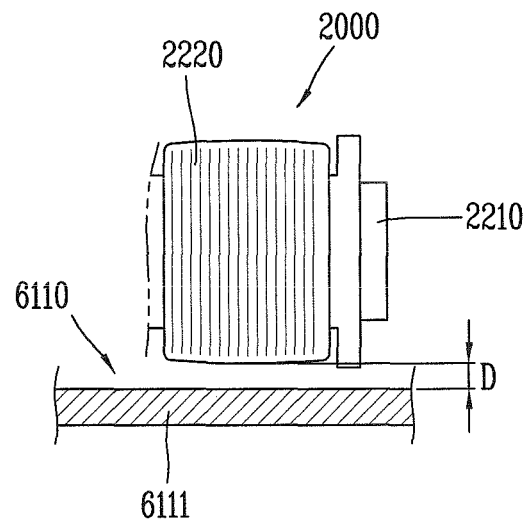
FIG. 44 is a view showing a stator coupling opening of a bearing housing of a driving motor according to the present invention.
Figure 45:
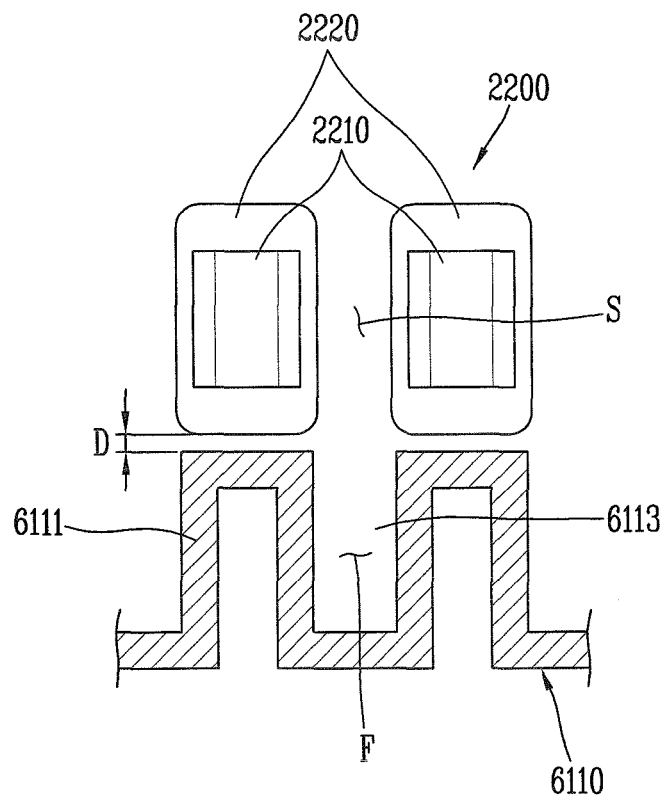
FIG. 45 is a view showing a housing coupling hole of a stator of a driving motor according to the present invention.

With reference to FIGS. 43 to 45, will be explained a structure of a bearing housing capable of enhancing a radiating characteristic of a stator of a dual motor applied to the washing machine of the present disclosure. Firstly, a bearing housing 6100 of the present disclosure will be explained with reference to FIG. 43. The bearing housing 6100 is provided with a bearing shaft hole 6140 for penetrating a rotor shaft of a stator 2000 therethrough, and is concentrically coupled to the stator 2000 in a covering manner. The stator 2000 is provided with a housing mounting rib 2510 of a ring shape protruding from a yoke 2500 in an axial direction. Preferably, a diameter of the housing mounting rib 2510 is formed to be equal to or a little larger than a diameter of a body 6110 of the bearing housing. More concretely, the bearing housing 6100 is assembled to the stator 2000 as the body 6110 is insertion-fixed to an inner circumferential surface of the housing mounting ribs 2510. Here, the bearing housing 6100 is fitted into the stator 2000 such that a stator coupling opening 6130 and a housing coupling opening 2300 are aligned with each other.

The stator 2000 is provided with outer teeth 2100 protruding from an outer circumference in a radial direction. Although not shown, an outer rotor is mounted to an outer circumference of the outer teeth 2100 with a gap therebetween, and rotates by a magnetic force. The stator 2000 is provided with outer teeth 2100 protruding from an inner circumference toward the center. Although not shown, an inner rotor is mounted to an inner circumference of the inner teeth 2200 with a gap therebetween, and rotates by a magnetic force.

As shown in FIG. 43, since the bearing housing 6100 is fixedly-coupled to the yoke 2500 of the stator 2000, the bearing housing 6100 completely covers the inner rotor. A coil 2220 formed of a conductive such as copper is wound on a winding portion formed on an outer circumferential surface of a core 2210 of the inner teeth 2200. When a current is applied to the coil 2220, the current reacts with a permanent magnet of the rotor to rotate the rotor. By the applied current, the coil 2220 may generate heat of a high temperature. This heat of a high temperature may cause the coil 2220 to be cut or to mal-operate. Therefore, it is required to radiate the heat. Furthermore, the heat generated from the inner rotor covered by the bearing housing 6100 is not easily radiated to the outside. This may damage a wire wound on the inner teeth 2200, or cause a mal-operation. Accordingly, as shown in FIG. 43, the stator 2000 is provided with a spacer 2510 protruding from the yoke 2500 so that the stator 2000 may be coupled to the bearing housing 6100 with a gap therebetween.

The heat generated from the inner rotor circulates at a space between the bearing housing 6100 and the yoke 2500 of the stator 2000, and is radiated to the outside without being over-heated. The spacer 2510 is formed at the yoke 2500 in a plurality with a constant gap therebetween, so that the bearing housing 6100 may be sufficiently spaced from the inner rotor formed inside the stator 2000. However, the spacer 2510 between the bearing housing 6100 and the inner teeth 2200 of the stator 2000 merely serves to radiate heat by convection. If a spacing distance therebetween is not sufficiently long, there are limitations in radiating heat. In order to implement radiation by conduction as well as convection by the spacing distance, the body 6110 of the bearing housing 6100 consists of a protruding portion 6111 and a concaved portion 6113.

Referring to FIGS. 43 to 45, the bearing housing 6100 having a body 6110, a bearing shaft hole 6140, and a stator coupling opening 6130 is assembled to the stator 2000 having outer teeth 2100, inner teeth 2200, a yoke 2500 and a housing coupling opening 2300. Here, the body 6110 of the bearing housing 6100 is provided with the protruding portion 6111 at a position corresponding to the winding portion of the inner teeth 2200, and is provided with the concaved portion 6113 at a position corresponding to a slot (S) between the inner teeth 2200. The concaved portion 6113 may be implemented as a through hole penetratingly formed at the body 6110 of the bearing housing 6100. Since the concaved portion 6113 is penetratingly formed as a space for convection, heat generated from the winding portion of the inner teeth 2200 may be radiated more effectively. However, as shown in FIG. 45, the concaved portion 6113 may be implemented as an outer surface of the body 6110 of the bearing housing 6100 is curved. In this case, the body 6110 of the bearing housing 6100 may be implemented as a curved portion integrally formed therewith. This may maximize radiation due to conduction of the protruding portion 6111.

The concaved portion 6113 of the body 6110 of the bearing housing is formed as a space (F) for circulating heat generated from the winding portion of the inner teeth 2200 by convection. And, the protruding portion 6111 of the body 6110 of the bearing housing is formed as a conducting portion for radiating heat generated from the winding portion of the inner teeth 6110 to the outside by conduction. The protruding portion 6111 of the body 6110 of the bearing housing is spaced from the coil 2220 wound on the winding portion of the inner teeth by a predetermined insulating distance (D). This insulating distance has only to have a length long enough to prevent a current of the coil 2220 from flowing to the bearing housing 6100 formed of a metallic material. Preferably, the insulating distance is approximately 3 mm.

Hereinafter, with reference to FIGS. 46 to 48, will be explained structures of a current connector and a hall sensor of the dual motor according to the present disclosure, and a washing machine using the same. In the conventional dual motor system, each of a current connector and a hall sensor connector is respectively installed on inner and outer stators. This may cause a complicated structure, and increase the number of assembly processes, etc. In order to solve these various problems, in the present disclosure, a current connector is integrally formed on inner and outer stators, and a hall sensor connector is also integrally formed on inner and outer stators.

Figure 46:
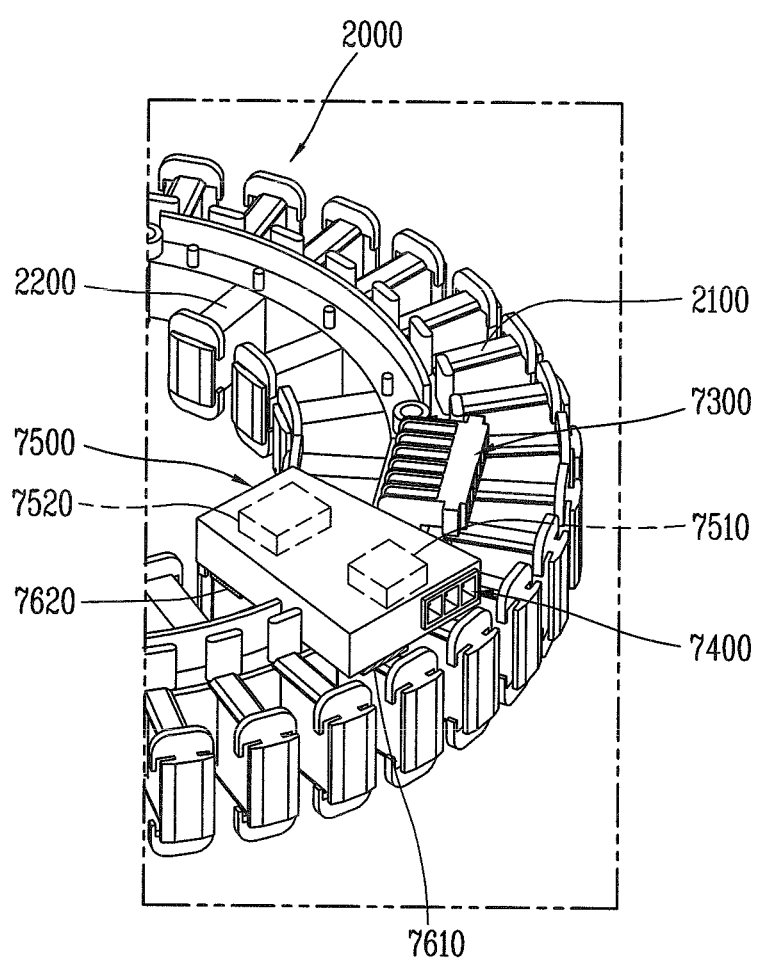
FIG. 46 is a view showing a current connector and a hall sensor connector integrally fabricated with a stator of a dual motor applied to the washing machine of the present invention.

As shown in FIG. 46, the dual motor of the present disclosure includes a current connector 7300 having outer teeth 2100 and inner teeth 2200, and configured to apply power to an outer winding portion of the outer teeth 2100 and an inner winding portion of the inner teeth 2200 in an integrated manner; and a hall sensor connector 7500 configured to apply power to an outer hall sensor 7510 and an inner hall sensor 7520 in an integrated manner. The outer winding portion has a structure that a coil is wound on the outer teeth 2100. Although not shown, a metallic coil such as copper having a high conductivity is wound on the outer teeth 2100 a plurality of times, thereby rotating an outer rotor (not shown) positioned outside the outer teeth 2100 by forming a magnetic flux together with a permanent magnet of the outer rotor. In correspondence to the outer winding portion, the inner winding portion has a structure that a coil is wound on the inner teeth 2200 a plurality of times, thereby rotating an inner rotor (not shown) positioned inside the inner teeth 2200.

The current connector 7300 has a structure to operate the motor by forming a magnetic flux together with a permanent magnet of the rotor, by applying a current to coils of the outer winding portion and the inner winding portion. An outer current connector and an inner current connector are separately installed in the conventional art, whereas they are integrally formed as one current connector 7300 in the present disclosure. Preferably, the current connector 7300 is implemented as a 6-pin connector where a 3-pin connector for applying a current to the outer winding portion is integrated with a 3-pin connector for applying a current to the inner winding portion. In the conventional art, an outer current connector and an inner current connector have the same structure, a 3-pin structure, respectively. However, in the present disclosure, an outer current connector and an inner current connector are integrally formed as one current connector 7300, a 6-pin connector.

Figure 47:
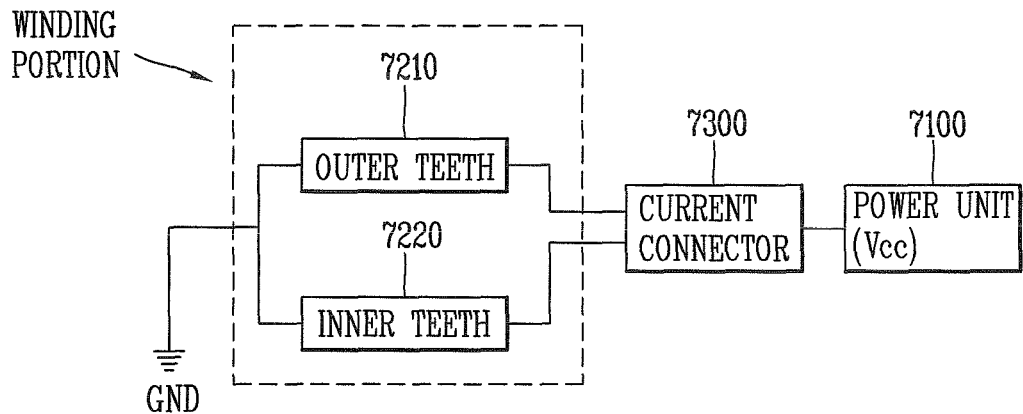
FIG. 47 is a block diagram showing a connected state of a current connector in a stator of a dual motor according to the present invention.

As shown in FIG. 47, the current connector 7300 supplies a current from a power unit 7100 to the outer winding portion and the inner winding portion in parallel. As a current is supplied to the outer winding portion and the inner winding portion through one current connector 7300, a simple structure may be implemented, an assembly process may be facilitated, and the number of components may be reduced. As shown in FIG. 47, the current applied to the outer winding portions 2100 and the inner winding portion 2200 through the current connector 7300 is integrally connected to one ground (GND). As a result, the outer winding portion 2100 and the inner winding portion 2200 have a parallel structure.

The hall sensor connector 7500 serves to integrate an outer hall sensor connector and an inner hall sensor connector which perform hall sensing functions with respect to the outer stator and the inner stator, respectively, as one connector. As shown in FIG. 46, the hall sensor connector 7500 is formed as a connector of an outer hall sensor 7510 and a connector of an inner hall sensor 7520 of a hall sensor unit 7500 are integrated with each other.

Figure 48:
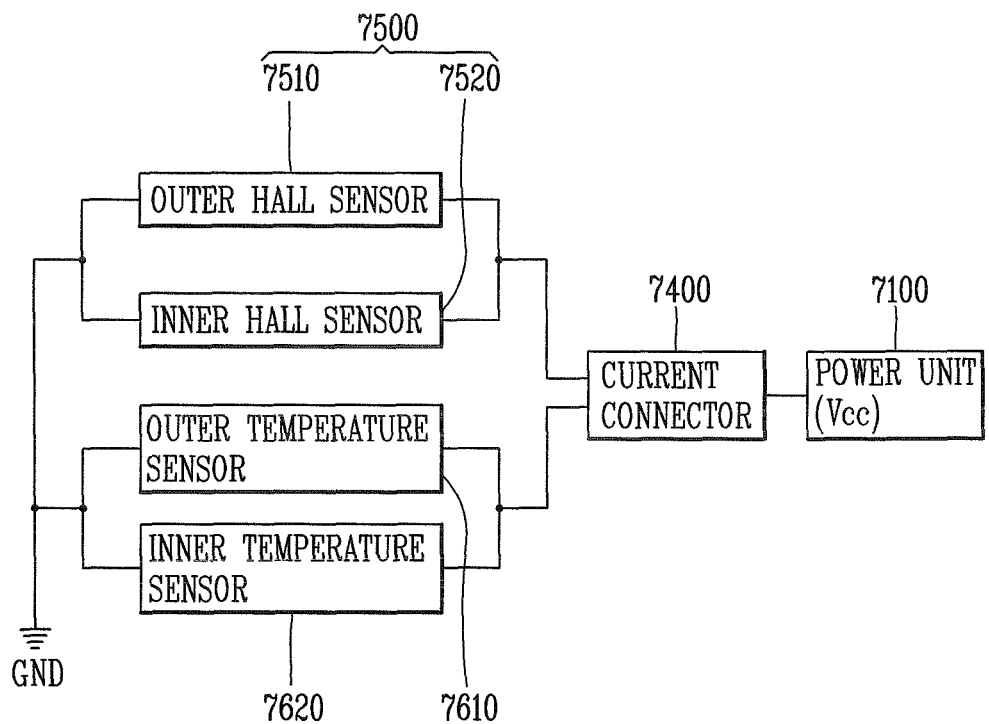
FIG. 48 is a block diagram showing a connected state of a hall sensor and a temperature sensor in a stator of a dual motor according to the present invention.

As shown in FIG. 48, it is preferable to supply a current from the power unit 7100 to the outer hall sensor 7510 and the inner hall sensor 7520 in parallel through the integrated hall sensor connector 7500, and to connect hall sensing signals detected from the outer stator and the inner stator to the integrated hall sensor connector 7500 in parallel. As shown in FIG. 48, the current applied from the outer hall sensor 7510 and the inner hall sensor 7520 is connected to one ground (GND) through the integrated hall sensor connector 7500 in parallel.

According to another embodiment of the present disclosure, as shown in FIG. 46, the dual motor of the present disclosure may further include an outer temperature sensor 7610 and an inner temperature sensor 7620 for detecting temperatures of the outer stator and the inner stator, respectively. Referring to FIG. 46, the outer temperature sensor 7610 and the inner temperature sensor 7620 are installed on a lower surface of the hall sensor unit 7500, respectively. The outer temperature sensor 7610 is mounted to the outer stator, and the inner temperature sensor 7620 is mounted to the inner stator. The outer temperature sensor 7610 is installed to contact the outer winding portion to measure a temperature of heat generated from the outer winding portion, and the inner temperature sensor 7620 is installed to contact the inner winding portion to measure a temperature of heat generated from the inner winding portion.

When overheat is generated from the respective stators, these temperature sensors 7610 and 7620 are configured to control the operation of the dual motor by detecting the generated overheat. Referring to FIG. 48, a current from the power unit 7100 is supplied to the outer temperature sensor 7610 and the inner temperature sensor 7620, in parallel, through the integrated hall sensor connector 7500. Preferably, signals detected from the outer temperature sensor 7610 and the inner temperature sensor 7620 are connected to the integrated hall sensor connector 7500 in parallel. As the hall sensor connector 7500 implemented as one integrated connector supplies power applied from the power unit 7100 to the inner and outer stators in parallel. This may implement a simple structure and enhance an assembly characteristic. As a result, an inferior coupling or an inferior operation due to a complicated structure may be prevented.

Referring to FIG. 48, the hall sensor unit 7500 including the outer hall sensor 7510 and the inner hall sensor 7520, and a temperature sensor unit including the outer temperature sensor 7610 and the inner temperature sensor 7620 are connected to each other in parallel. And, the hall sensor unit and the temperature sensor unit are integrally connected to one ground (GND). The hall sensor connector 7500 has a parallel structure to connect the hall sensor unit 7500 and the temperature sensor unit (7610, 7620) to each other. A simple assembly structure by one power unit 7100 and the ground may be implemented, and a stable system may be implemented. A drum assembly method according to one embodiment of the present disclosure is applied to a washing machine comprising a main drum and a sub drum independently driven in a tub fixed to the aforementioned body, and a driving motor having a stator and inner and outer rotors for independently driving the main drum and the sub drum.

FIG. 8 illustrates a drum assembly method according to one embodiment of the present disclosure. Referring to FIG. 8, the drum assembly method includes fabricating a shaft-spider assembly by coupling a shaft and a spider to each other, the shaft which transmits a driving force to the main drum and the sub drum from the driving motor (S100), coupling the shaft-spider assembly to a rear side of the sub drum (S200), coupling the sub drum to the main drum (S300), and coupling the shaft-spider assembly to a rear side of the main drum (S400).

The above steps are performed after the main drum, the sub drum, a main drum spider, a sub drum spider, etc. have been fabricated. For instance, for the main drum and the sub drum, a plate is rolled to have a cylindrical shape, and a coupling part undergoes a seaming process. Furthermore, the end of the drum undergoes a curling process. FIG. 6 illustrates a seamed coupling part 66 and a curled end part 67 of the sub drum. Preferably, the sub drum undergoes a curling process after a seaming process so that the curled end may have continuity. The main drum spider and the sub drum spider may be fabricated in a die-casting manner.

FIG. 3 is an exploded perspective view illustrating the main drum, the sub drum, etc. Referring to FIGS. 3 and 7, in S100, an outer shaft 81 for transmitting a driving force to the main drum from the inner rotor is coupled to the main drum spider 91 (S110), an inner shaft 82 for transmitting a driving force to the sub drum from the outer rotor is coupled to the sub drum spider 95 (S120). The step (S110) for coupling the outer shaft to the main drum spider is independent from the step (S120) for coupling the inner shaft to the sub drum spider. Therefore, the steps S110 and S120 may be performed in a reverse order, or may be simultaneously performed.

Then, the inner shaft 82 coupled to the sub drum spider is coupled to the inside of the outer shaft 81 coupled to the main drum spider (S130). At the same time, a bearing (S131) and a waterproof seal (S132) are inserted into the inner shaft 82. Referring to FIG. 7, the inner shaft is coupled to the inside of the outer shaft, a bearing is forcibly inserted thereinto, and then a waterproof seal is inserted thereinto. In S200 for coupling the shaft-spider assembly to a rear side of the sub drum, the sub drum spider is coupled to a rear surface of the sub drum (sub drum back). In this case, since the sub drum spider is included in the shaft-spider assembly, the shaft-spider assembly is coupled to the sub drum. The sub drum spider and the sub drum back may be coupled to each other by screws or by welding.

In S300 for coupling the sub drum to the main drum, the sub drum is inserted into the inside of the main drum. In case of mounting a drum guide as shown in FIG. 2, the drum guide 55 for sealing is mounted to the inside of the main drum before inserting the sub drum into the main drum (S250). The drum guide may be mounted by fit-coupling a protrusion formed at a lower part of the drum guide to a recess formed on an inner circumferential surface of the main drum.

In S400 for coupling the shaft-spider assembly to a rear side of the main drum, the end of the main drum spider is coupled to the main drum. In this case, since the main drum spider is included in the shaft-spider assembly, the shaft-spider assembly is coupled to the main drum. The main drum spider and the main drum may be coupled to each other by screws or by welding.

Figure 49:
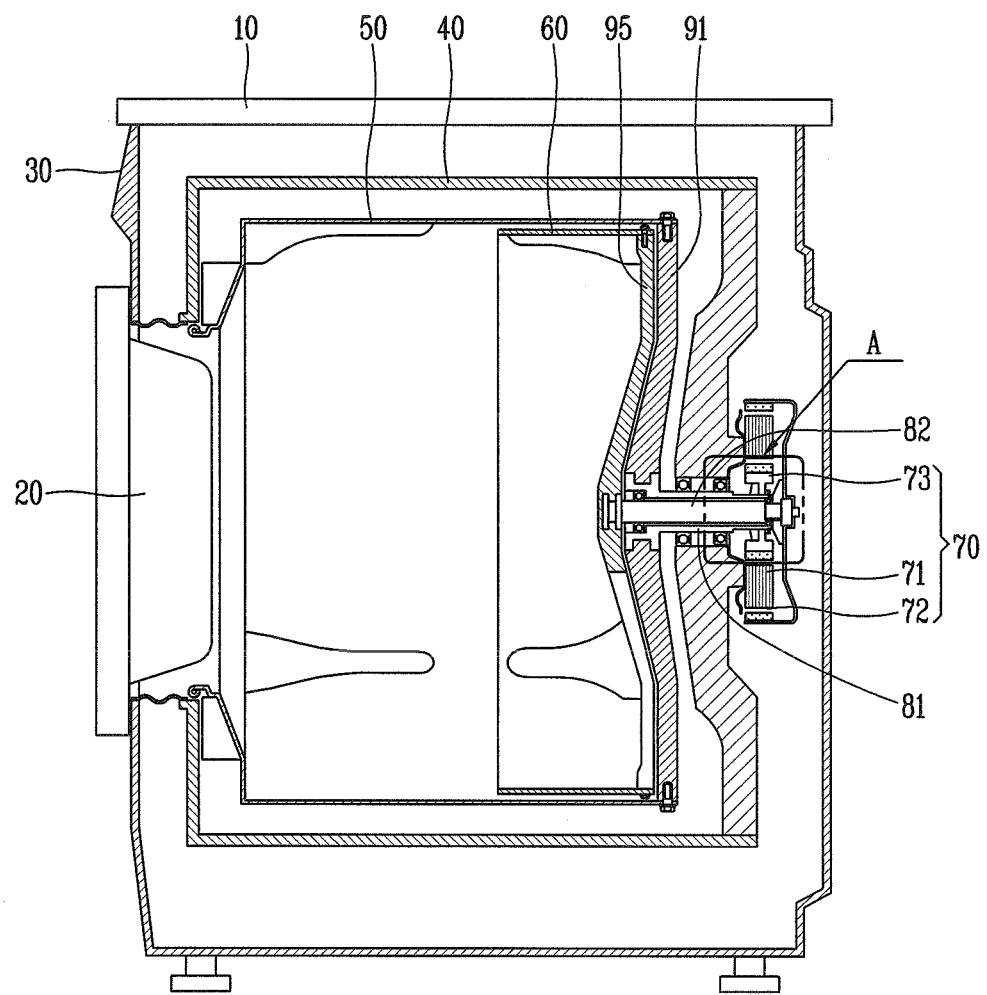
FIG. 49 is a schematic view of the washing machine according to the present invention.
Figure 51:
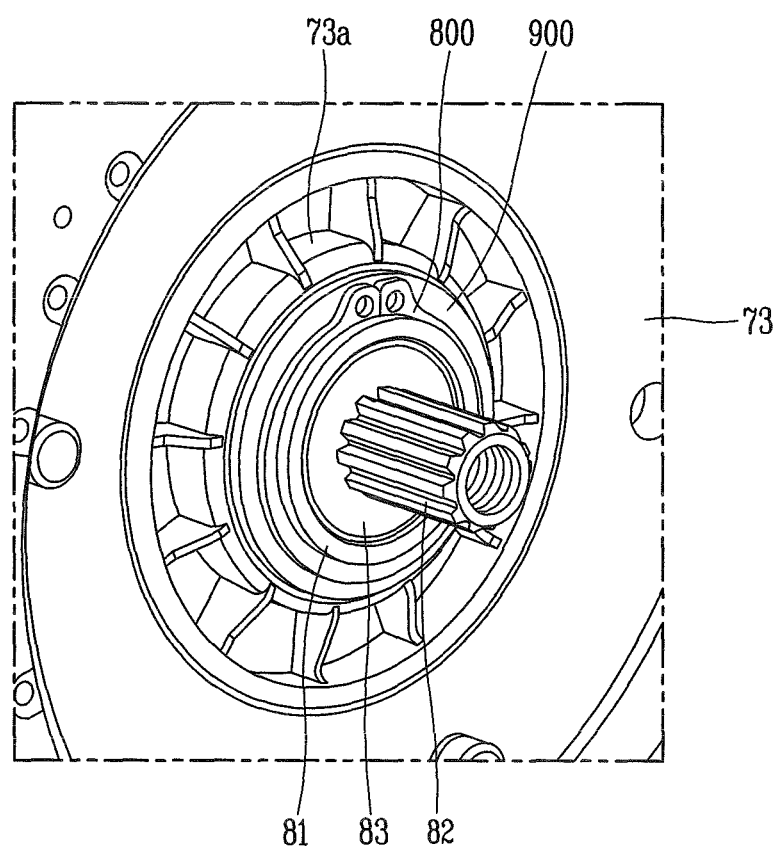
FIG. 51 is an external perspective view of a shaft structure according to the present invention.
Figure 52A:
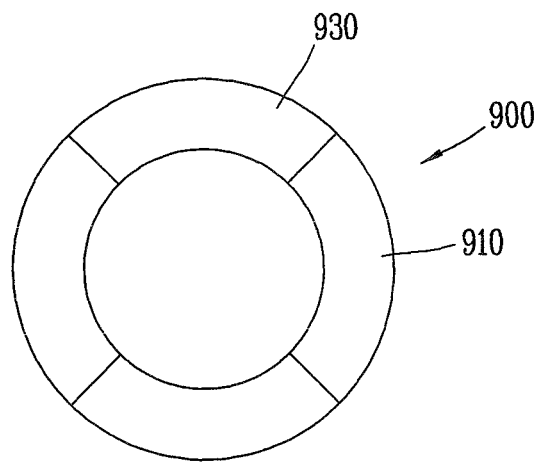
FIG. 52A is a planar view showing a spring washer applied to the shaft structure of the present invention.
Figure 52B:
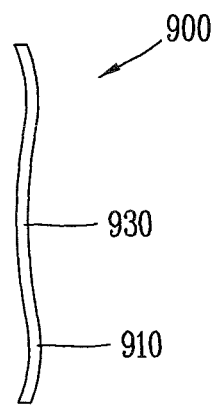
FIG. 52B is a side view showing the spring washer of FIG. 52A.
Figure 52C:
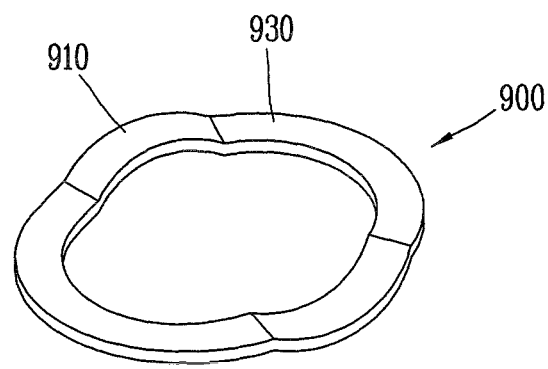
FIG. 52C is a perspective view showing the spring washer of FIG. 52A.

Hereinafter, will be explained a shaft structure for transmitting a rotational force by connecting a driving motor to a drum of a washing machine according to the present disclosure. FIG. 49 is a view illustrating a washing machine having a shaft structure (A) according to another embodiment of the present disclosure, FIGS. 50 and 51 are detailed sectional and perspective views illustrating the shaft structure (A), and FIG. 52 is a view illustrating a spring washer 900 for attenuating vibrations in the shaft structure (A).

Another embodiment of the present disclosure will be explained with reference to FIGS. 50 to 52. The shaft structure (A) of the dual motor according to the present disclosure includes an outer shaft 81 of a hollow type; an inner shaft 82 inserted into the outer shaft 81; a driving motor 70 having an outer rotor 72 connected to a stator 71 and the inner shaft 82 and rotating outside the stator 71, and having an inner rotor 73 connected to the outer shaft 81 and rotating inside the stator 71; and a spring washer 900 inserted into a connection part of the outer shaft 81 and the inner rotor 82. In this structure, vibrations of the outer shaft are attenuated to prevent noise, and separation of the outer shaft 81 due to vibrations may be prevented.

Figure 50:
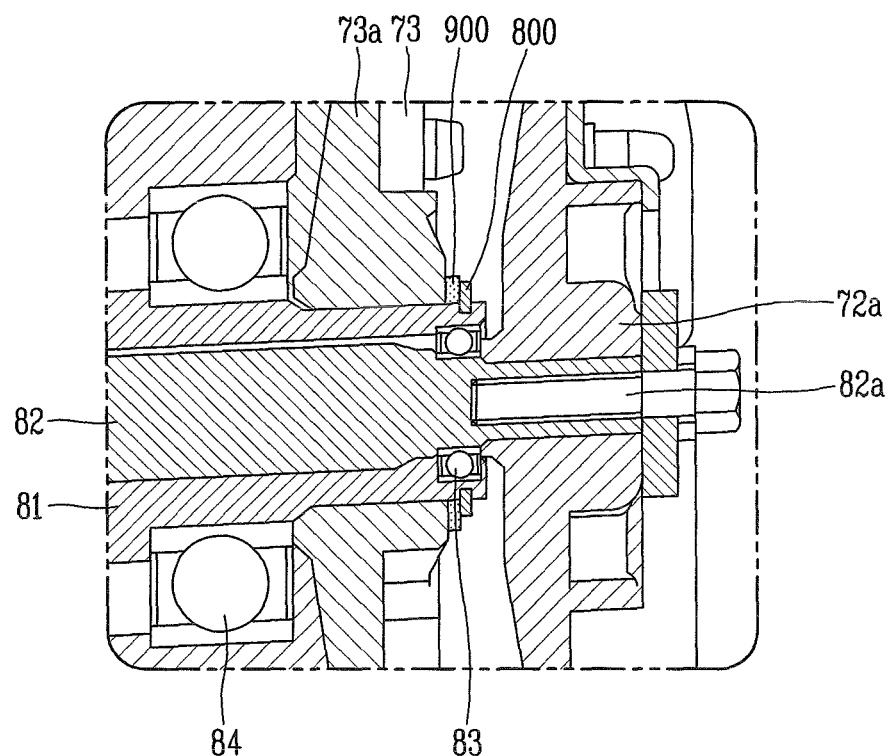
FIG. 50 is a sectional view showing an inner shaft and an outer shaft in a shaft structure for a washing machine according to the present invention.

Referring to FIG. 50, the inner shaft 82 rotates in an inserted state into the outer shaft 81 of a hollow type. The outer shaft 81 rotates in a connected state to the inner rotor 73, and the inner shaft 82 rotates in a connected state to the outer rotor 72. The outer shaft 81 rapidly rotates by receiving a rotational force of the inner rotor 73. In this case, vibrations and noise occur when the rotational force is transmitted. Therefore, the spring washer 900 is installed between the outer shaft 81 and the inner rotor 73 to attenuate vibrations in an axial direction.

As shown in FIG. 50, an inner ball bearing 83 is installed between the outer shaft 81 and the inner shaft 82, so that the driving motor may drive the outer shaft and the inner shaft, independently. An outer ball bearing 84 is provided on an outer circumference of the outer shaft 82, thereby rotating the outer shaft 82 in the shaft structure. As shown in FIGS. 50 and 51, the shaft structure may further include a stopping ring 800 configured to fix the spring washer 900 at a connection part of the outer shaft 81 and the inner rotor 73. Here, the stopping ring 800 is implemented as a C-ring. As shown in FIG. 52, the spring washer 900 is implemented as a concave-convex member of a ring shape having a protruding portion 910 and a concaved portion 930. As shown in FIG. 50, once the spring washer 900 is fit-coupled to an outer circumference of the outer shaft 81 by the concave-convex parts and is fixed by the stopping ring 800, vibrations of the outer shaft 81 in an axial direction may be attenuated.

In order to compress the spring washer 900 in an axial direction and to implement an elastic force by the concave-convex parts, the stopping ring 800 has to restrict an upper surface of the spring washer 900 as shown in FIG. 50. The outer shaft 81 is provided with a stopping ring recess 81a concaved toward the center on an outer circumference thereof, thereby preventing separation of the spring washer 900 in an axial direction by inserting the stopping ring 800 (C-ring) into the stopping ring recess 81a. As shown in FIG. 51, the stopping ring 800 is formed in a partially-cut ring shape (C-ring) in order to be fit into the stopping ring recess 81a formed on an outer circumference of the outer shaft 81. The C-ring is fit into the stopping ring recess 81a formed on an outer circumference of the outer shaft 81 as a cut part thereof is widened.

Referring to FIGS. 50 and 51 according to another embodiment of the present disclosure, an inner bushing 73a is installed between the outer shaft and the inner rotor, thereby transmitting a rotational force of the inner rotor 73 to the outer shaft 81. An outer bushing 72a is also installed between the inner shaft 82 and the outer rotor 72, thereby transmitting a rotational force of the outer rotor 72 to the inner shaft 82. In order to prevent vibrations and noise of the outer shaft 81 in an axial direction, the spring washer 900 further includes a stopping ring 800 installed between the inner bushing 73a and the outer shaft 81, and configured to fix the spring washer 900 at a connection part of the outer shaft 81 and the inner bushing 73a.

As shown in FIGS. 50 and 51, the spring washer 900 may be formed in an annular member which encompasses an outer circumference of the outer shaft 81 on an upper surface of the inner bushing 73a. A stopping ring recess 81a is concaved from an outer circumference of the outer shaft 81 toward the center. The stopping ring 900 is implemented as a C-ring inserted into the stopping ring recess 81a, and prevents separation of the spring washer in an axial direction by contacting an upper surface of the spring washer 900.

According to still another embodiment of the present disclosure, a structure to couple a serration of the inner shaft 82 to the outer bushing 72a has a tapered shape. This may enhance a user's convenience when performing the coupling process, and may enhance a coupling force. Referring to FIGS. 50 and 51, one end of the inner shaft 82 at a driving motor side is provided with serrations for transmitting a rotational force of the outer rotor to the inner shaft 82. The serrations of the inner shaft 82 and an inner circumferential surface of the inner bushing 72a are formed in a sawteeth shape, so that a rotational force is transmitted to the inner shaft 82 from the inner bushing 72a when they are engaged with each other.

The serrations of the inner shaft 82 are fit into sawteeth of an inner circumferential surface of the inner bushing 72a. As shown in FIGS. 50 and 51, the inner shaft 82 and the inner bushing 72a are formed in parallel cylindrical shapes. In this case, the serrations of the inner shaft 82 and the inner circumferential surface of the inner bushing 72a may have a gap therebetween, and may have a difficulty in being coupled to each other. As a result, it may be difficult to transmit a rotational force to the shaft from the rotor. Although not shown, the serrations of the inner shaft 82 may be formed in a tapered shape. Further, the inner circumferential surface of the inner bushing 72a may be implemented as a tapered through hole. This may allow the inner shaft 82 to be insertion-coupled to the inner bushing 72a with a large coupling force. And, a coupling intensity may be reinforced and an assembly characteristic may be enhanced.

Still another embodiment of the present invention will be explained in more details with reference to FIGS. 52 and 53. A shaft structure for a dual drum washing machine comprises an outer shaft 81 formed in a hollow type; an inner shaft 82 inserted into the outer shaft 81; a driving motor having a stator 71, an outer rotor 72 connected to the inner shaft 82 and rotating outside the stator 71, and an inner rotor 73 connected to the outer shaft 81 and rotating inside the stator 71; a spring washer 500 inserted into the outer shaft at a connection part of the outer shaft 81 and the inner rotor 82; and an inner rotor nut 310 configured to forcibly fix the inner rotor after the spring washer 500 has been insertion-coupled to the outer shaft. Under this configuration, vibrations of the outer shaft can be attenuated to prevent noise, and entangled state releasing due to vibration can be prevented.

Figure 53:
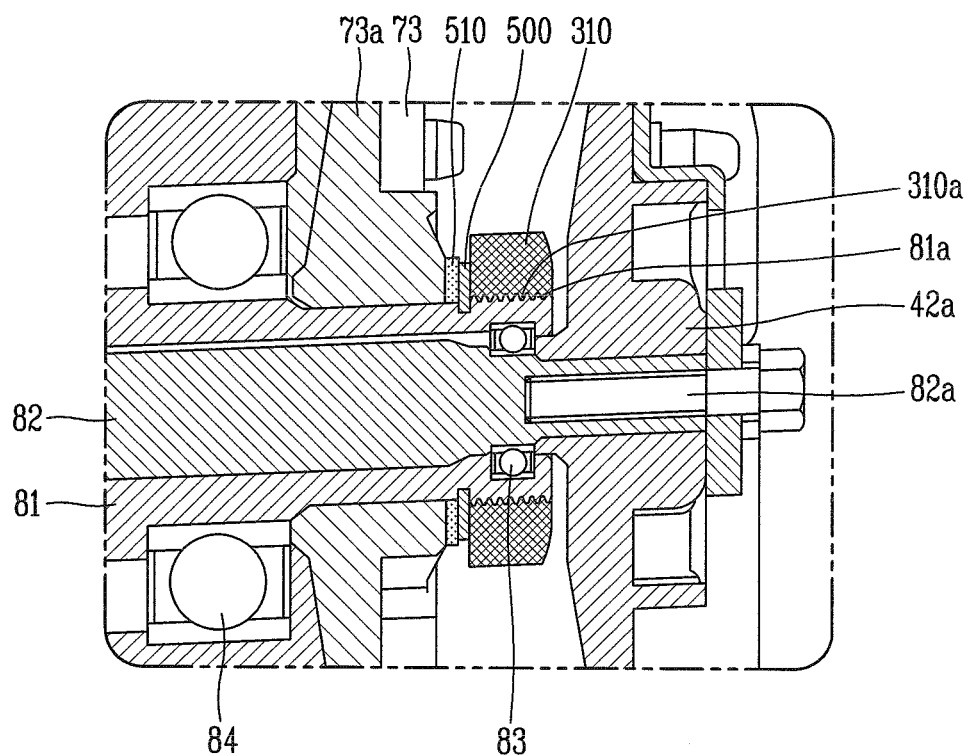
FIG. 53 is a sectional view of an inner shaft and an outer shaft in a shaft structure according to still another embodiment of the present invention.

Referring to FIG. 53, the inner shaft 82 is inserted into the outer shaft 81 for rotation. The outer shaft 81 is connected to the inner rotor 73, and the inner shaft 82 is connected to the outer rotor 72 for rotation. The outer shaft 81 rotates at a high speed by receiving a rotational force of the inner rotor 73. When the rotational force is transmitted, vibrations and noise occur. To prevent vibrations in an axial direction, the spring washer 500 is disposed between the outer shaft 81 and the inner rotor 73.

Referring to FIG. 53, an inner ball bearing 83 is installed between the outer shaft 72 and the inner shaft 73, so that the driving motor can independently drive the outer shaft and the inner shaft. An outer ball bearing 84 is provided on the outer circumference of the outer shaft 82, which allows rotation of the outer shaft 82 in the shaft structure for the washing machine. As shown in FIG. 53, the shaft structure of the present invention may further comprise an inner rotor nut 310 configured to fix the spring washer 500 at a connection part of the outer shaft 81 and the inner rotor 73.

As shown in FIG. 52, the spring washer 500 is implemented in the form of an annular concave-convex member having a protrusion part 510 and a concaved part 530. Referring to FIG. 53, when the spring washer 500 is fittedly-inserted into the outer circumference of the outer shaft 81 by the concave-convex part thus to be fixed by the inner rotor nut 310, vibrations of the outer shaft 81 in an axial direction can be attenuated. In order to provide an elastic force due to the concave-convex part by compressing the spring washer 500 in an axial direction, as shown in FIG. 53, the inner rotor nut 310 has to be screw-coupled to an outer circumferential surface of the end of the outer shaft 81 for restriction of an upper surface of the spring washer 500.

The shaft structure of the present invention may further comprise a plain washer 501 insertion-coupled to part between the inner rotor 73 and the spring washer 500 on the outer circumference of the outer shaft 81. As shown in FIG. 53, the plain washer is forcibly insertion-coupled between the upper surface of the spring washer 500 and the upper surface of the inner rotor 73. The inner rotor nut 310 serves to forcibly fix the spring washer 500 on the outer circumference of the outer shaft 81. Since the inner rotor 73 and the spring washer 500 do not directly come in contact with each other due to the plain washer 501, a coupling force therebetween can be enhanced and vibrations can be reduced. This can prevent entangled state releasing.

As shown in FIG. 53, a male screw portion 81a is formed on the outer circumference of the outer shaft 81, and a female screw portion 310a is formed on the inner circumference of the inner rotor nut 310. As the male screw portion 81a and the female screw portion 310a are screw-coupled to each other, the spring washer 500 can be prevented from deviating in an axial direction.

According to another embodiment shown in FIGS. 52 and 53, an inner bushing 73a is installed between the outer shaft and the inner rotor, so that a rotation force of the inner rotor 73 can be transferred to the outer shaft 81. An outer bushing 72a is installed between the inner shaft 82 and the outer rotor 72, so that a rotation force of the outer rotor 72 can be transferred to the inner shaft 82. In order to prevent vibrations and noise of the outer shaft 81 in an axial direction, the spring washer 500 is installed at a connection part of the inner bushing 73a and the outer shaft 81. Accordingly, the present invention further comprises 310 the inner rotor nut 310 configured to fix the spring washer 500 at a connection part of the outer shaft 81 and the inner bushing 73a.

As shown in FIGS. 52 and 53, the spring washer 500 is formed in an annular member covering the outer circumference of the outer shaft 81 on an upper surface of the inner bushing 73a. The plain washer 501 may be provided between the inner bushing 73a and the spring washer 500. This can enhance a coupling force of the inner bushing 73a and reduce vibrations, thereby preventing entangled state releasing.

Hereinafter, with reference to FIGS. 54 to 56, will be explained a structure to enhance an assembly characteristic between a bearing housing and a stator in a dual motor applied to a washing machine according to the present disclosure. Firstly, an assembly structure of the present disclosure will be explained with reference to FIG. 54. A bearing housing 6100 is provided with a bearing shaft hole 6140 for penetrating a rotor shaft of a stator 2000 therethrough, and is concentrically coupled to the stator 2000 in a covering manner.

The present disclosure may be applied to a dual motor system as well as a single motor system. FIG. 54 illustrates that the bearing housing 6100 and the stator 2000 are assembled to each other in a dual motor system according to the present disclosure. Hereinafter, the descriptions will be explained with reference to FIG. 54. The present disclosure provides a structure to enhance an assembly characteristic between the bearing housing and the stator of a dual motor, and a washing machine having the structure. In the present disclosure, the bearing housing 6100 having a housing body 6110, a bearing shaft hole 6140 and a stator coupling opening 6130 is assembled to the stator 2000 having outer teeth 2100, inner teeth 2200, a yoke 2500 and a housing coupling opening 2300. The stator coupling opening 6130 includes a fitting protrusion 6130a, and the housing coupling opening 2300 includes a fitting recess 2300a. For the assembly, the fitting protrusion 6130a is inserted into the fitting recess 2300a.

The stator 2000 is provided with a water blocking mounting rib 2700 of a ring shape protruding from the yoke 2500 in an axial direction. Preferably, the water blocking mounting rib 2700 has a diameter equal to or a little larger than a diameter of the body 6110 of the bearing housing. More concretely, the body 6110 of the bearing housing 6100 is insertion-fixed to an inner circumferential surface of the water blocking mounting rib 2510. Here, the stator coupling opening 6130 and the housing coupling opening 2300 are aligned with each other. For the alignment, the fitting protrusion 6130a of the stator coupling opening 6130 is inserted into the fitting recess 2300a of the housing coupling opening 2300. The stator coupling opening 6130 of the bearing housing 6100 is provided with the fitting protrusion 6130a rather than the fitting recess. Since the fitting recess 6130a is integrally protruding from the bearing housing 2000, it has to be implemented as a metallic member having a high intensity.

The stator 2000 is a stator applied to a dual motor including an inner rotor and an outer rotor. The stator 2000 is provided with the outer teeth 2100 protruding from an outer circumference in a radial direction. Although not shown, an outer rotor is mounted on an outer circumference of the stator with a distance from the outer teeth 2100, and rotates by a magnetic force. The stator 2000 is provided with the inner teeth 2200 protruding from an inner circumference toward the center. Although not shown, an inner rotor is mounted on an inner circumference of the stator with a distance from the inner teeth 2200, and rotates by a magnetic force. As shown in FIG. 54, the bearing housing 6100 is coupled to the stator 2000 by being fixed to the yoke 2500 of the stator 2000. Accordingly, the inner rotor is in a completely covered state. Heat of a high temperature generated from the inner rotor is not easily radiated to the outside. This may damage a coil wound on the inner teeth 2200, or cause a mal-operation.

Figure 54:
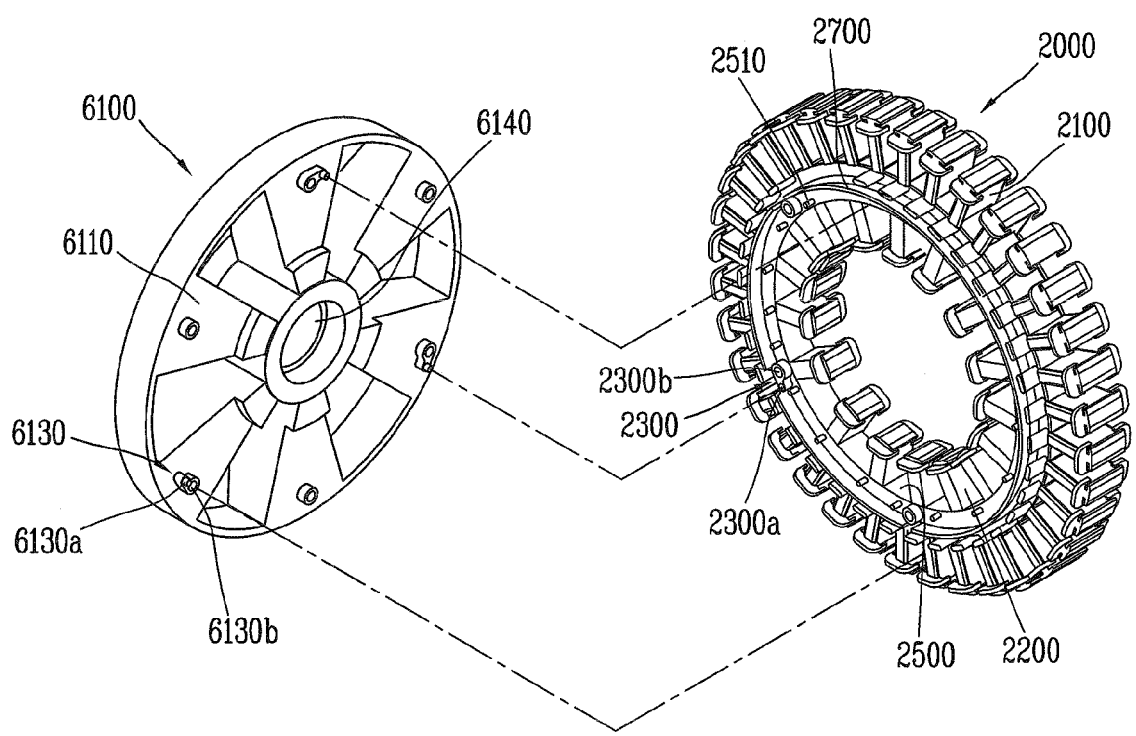
FIG. 54 is a view showing assembly of a bearing housing and a stator of a dual motor applied to the washing machine of the present invention.
Figure 55:
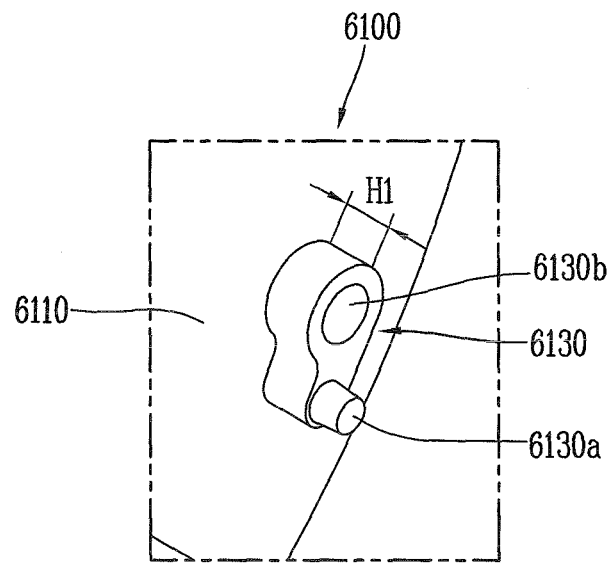
FIG. 55 is a view showing a stator coupling opening of a bearing housing of a dual motor applied to the washing machine of the present invention.
Figure 56:
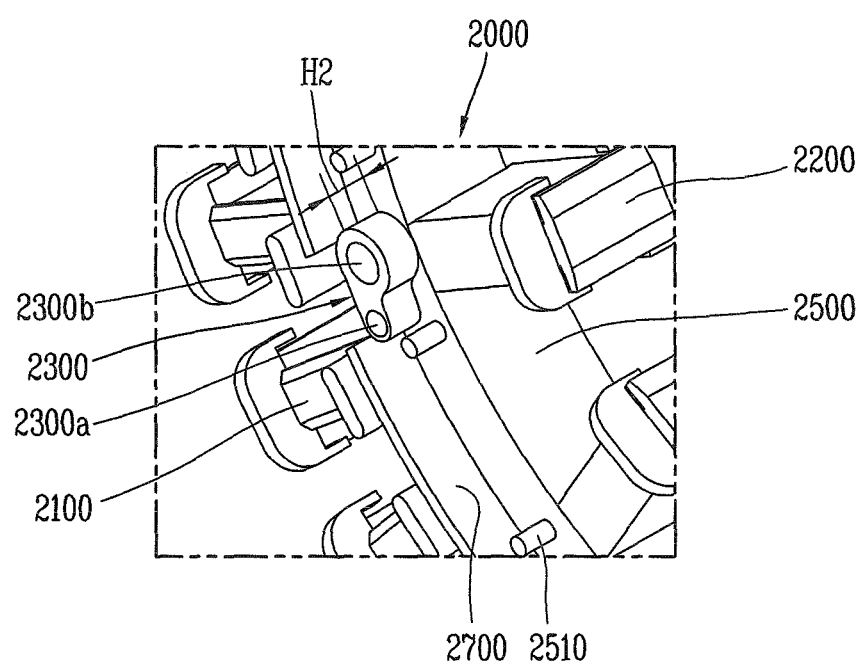
FIG. 56 is a view showing a housing coupling hole of a stator of a dual motor applied to the washing machine of the present invention.

Accordingly, as shown in FIGS. 54 and 56, the stator 2000 is provided with a spacer 2510 protruding from the yoke 2500 so that the stator 2000 may be coupled to the bearing housing 6100 with a gap therebetween. The heat generated from the inner rotor circulates at a space between the bearing housing 6100 and the yoke 2500 of the stator 2000, and is radiated to the outside without being over-heated. The spacer 2510 is formed at the yoke 2500 in plurality with a constant gap therebetween, so that the bearing housing 6100 may be sufficiently spaced from the inner rotor formed inside the stator 2000. Hereinafter, shapes and structures of the stator coupling opening 6130 and the housing coupling opening 2300, and coupling therebetween will be explained with reference to FIGS. 55 and 56.

The stator coupling opening 6130 and the housing coupling opening 2300 are provided with coupling openings 6130b and 2300b communicated with each other when the bearing housing 6100 and the stator 2000 are assembled to each other. In a state that the fitting protrusion 6130a has been insertion-fixed to the fitting recess 2300a, the bearing housing 6100 and the stator 2000 are assembled to each other by screws through the coupling openings 6130b and 2300b. As aforementioned, the body 6110 of the bearing housing 6100 is insertion-fixed to the water blocking mounting rib 2700 of the stator 2000. In this case, it is difficult to align the coupling openings 6130b and 2300b to each other for communications. Accordingly, the fitting protrusion 6130a and the fitting recess 2300a may be coupled to each other for alignments.

In the conventional art, the stator 2000 is provided with a fitting protrusion, and the bearing housing 6100 is provided with a fitting recess for alignments. However, in a case that the fitting protrusion of the stator 2000 is formed of a plastic material, the fitting protrusion may be damaged, e.g., it may be broken, bent, etc. This may cause a difficulty in aligning the coupling opening 6130b of the bearing housing 6100 and the coupling opening 2300b of the stator 2000 to each other for communications. In order to solve these problems, in the present disclosure, the bearing housing 6100 formed of a metallic material having a high intensity is provided with the fitting protrusion 6130b, and the stator 2000 formed of a plastic material is provided with the fitting recess 2300b. This may solve difficult assembly processes due to damages of the fitting protrusion.

As shown in FIGS. 55 and 56 according to still another embodiment of the present disclosure, the stator coupling opening 6130 is protruding from the body 6110 of the bearing housing 6110 by a predetermined height (H) in an axial direction. Like the aforementioned spacer 2510, the stator coupling opening 6130 serves to separate the bearing housing from the inner rotor of the stator, thereby circulating heat generated from the inner rotor and radiating the heat. This may enhance a radiating effect. In the present disclosure, the housing coupling opening 2300 may be protruding from the yoke 2500 of the stator 2000 by a predetermined height (H2) in an axial direction. Preferably, the spacing distance between the bearing housing 6100 and the inner rotor is sufficiently obtained by making the stator coupling opening 6130 and the housing coupling opening 2300 protruding by the predetermined heights (H1, H2). The housing coupling opening 2300 is integrally formed with the water blocking mounting rib 2700 to have a higher intensity. This may allow the housing coupling opening 2300 to be easily aligned with the stator coupling opening 6130. The water blocking mounting rib 2700 serves to prevent water of the washing machine having a dual motor from being introduced into the inner rotor, and serves to facilitate the coupling of the bearing housing 6100 to the stator 2000.

According to still another embodiment of the present disclosure, the inner rotor 73 is separately assembled to the outer shaft 81, differently from the aforementioned embodiment where the inner rotor 73 and the stator 71 are integrally fabricated by using the bearing housing. Referring to FIGS. 1, 4 and 5, the inner rotor 73 is fit-assembled to the outer shaft 81 in a separate manner. In this case, the fitting process may be difficult due to the inner rotor 73 having a magnetic component.

In the present disclosure, an assembly auxiliary jig is additionally extending from the end of the outer shaft 81, thereby guiding an inner rotor assembly. The outer shaft 81 to which the inner rotor 73 is fit-coupled may be implemented as a magnetic substance formed of a metallic material having a high intensity. Accordingly, it is preferable for the assembly auxiliary jig to be formed of a non-magnetic substance not influenced by a magnetic component, and to be sufficiently extending from the outer shaft 81.

Figure 58:
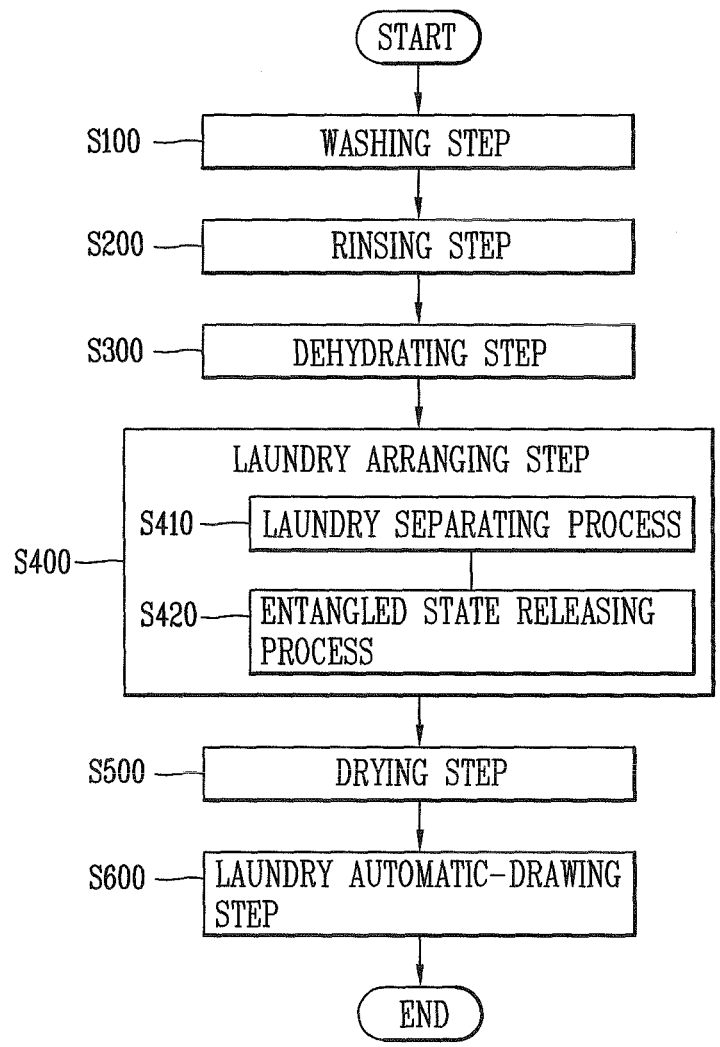
FIG. 58 is a flowchart showing an operation method for the washing machine.

Hereinafter, will be explained a method for driving a washing machine in a 3D-motion manner by a dual drum, and a control method thereof. A method for driving a washing machine, or a washing operation has been aforementioned in FIG. 58. Referring to FIG. 58, a method for driving a washing machine according to one embodiment of the present disclosure comprises a washing step of performing a washing process by supplying washing water and a detergent (S100), a rinsing step of performing a rinsing process by supplying rinsing water (S200), a dehydrating step of discharging rinsing water and performing a dehydrating process (S300), and a laundry arranging step of separating laundry from the main drum and the sub drum and releasing an entangled state of the laundry after the dehydration process (S400).

In the washing step (S100), a washing process is performed by supplying washing water and a detergent. In S100, laundry is washed with moving by rotations of the main drum and the sub drum. The washing step (S100) may include a 3D washing process and a general washing process. In the 3D washing process, laundry moves in a circumferential direction by rotations of the main drum and the sub drum. Then, the laundry rotates at an interface between the main drum and the sub drum by relative motions of the main drum and the sub drum, and moves in an axial direction. As indicated by the arrow of FIG. 10, laundry moves in an entangled state belt shape. This is because the laundry moves in a circumferential direction and drops by gravity while rotating.

In the general washing process (S120), laundry moves in a circumferential direction by rotations of the main drum and the sub drum. Differently from the 3D washing process, the main drum and the sub drum integrally rotate without having relative motions performed in the general washing process. In the washing step (S100), the 3D washing process and the general washing process may be alternately performed. More concretely, the 3D washing process and the general washing process may be performed sequentially, or in reverse order. Alternatively, the general washing process may be performed while the 3D washing process is performed a plurality of times, or vice versa.

In the rinsing step (S200), rinsing water is supplied to remove a detergent, etc. remaining on the laundry. In the dehydrating step (S300), the rinsing water is discharged by a centrifugal force due to rotations of the drum, and the laundry is dehydrated. In the laundry arranging step (S400), the laundry is separated from the main drum and the sub drum, and is out of an entangled-state. The laundry arranging step (S400) includes a laundry separating process (S410) of separating the laundry from inner surfaces of the main drum and the sub drum, and an entangled state releasing process (S420) of releasing an entangled state of the laundry while the laundry rotates by relative motions of the main drum and the sub drum, and moves in a circumferential direction and an axial direction.

In the laundry separating process (S410), the laundry is separated from an inner circumferential surface of the drum by 3D motions thereof after the dehydration process. In the entangled state releasing process (S420), the laundry separated from the inner circumferential surface of the drum undergoes 3D motions for a predetermined time so as to be out of an entangled state. The main drum and the sub drum have to integrally rotate so as to remove water by a centrifugal force during a dehydration process. In this case, the laundry may be in an entangled state. Accordingly, required is the entangled state releasing process. The laundry separating process and the entangled state releasing process may be consecutively performed. Alternatively, the laundry separating process may be performed firstly, and then the entangled state releasing process may be performed after a predetermined time has lapsed. The laundry separating process and the entangled state releasing process need not be performed for a long time. It is enough for the laundry separating process and the entangled state releasing process to be performed for a time duration for which the laundry is separated from the inner circumferential surface of the drum and the laundry is out of an entangled state. The reason is because dehydrated laundry may have damages when the two drums perform relative motions for a long time.

If the washing machine is implemented as a washing machine for dual purposes of washing and drying, the method may further comprise a drying step of drying the laundry (S500) after the laundry arranging step (S400). Under this configuration, the laundry is separated from the drum through 3D motions after a dehydrating process, and then is out of an entangled state so as to prevent wrinkles. In a washing machine for dual purposes of washing and drying, the laundry may be arranged before a drying step so as to prevent wrinkles, etc. occurring during the drying step. The method for driving a washing machine may further comprise a laundry automatic-drawing step of drawing the laundry to the outside by relative motions of the main drum and the sub drum (S600) after the drying step (S500).

Figure 57:
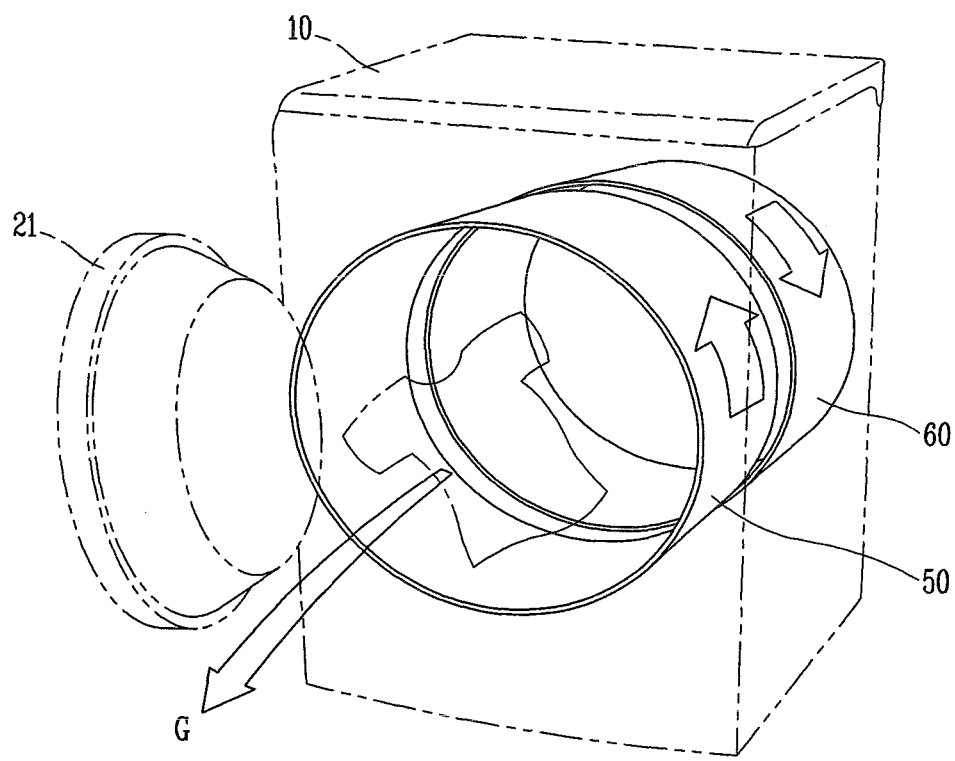
FIG. 57 is a schematic view showing that laundry is automatically drawn out of the washing machine.

The laundry automatic-drawing step (S600) is performed only after a door 21 of the washing machine has opened. FIG. 57 illustrates motions of the laundry by the laundry automatic-drawing step. Referring to FIG. 57, once the door 21 disposed on a front surface of a body 10 has opened, the laundry is discharged to the outside (indicated by the arrow of G) by relative motions of the main drum and the sub drum. The reason is because the laundry may be discharged to the outside of the drum when the sub drum rapidly rotates, since the laundry moves in an axial direction by relative motions of the main drum and the sub drum as shown in FIG. 10. Under this configuration, the laundry is automatically drawn out in a simple manner by relative motions of the main drum and the sub drum after the operation of the washing machine has ended. This may enhance a use's convenience.

The method for driving a washing machine comprises a laundry separating step (S410) of separating the laundry from the inner surfaces of the main drum and the sub drum by relative motions of the main drum and the sub drum through the driving motor after the dehydrating step, and an entangled state releasing step (S420) of releasing an entangled state of the laundry which is rotating in a circumferential direction and an axial direction by relative motions of the main drum and the sub drum. And, the method may further comprise a laundry automatic-drawing step (S600) of performing relative motions of the main drum and the sub drum by the driving motor so that the laundry may be discharged to the outside of the door after the door has opened. The laundry separating step, the entangled state releasing step and the laundry automatic-drawing step have been explained on the basis of the aforementioned driving motor, and thus detailed explanations thereof will be omitted.

Figure 59:
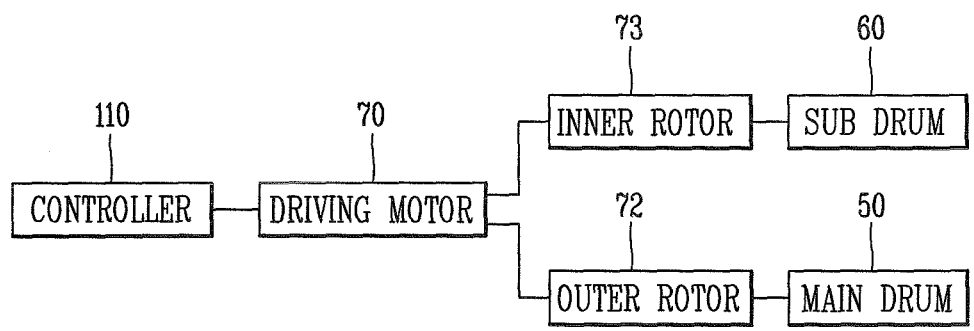
FIG. 59 is a block diagram showing a structure for controlling drums of the washing machine.
Figure 60A:
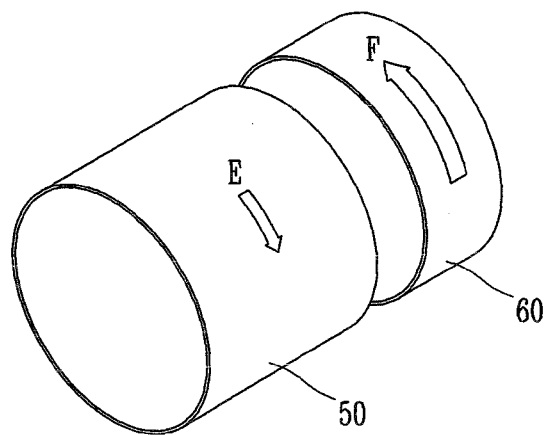
FIG. 60A is a schematic view showing a first example of relative rotations of the main drum and the sub drum under control of FIG. 59.

FIG. 59 illustrates a method for controlling the washing machine. Referring to FIG. 59, the driving motor 70 controls the main drum 50 and the sub drum 60 to perform relative motions by independently rotating the outer rotor 72 and the inner rotor 73. This control by the driving motor may be performed by a controller 110 of the washing machine. The controller 110 controls the operation of the driving motor by transmitting a preset signal to the driving motor in each step. Various relative motions of the main drum and the sub drum by the driving moor are illustrated in FIG. 60. The driving motor controls the sub drum and the main drum to rotate in opposite directions. Preferably, the sub drum is controlled to rotate more rapidly than the main drum. This relative motion is illustrated in FIG. 60A. Referring to FIG. 60A, the main drum 50 rotates in a clockwise direction (indicated by the arrow of E), and the sub drum 60 rotates in a counterclockwise direction (indicated by the arrow of F). The main drum 50 and the sub drum 60 rotate in opposite directions in a state that a rotation speed of the sub drum (the size of the arrow of F) is faster than a rotation speed of the main drum (the size of the arrow of E).

Figure 60B:
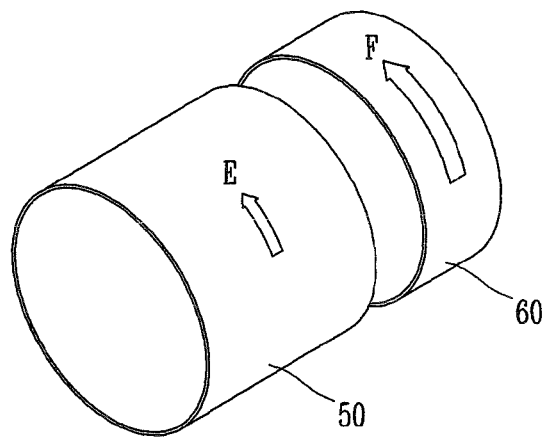
FIG. 60B is a schematic view showing a second example of relative rotations of the main drum and the sub drum under control of FIG. 59.
Figure 60C:
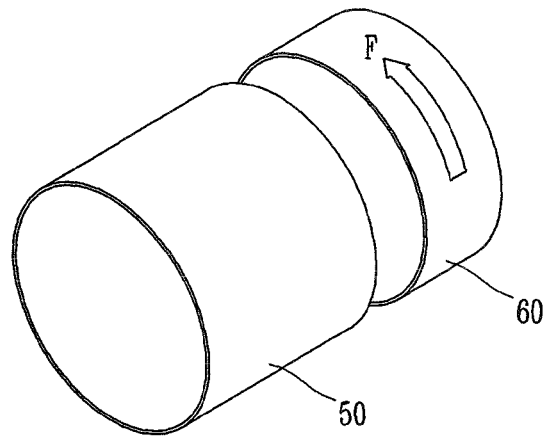
FIG. 60C is a schematic view showing a third example of relative rotations of the main drum and the sub drum under control of FIG. 59.

The driving motor may allow the sub drum and the main drum to rotate in the same direction with different rotation speeds. Preferably, the sub drum is controlled to rotate more rapidly than the main drum. This relative motion is illustrated in FIG. 60B. Referring to FIG. 60B, the main drum 50 rotates in a counterclockwise direction (indicated by the arrow of E), and the sub drum 60 rotates in a counterclockwise direction (indicated by the arrow of F). The main drum 50 and the sub drum 60 rotate in the same directions in a state that a rotation speed of the sub drum (the size of the arrow of F) is faster than a rotation speed of the main drum (the size of the arrow of E). The driving motor may allow only the sub drum to rotate. This relative motion is illustrated in FIG. 60C. Referring to FIG. 60C, the main drum 50 is fixed, and the sub drum 60 rotates in a counterclockwise direction (indicated by the arrow of F). Under these configurations, the main drum and the sub drum may perform various relative motions under controls of the driving motor. This may allow the laundry inside the drum to perform 3D motions. Under these configurations, the laundry performs 3D motions by relative motions of the drums controlled by the driving motor. This may prevent wrinkles of the laundry, and allow the laundry to be automatically drawn out.

Figure 61:
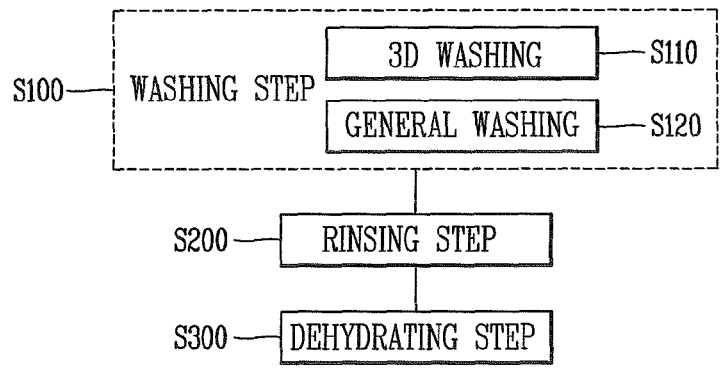
FIG. 61 is a flowchart showing an operation method for the washing machine.

According to still another embodiment of the present disclosure, a washing step in a method for driving a washing machine is performed in a more divided manner. The method for driving a washing machine has been aforementioned in FIG. 8. Referring to FIG. 61, a method for driving a washing machine according to one embodiment of the present disclosure comprises a washing step of performing a washing process by supplying washing water and a detergent (S100), a rinsing step of performing a rinsing process by supplying rinsing water (S200), and a dehydrating step of discharging rinsing water and performing a dehydrating process (S300). The washing step (S100) includes a 3D washing process (S110) of rotating laundry and moving the laundry in a circumferential direction and an axial direction by relative motions of the main drum and the sub drum. As aforementioned, the washing step (S100) includes a 3D washing process (S110) and a general washing process (S120). In the washing step for performing a washing process by supplying washing water and a detergent, the driving motor controls the main drum and the sub drum to perform relative motions so that the laundry may rotate and may move in a circumferential direction and an axial direction.

Figure 62:
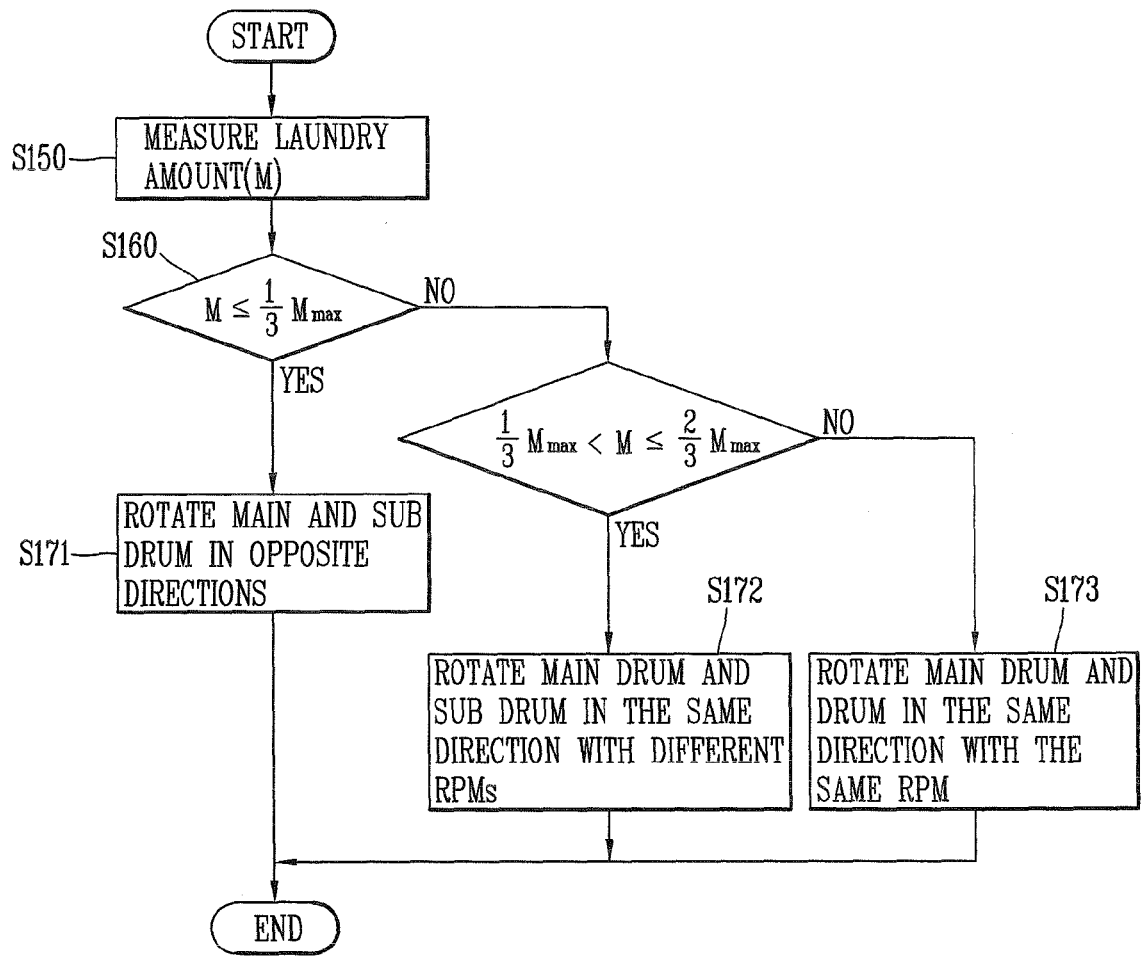
FIG. 62 is a flowchart showing a control method for a washing machine according to a laundry amount according to the present invention.

FIG. 62 illustrates a method for controlling a washing machine according to another embodiment of the present disclosure. In this embodiment of FIG. 62, a washing process is differently performed according to a laundry amount. More concretely, the driving motor controls the main drum and the sub drum according to a laundry amount measured in the washing step for performing a washing process by supplying washing water and a detergent. For instance, the driving motor controls the main drum and the sub drum to perform relative rotations so that laundry may move in an axial direction and a circumferential direction with rotations, or controls the main drum and the sub drum to integrally rotate so that laundry may move only in a circumferential direction. This embodiment of FIG. 62 is applied to the washing machine for 3D motions. In this embodiment, a laundry amount (M) has to be measured in advance (S150). The measurement may be performed based on a load of a drum by rotating the drum at an initial stage. Alternatively, the measurement may be performed by an additional load sensor.

Washing processes are performed differently according to a measured laundry amount (S160) based on a maximum load (Mmax) of the driving motor 70. More concretely, when a laundry amount is less than ⅓ of the maximum load of the driving motor, the driving motor rotates the main drum and the sub drum in opposite directions (S171). When a laundry amount is more than ⅓ and less than ⅔ of the maximum load of the driving motor, the driving motor rotates the main drum and the sub drum in the same direction with different speeds (S172). When a laundry amount is more than ⅔ of the maximum load of the driving motor, the driving motor integrally rotates the main drum and the sub drum in the same direction (S173). Under these configurations, the laundry performs general planar motions or 3D motions according to the amount. This may implement an optimum washing performance without causing an overload to the driving motor.

Figure 63:
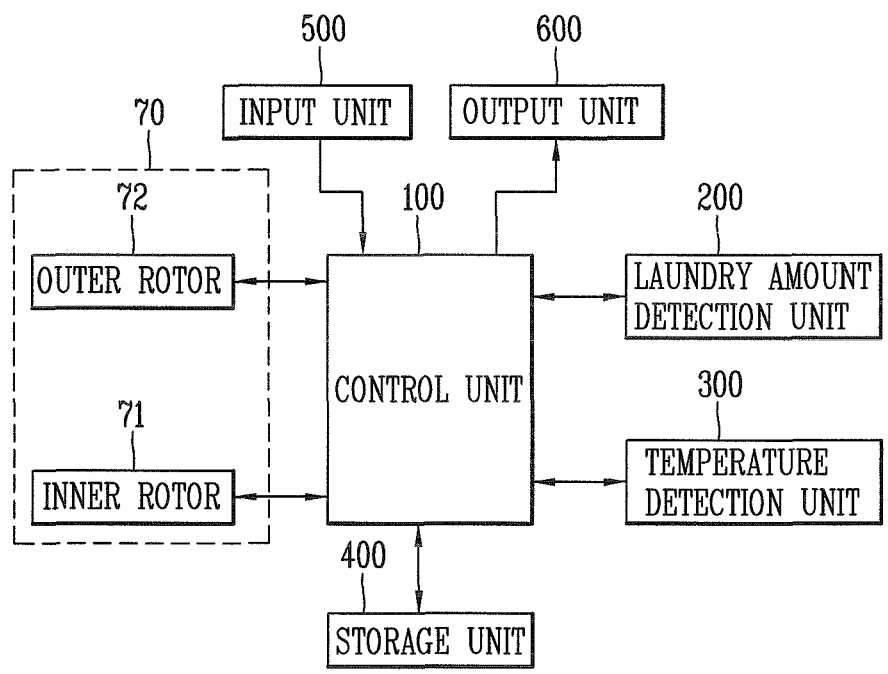
FIG. 63 is a block diagram showing a schematic configuration of a motor driving apparatus of a washing machine according to an embodiment of the present invention.

Hereinafter, the method for driving a washing machine by varying RPMs of the main drum and the sub drum will be explained in more details. Referring to FIG. 63, a control unit 100 may control currents to be applied to inner and outer winding portions of the driving motor 70. This may allow the inner and outer rotors to rotate independently. As a result, as shown in FIG. 5, the main drum 50 and the sub drum 60 may rotate independently by one driving motor 70. Referring to FIGS. 1 and 63, the control unit 100 may be installed in a control panel 30, or in a container additionally provided at one side in the washing machine. The control unit 100 is generally implemented as one or more PCBs. The washing machine further comprises a storage unit 400 configured to store therein a driving program, information on processes of washing, drying, dehydration, etc., and so on. The washing machine further comprises an input unit 500 having each type of manipulation buttons disposed on the control panel 30. And, the washing machine may further comprise an output unit 600 configured to output a time, a temperature, a state, an error, etc. The control unit 100 initially operates the outer rotor 72 and the inner rotor 73 with the same starting RPM smaller than target RPMs of the outer rotor 72 and the inner rotor 73. The target RPM may be variable according to a laundry amount and a motion type, and each of the outer rotor and the inner rotor may have a set target RPM. The starting RPM may be a target RPM of the inner rotor.

Figure 64:
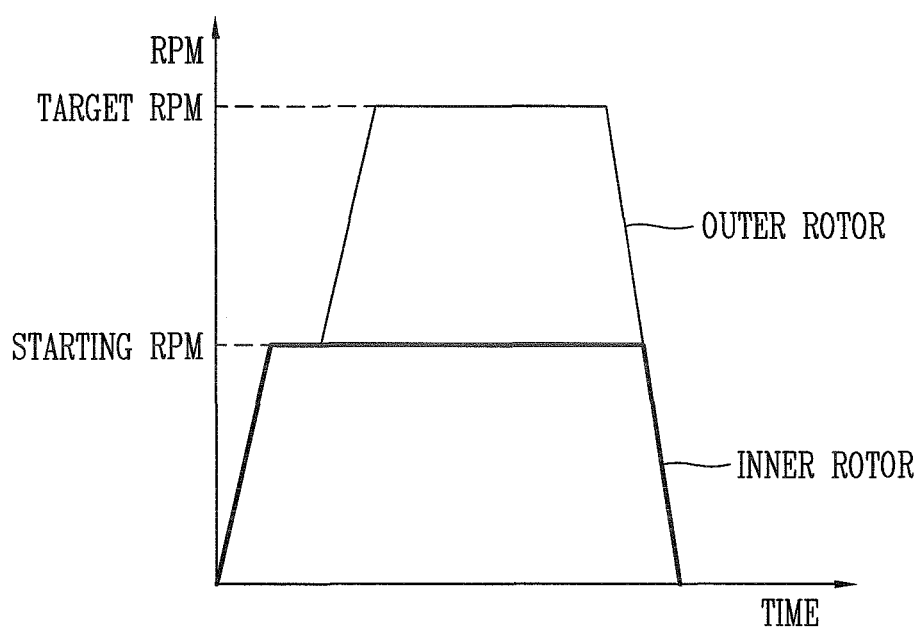
FIG. 64 is a graph showing an operation for initially driving a driving motor according to an embodiment of the present invention.

Referring to FIG. 64, the driving motor of the washing machine starts to operate with a target RPM of the inner rotor. After a predetermined time has lapsed, the outer rotor 72 rotates with increasing a speed into a preset target RPM. On the other hand, the inner rotor 73 rotates with maintaining the starting RPM. Here, the starting RPM may be set as a value rather than the target RPM of the inner rotor. If the inner rotor and the outer rotor start to operate and at the same time rotate with different target RPMs, an over current may be applied to the driving motor. As shown in FIG. 64, an over current is applied to the outer rotor set to have a high RPM, and a large amount of heat is generated from the motor. On the other hand, if the driving motor starts to operate in a state that the inner rotor and the outer rotor have the same RPM, a load of the motor is reduced and the amount of heat is reduced. This may prevent a failure of the initial operation of the driving motor due to an over current.

Referring to FIG. 63 back, the washing machine according to another embodiment includes the control unit 100 configured to operate the outer rotor 72 and the inner rotor 73 of the driving motor 70, respectively. The control unit 100 is connected to the input unit 500, the output unit 600, a laundry amount detection unit 200 and a temperature detection unit 300. The control unit 100 controls one of the outer rotor 72 and the inner rotor 73 having a larger torque to firstly start to operate. The same configuration of the washing machine as that aforementioned in one embodiment will not be explained.

Figure 65:
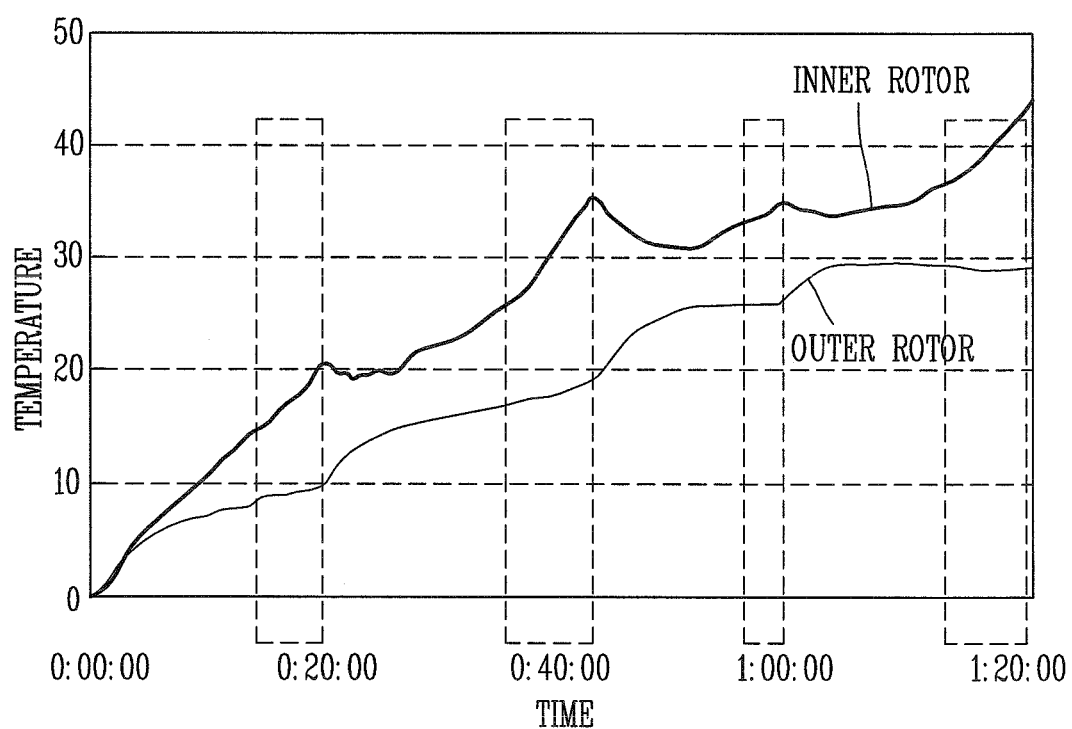
FIG. 65 is a graph showing a temperature change of a driving motor according to the order of initially driving an outer rotor and an inner rotor.

FIG. 65 is a graph showing temperature changes of the inner rotor and the outer rotor after an initial operation (including restart). Referring to FIG. 65, the inner rotor 73 has a greater temperature than the outer rotor 72 according to time lapses. The reason is because a large amount of current is applied to the inner rotor 73 since the inner rotor 73 starts to operate faster than the outer rotor 72. If the outer rotor and the inner rotor start to operate and at the same time rotate with target RPMs differently set for various movements, an over current is applied to the driving motor. Especially, an over current is applied to one rotor having a relatively small torque, and the amount of heat generated from the motor is increased. The control unit 100 compares torques of the outer rotor 72 and the inner rotor 73 with each other, and controls one rotor having a relatively large torque to firstly start to operate. For instance, when the inner rotor 73 has a larger torque, the control unit 100 controls the inner rotor to firstly start to operate. This may reduce a load of the outer rotor having a smaller torque, and may prevent an excessive amount of heat. The outer rotor and the inner rotor have different torques for 3D motions.

Referring to FIG. 63, the washing machine further comprises a laundry amount detection unit 200 configured to detect a laundry amount. If a predetermined time lapses after the driving motor 70 has started to operate, the control unit 100 controls a rotation direction or an RPM of each of the outer rotor and the inner rotor according to a laundry amount. For instance, when a laundry amount is less than a reference laundry amount, the control unit 100 rotates the main drum and the sub drum by driving the outer rotor and the inner rotor in opposite directions since the driving motor has a sufficient torque. This may allow the laundry to perform 3D motions, and may shorten a washing time. Here, the reference laundry amount may be set as 4 Kg, 6 Kg, etc.

On the other hand, when a laundry amount is more than the reference laundry amount, the control unit 100 rotates the outer rotor and the inner rotor in the same direction with different RPMs. That is, the control unit 100 controls the main drum and the sub drum to perform relative motions with different RPMs. This may allow the laundry to perform enhanced movements. Furthermore, when a laundry amount is more than the reference amount, the control unit 100 may reduce the amount of heat generated from the driving motor by more reducing the RPMs of the outer rotor and the inner rotor as the laundry amount increases.

As another example, when a laundry amount is less than a first reference laundry amount, the control unit 100 rotates the outer rotor and the inner rotor in opposite directions. When a laundry amount is more than a second reference laundry amount greater than the first reference laundry amount, the control unit 100 rotates the outer rotor and the inner rotor in the same direction. The first reference laundry amount and the second reference laundry amount may be preset based on experiments, etc., and may be set as 4 Kg, 6 Kg, 8 Kg, etc.

The control unit 100 allows the laundry to perform 3D motions by differently setting rotation directions and RPMs according to a laundry amount. And, the control unit 100 enhances the stability of the washing machine by operating the driving motor with consideration of a heat generation amount or torque of the driving motor. For instance, when a laundry amount is more than the first reference laundry amount and less than the second reference laundry amount, the control unit 100 controls rotation directions or RPMs of the outer rotor and the inner rotor according to a heat generation amount or torque of the driving motor. When a laundry amount is more than the first reference laundry amount and less than the second reference laundry amount, the control unit 100 controls the outer rotor and the inner rotor to continuously rotate in opposite directions, and reduces relative speeds of the outer rotor and the inner rotor as the laundry amount increases. This may reduce the amount of heat generated from the driving motor. When a laundry amount is more than the second reference laundry amount, the control unit 100 reduces the relative speeds of the outer rotor and the inner rotor as the laundry amount increases.

The washing machine may further comprise a temperature detection unit 300 provided at the outer rotor or the inner rotor, and configured to detect a temperature. The washing machine is provided with a temperature detection unit such as a thermistor, and the control unit 100 compares a detected temperature of the driving motor with a preset reference temperature. When a detected temperature is more than a reference temperature, the control unit 100 changes a rotation direction or an RPM of the outer rotor or the inner rotor. For instance, the control unit 100 may lower a temperature of the driving motor by reducing or compensating for vibrations by making RPMs of the outer rotor and the inner rotor the same.

Figure 66:
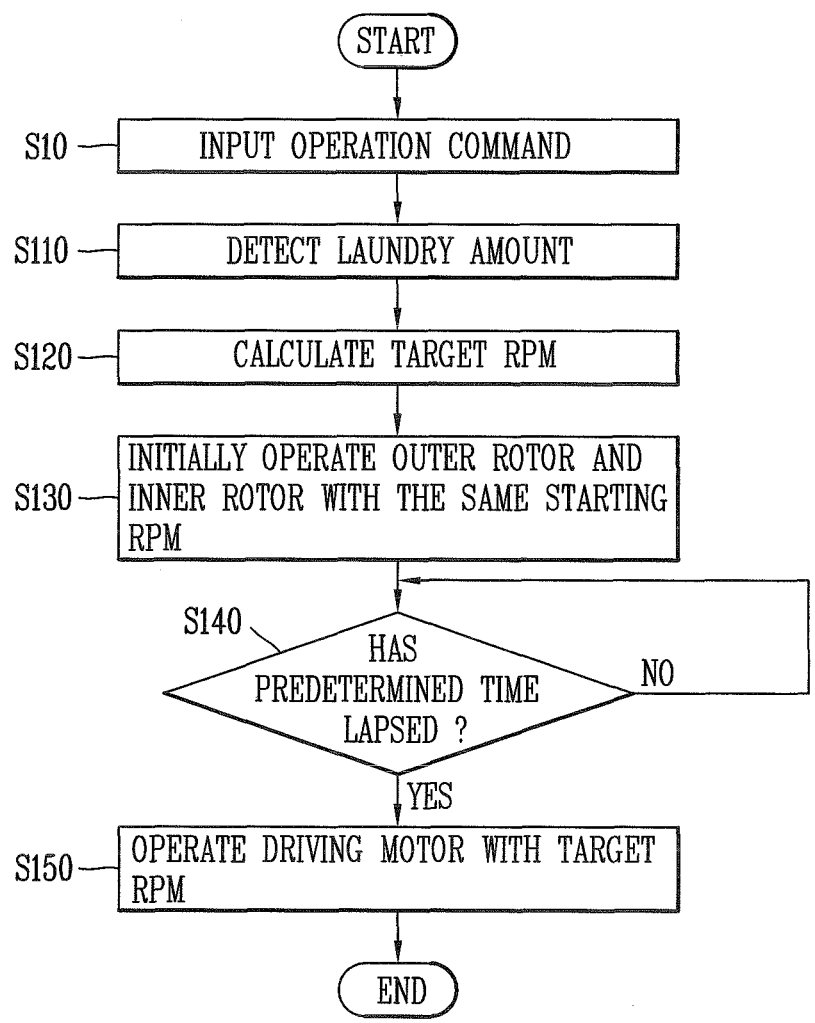
FIGS. 66 to 69 are flowcharts schematically showing a method for controlling a washing machine according to embodiments of the present invention.

Referring to FIG. 66, a method for controlling a washing machine according to one embodiment of the present disclosure comprises initially operating the driving motor with the same starting RPM smaller than target RPMs of the outer rotor and the inner rotor (S130), and operating the outer rotor and the inner rotor with the respective target RPMs when a predetermined time lapses after initially-operating the driving motor (S150). The washing machine initially operates the outer rotor and the inner rotor with the same starting RPM smaller than target RPMs of the outer rotor and the inner rotor (S130). The target RPM may be variable according to a laundry amount, a motion type, etc., and each of the outer rotor and the inner rotor may have a set target RPM (S120). For instance, if a user puts laundry into the washing machine and then inputs an operation command (S10), the washing machine detects a laundry amount (S110) and calculates a target RPM according to the detected laundry amount (S120). Here, the starting RPM may be a target RPM of the inner rotor.

Referring to FIG. 64, the driving motor of the washing machine starts to operate with a target RPM of the inner rotor (S130). After a predetermined time has lapsed (S140), the outer rotor 72 rotates with increasing a speed into a preset target RPM (S150). On the other hand, the inner rotor rotates with maintaining the starting RPM. Here, the starting RPM may be set as a value rather than the target RPM of the inner rotor. If the inner rotor and the outer rotor start to operate and at the same time rotate with different target RPMs, an over current may be applied to the driving motor. As shown in FIG. 64, an over current is applied to the outer rotor set to have a high RPM, and a large amount of heat is generated from the motor. On the other hand, if the driving motor starts to operate in a state that the inner rotor and the outer rotor have the same RPM, a load of the motor is reduced and the amount of heat is reduced. This may prevent a failure of the initial operation of the driving motor due to an over current.

Figure 67:
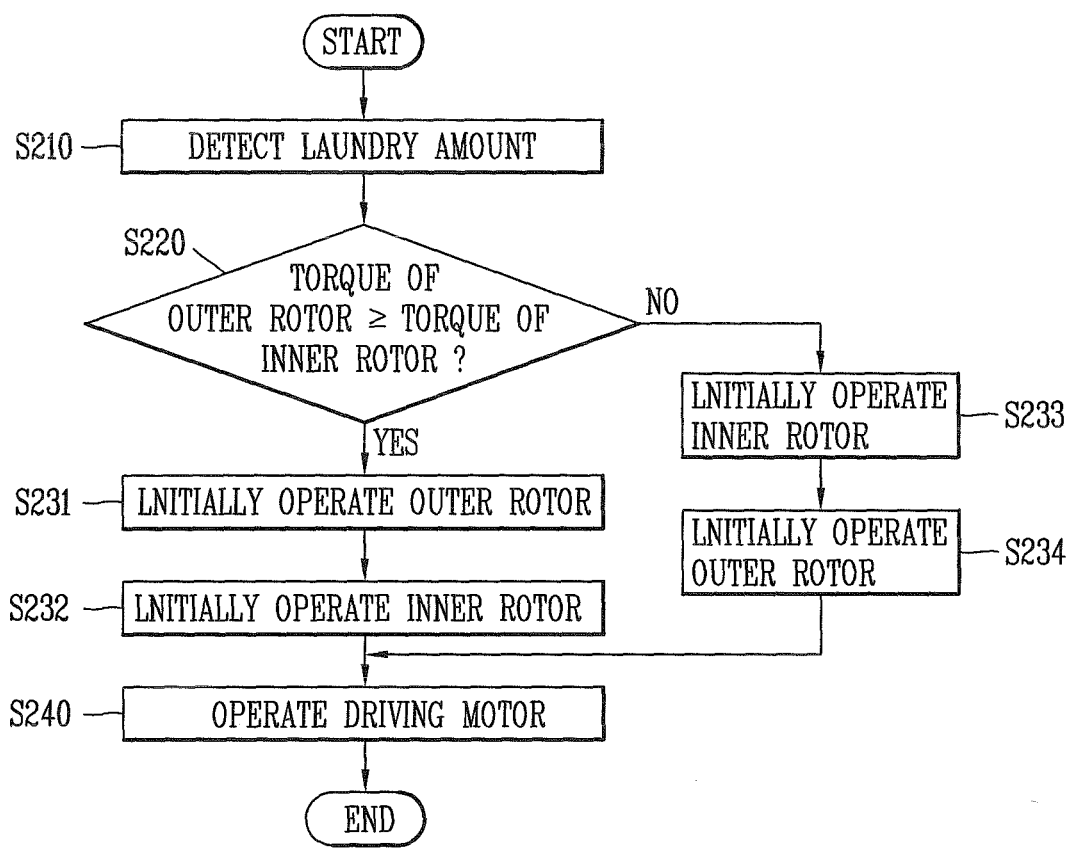

Referring to FIG. 67, a method for controlling a washing machine according to another embodiment of the present disclosure comprises comparing torques of the outer rotor and the inner rotor (S220), firstly initial-operating one rotor having a larger torque and then initial-operating another rotor having a smaller torque based on a comparison result (S230), and operating the outer rotor and the inner rotor with respective target RPMs if a predetermined time lapses after the driving motor 70 has started to operate (S240).

FIG. 65 is a graph showing temperature changes of the inner rotor and the outer rotor after an initial operation (including restart). Referring to FIG. 65, the inner rotor has a greater temperature and a greater change rate than the outer rotor according to time lapses. The reason is because a large amount of current is applied to the inner rotor since the inner rotor starts to operate faster than the outer rotor. If the outer rotor and the inner rotor start to operate and at the same time rotate with target RPMs differently set for various movements, an over current is applied to the driving motor. Especially, an over current is applied to one rotor having a relatively small torque, and the amount of heat generated from the motor is increased. The washing machine compares torques of the outer rotor and the inner rotor with each other (S220), and controls one rotor having a relatively large torque to firstly start to operate (S230). For instance, when the inner rotor has a larger torque, the washing machine firstly initially operates the inner rotor, and then initially operates the outer rotor (S233, S234). This may reduce a load of the outer rotor having a smaller torque, and may prevent an excessive amount of heat. On the other hand, when the outer rotor has a larger torque, the washing machine firstly initially operates the outer rotor, and then initially operates the inner rotor (S231, S232). The outer rotor and the inner rotor have different torques for 3D motions. Then, the washing machine operates the driving motor by differently setting target RPMs and rotation directions according to a detected laundry amount (S240).

The washing machine controls rotation directions or RPMs of the outer rotor and the inner rotor according to a laundry amount if a predetermined time lapses after the driving motor 70 has started to operate. For instance, when a laundry amount is less than a reference laundry amount, the washing machine rotates the main drum and the sub drum by driving the outer rotor and the inner rotor in opposite directions since the driving motor has a sufficient torque. This may allow the laundry to perform 3D motions, and may shorten a washing time. Here, the reference laundry amount may be set as 4 Kg, 6 Kg, etc. On the other hand, when a laundry amount is more than the reference laundry amount, the washing machine rotates the outer rotor and the inner rotor in the same direction with different RPMs. That is, the washing machine controls the main drum and the sub drum to perform relative motions with different RPMs. This may allow the laundry to perform enhanced movements. Furthermore, when a laundry amount is more than the reference amount, the washing machine may reduce the amount of heat generated from the driving motor by more reducing the RPMs of the outer rotor and the inner rotor as the laundry amount increases.

Figure 68:
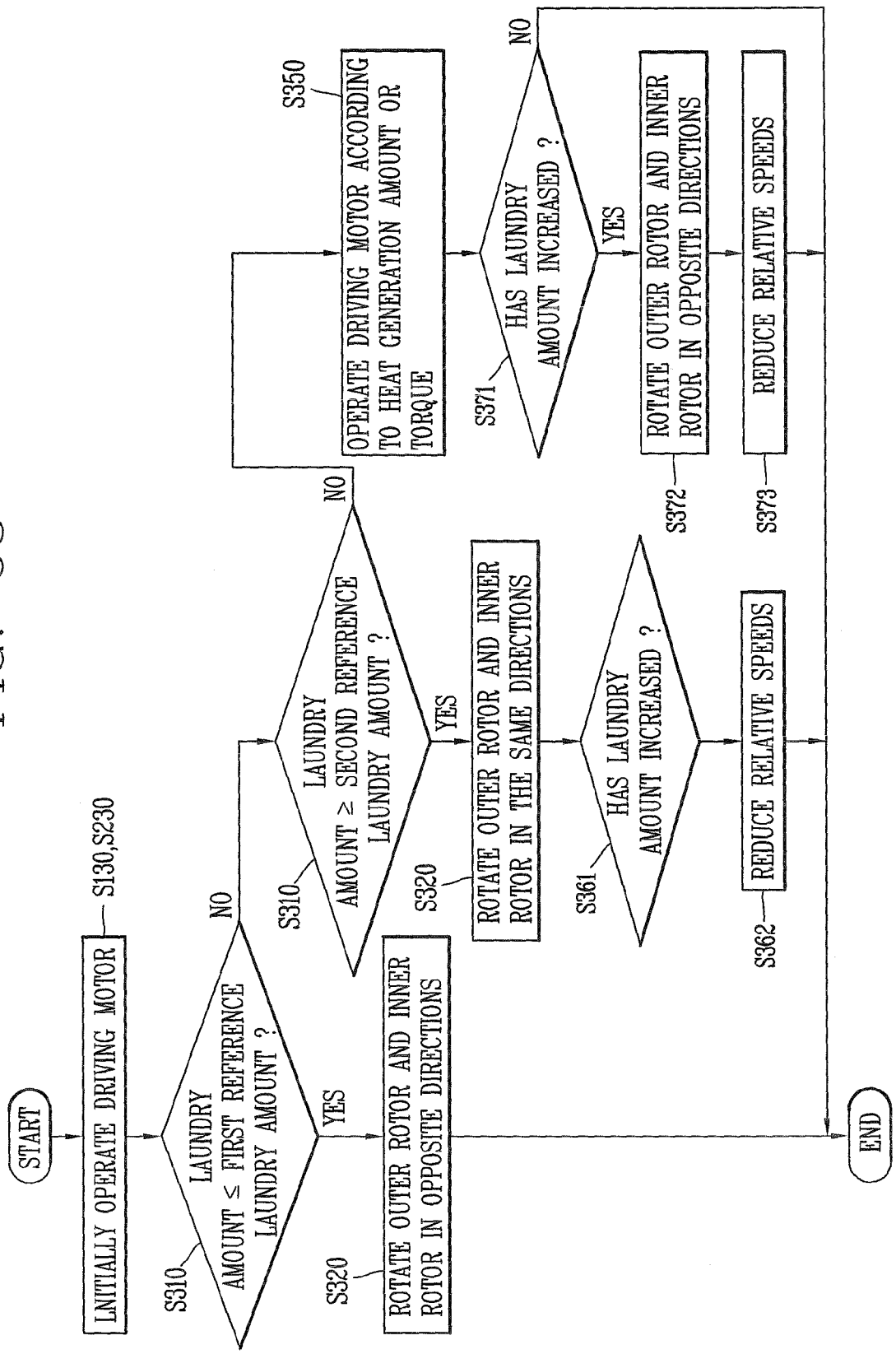

Referring to FIG. 68, as another example, when a laundry amount is less than a first reference laundry amount (S310), the washing machine rotates the outer rotor and the inner rotor in opposite directions (S320). When a laundry amount is more than a second reference laundry amount greater than the first reference laundry amount (S330), the washing machine rotates the outer rotor and the inner rotor in the same direction (S340). The first reference laundry amount and the second reference laundry amount may be preset based on experiments, etc., and may be set as 4 Kg, 6 Kg, 8 Kg, etc.

The washing machine allows the laundry to perform 3D motions by differently setting rotation directions and RPMs according to a laundry amount. And, the washing machine has an enhanced stability by operating the driving motor with consideration of a heat generation amount or torque of the driving motor. For instance, when a laundry amount is more than the first reference laundry amount and less than the second reference laundry amount, the washing machine controls rotation directions or RPMs of the outer rotor and the inner rotor according to a heat generation amount or torque of the driving motor (S350). When a laundry amount is more than the first reference laundry amount and less than the second reference laundry amount, the washing machine controls the outer rotor and the inner rotor to continuously rotate in opposite directions (S372), and reduces relative speeds of the outer rotor and the inner rotor as the laundry amount increases (S373). This may reduce the amount of heat generated from the driving motor. When a laundry amount is more than the second reference laundry amount (S361), the washing machine reduces the relative speeds of the outer rotor and the inner rotor as the laundry amount increases (S362).

Figure 69:
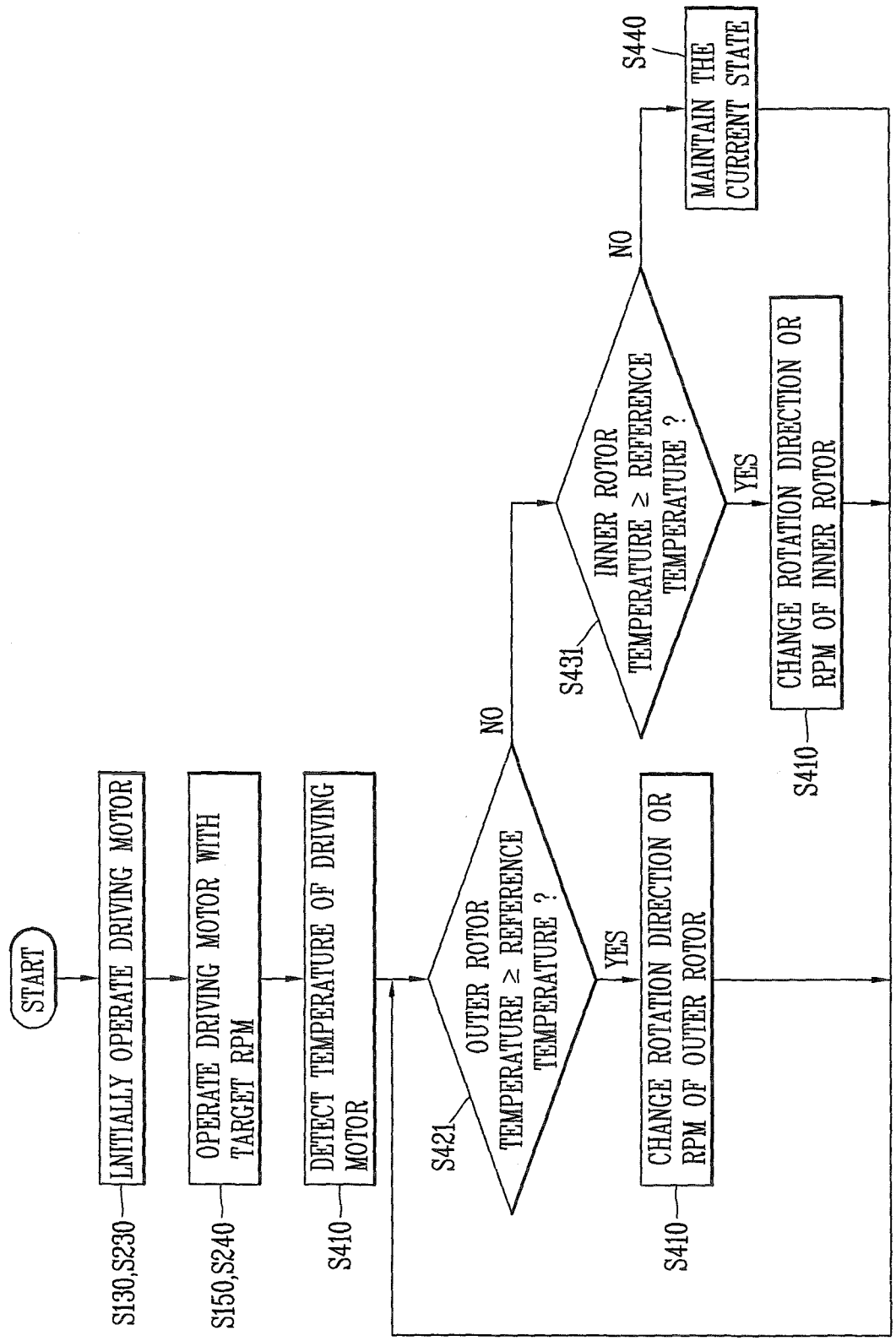

The washing machine may be further configured to detect a temperature of the inner rotor. Referring to FIG. 69, the washing machine is provided with a temperature detection unit such as a thermistor at the driving motor to detect a temperature of the driving motor (S410), and compares the detected temperature with a preset reference temperature (S421, S431). When the detected temperature is more than a reference temperature, the washing machine changes a rotation direction or an RPM of the outer rotor or the inner rotor (S422, S432). For instance, the washing machine may lower a temperature of the driving motor by reducing or compensating for vibrations by making RPMs of the outer rotor and the inner rotor the same. On the other hand, if the detected temperature is lower than the reference temperature, the washing machine maintains the current state (S440).

According to still another embodiment of the present invention, as shown in FIG. 63, the control unit 100 drives the inner rotor 73 and the outer rotor 72 into particular RPMs, respectively, and applies a braking command to the inner rotor 73 and the outer rotor 72. Then, the control unit 100 detects a first laundry amount inside the main drum 50 and a second laundry amount inside the sub drum 60 based on braking times of the inner and outer rotors. The particular RPMs of the inner rotor and the outer rotor may be set as different values, or may be set as the same value (e.g., 150 RPM, 160 RPM, etc.) In the aforementioned description, the first laundry amount and the second laundry amount are detected based on the braking times. However, the first laundry amount and the second laundry amount may be detected based on the number of pulses by rotation.

The control unit 100 may brake the outer rotor and the inner rotor in different manners or in the same manner. That is, the control unit 100 may brake both of the inner and outer rotors using generated power, or may brake both of the inner and outer rotors using redundant power. Alternatively, the control unit 100 may brake one of the inner and outer rotors using generated power, and brake another of the two using redundant power. Explanations about configurations of the generated power braking and the redundant power braking, e.g., resistance, circuit connection, etc. will be omitted.

The washing machine further comprises a current detector 200 configured to detect a first current and a second current applied to the inner rotor and the outer rotor, respectively. The washing machine further comprises an output unit 300 configured to display one of the first laundry amount, the second laundry amount, and a final laundry amount determined based on the first and second laundry amounts. The washing machine further comprises a storage unit 400 configured to store therein a driving program for the washing machine, information on washing, drying, dehydrating, etc. The washing machine further comprises an input unit 500 including all types of manipulation buttons disposed on a control panel 30. The output unit 300 may display time, temperature, state, error, etc.

Figure 70:
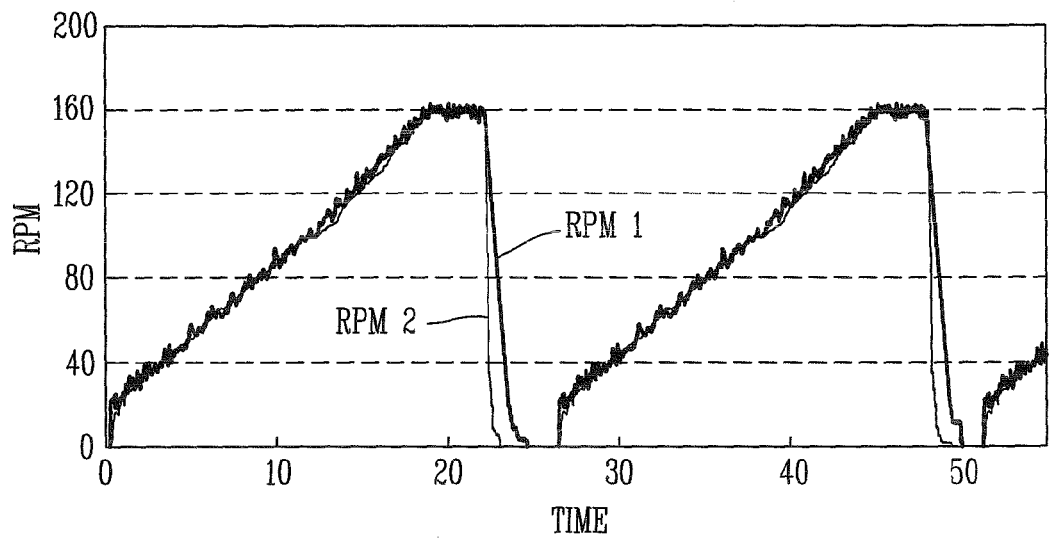
FIG. 70 is a graph showing an operation to detect a laundry amount by braking an outer rotor and an inner rotor using generated power according to the present invention.
Figure 71:
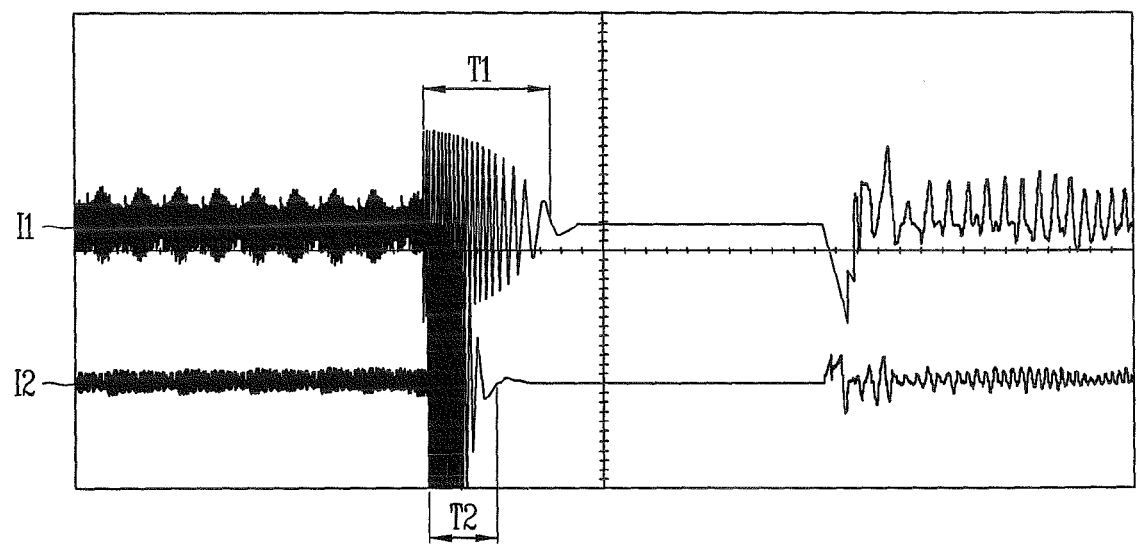
FIG. 71 is a graph showing changes of currents applied to the outer rotor and the inner rotor of FIG. 70.

FIG. 70 is a graph showing RPM change of each rotor when both of the outer rotor 72 and the inner rotor 73 undergo generated power braking FIG. 71 is a graph showing currents applied to the inner and outer rotors of FIG. 70. Referring to FIG. 70, the control unit 100 initially drives the inner and outer rotors, thereby increasing RPMs of the inner and outer rotors to a particular value, 160 RPM. Then, the control unit 100 generates a braking command for the inner and outer rotors, and outputs the generated braking command to the inner and outer rotors. Preferably, the braking command is simultaneously output to the inner rotor 73 and the outer rotor 72 for a minimized change of the laundry amount. In the case of braking both of the inner and outer rotors using generated power, the outer rotor (RPM2) is firstly braked than the inner rotor (RPM1) as shown in FIG. 70. Referring to FIG. 71, current (I1) applied to the inner rotor 73 is larger than current (I2) applied to the outer rotor 72, and braking time (T1) of the inner rotor 73 is longer than braking time (T2) of the outer rotor 72.

Figure 72:
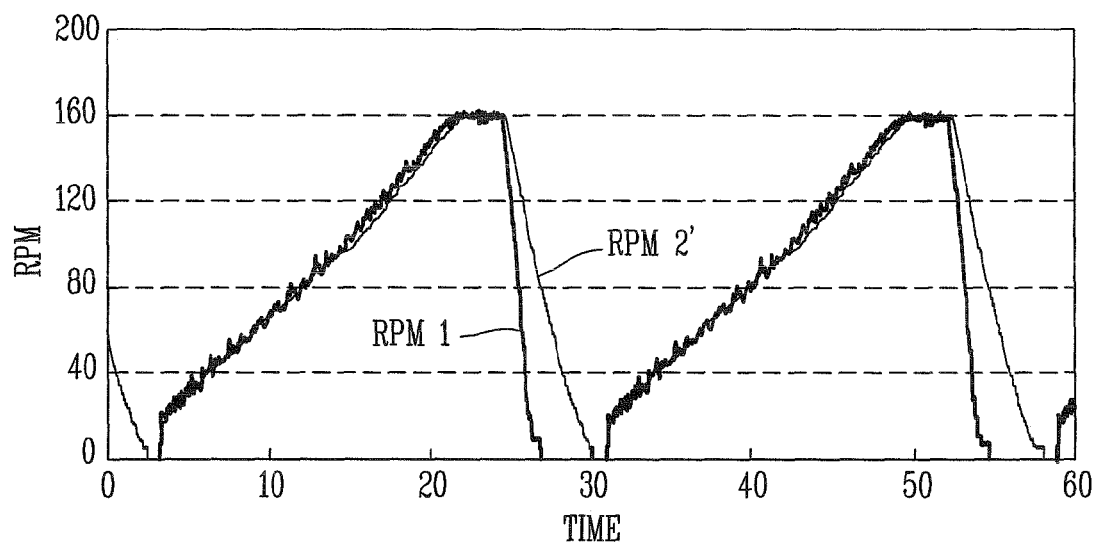
FIG. 72 is a graph showing an operation to detect a laundry amount by braking an outer rotor using redundant power and by braking an inner rotor using generated power according to the present invention.
Figure 73:
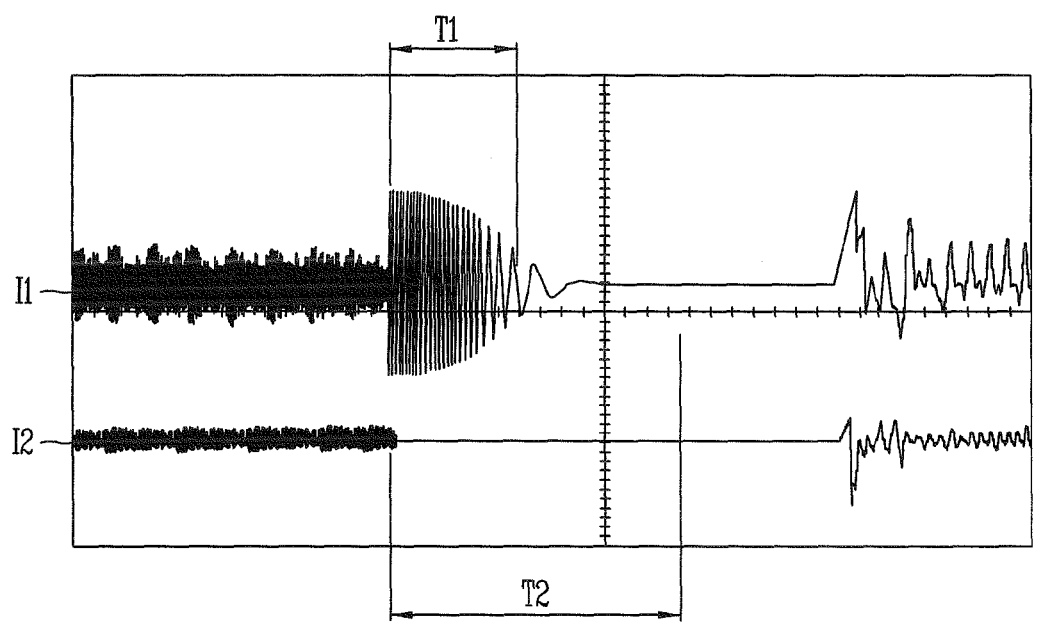
FIG. 73 is a graph showing changes of currents applied to the outer rotor and the inner rotor of FIG. 72.

FIG. 72 is a graph showing an RPM change of each rotor when the outer rotor 72 undergoes redundant power braking and the inner rotor 73 undergoes generated power braking FIG. 73 is a graph showing currents applied to the inner and outer rotors of FIG. 72. Referring to FIG. 72, the control unit 100 initially drives the inner and outer rotors, thereby increasing RPMs of the inner and outer rotors to a particular value, 160 RPM. Then, the control unit 100 generates a braking command for the inner and outer rotors, and outputs the generated braking command to the inner and outer rotors. Preferably, the braking command is simultaneously output to the inner rotor 73 and the outer rotor 72 for a minimized change of the laundry amount. In the case of braking the inner rotor 73 using generated power and braking the outer rotor 72 using redundant power, the inner rotor (RM1) is firstly braked than the outer rotor (RPM2') as shown in FIG. 72. Unlike in FIG. 70, the outer rotor undergoing redundant power braking has a larger RPM than the outer rotor undergoing generated power braking (RPM2'>RPM2). Referring to FIG. 73, current (I1) applied to the inner rotor undergoing generated power braking is larger than current (I2) applied to the outer rotor 72 undergoing redundant power braking. That is, the inner rotor undergoing generated power braking is instantaneously applied with a large current, and has a braking time (T1) shorter than that of the inner rotor undergoing redundant power braking. On the other hand, the outer rotor undergoing redundant power braking has an immediate current change to '0' upon receipt of a braking command, and has a braking time (T2) longer than that of the outer rotor undergoing generated power braking as shown in FIGS. 72 and 73.

Figure 74:
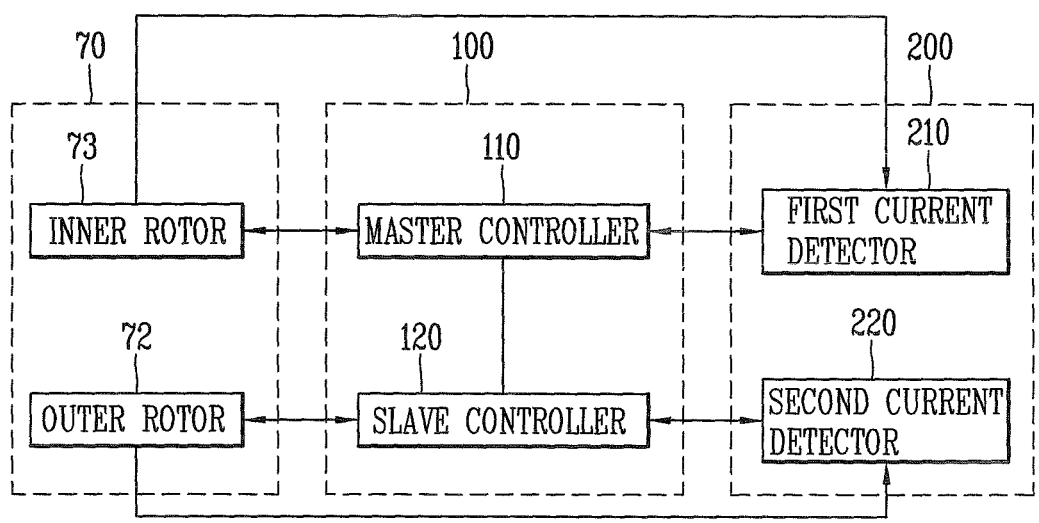
FIG. 74 is a block diagram schematically showing a configuration of a motor driving apparatus for a washing machine according to another embodiment of the present invention.

Referring to FIGS. 1 and 74, a washing machine according to still another embodiment of the present invention comprises a main body 10 which forms an outer appearance; a tub 40 disposed within the main body 10; a main drum 50 rotatably mounted in the tub 40, and accommodating laundry therein; a sub drum 60 mounted in the main drum 50 so as to be relatively rotatable with respect to the main drum 50; a driving motor 70 including a stator 71, an outer rotor 72 connected to the sub drum 60 and rotating outside the stator 71, and an inner rotor 73 connected to the main drum 50 and rotating inside the stator 71; and a control unit 100 configured to drive the outer rotor 72 and the inner rotor 73.

The control unit 100 includes a master controller 110 configured to drive the inner rotor 73, and to detect the first laundry amount based on the braking time of the inner rotor; and a slave controller 120 connected to the master controller 110, configured to drive the outer rotor 72, and to detect the second laundry amount based on the braking time of the outer rotor. The master controller 110 generates a braking command for the outer rotor 72, and transmits the braking command to the slave controller 120. Then, the master controller 110 generates a braking command for the inner rotor 73 after a particular time has lapsed. Here, the particular time is determined based on a communication speed between the master controller and the slave controller, i.e., communication delay. For instance, the particular time may be set as 50 ms, etc. The master controller and the slave controller are configured as different microcomputers. The master controller and the slave controller output the braking commands to the inner rotor and the outer rotor, simultaneously.

After outputting the braking commands, the master controller 110 detects a first laundry amount inside the main drum 50 driven by the inner rotor 73. And, the slave controller 120 detects a second laundry amount inside the sub drum 60 driven by the outer rotor 72. Here, the master controller and the slave controller detect the first and second laundry amounts based on the braking time of the outer rotor, and based on the number of pulses until the outer rotor stops rotating. The particular RPMs of the inner rotor and the outer rotor may be set as different values, or may be set as the same value (e.g., 150 RPM, 160 RPM, etc.) In the aforementioned description, the first laundry amount and the second laundry amount are detected based on the braking times. However, the first laundry amount and the second laundry amount may be detected based on the number of pulses by rotation.

The control unit 100 may brake the outer rotor and the inner rotor in different manners or in the same manner. That is, the control unit 100 may brake both of the inner and outer rotors using generated power, or may brake both of the inner and outer rotors using redundant power. Alternatively, the control unit 100 may brake one of the inner and outer rotors using generated power, and brake another of the two using redundant power. Referring to FIGS. 70 to 73, the master controller and the slave controller initially drive the inner rotor and the outer rotor, thereby increasing RPMs of the inner and outer rotors to a particular value, 160 RPM. Then, the master controller generates a braking command for the outer rotor, and transmits the generated braking command to the slave controller. And, the master controller generates a braking command for the inner rotor. The master controller and the slave controller output the braking commands to the inner rotor and the outer rotor, simultaneously, with consideration of a communication delay therebetween. The master controller detects a first laundry amount based on a braking time of the rotor (i.e., time taken for the inner rotor to stop upon receipt of the braking command). And, the slave controller detects a second laundry amount based on a braking time of the outer rotor (i.e., time taken for the outer rotor to stop upon receipt of the braking command), and transmits information on the second laundry amount to the master controller. Then, the master controller determines a final laundry amount based on the first and second laundry amounts in the following manners. For instance, the first and second laundry amounts may be added to each other in a preset ratio. Alternatively, the first laundry amount or the second laundry amount may be set as the final laundry amount. Most simply, the first laundry amount may be set as the final laundry amount. FIGS. 70 and 71 show a case where a laundry amount is detected after braking the inner and outer rotors using generated power. FIGS. 72 and 73 show a case where a laundry amount is detected after braking the inner rotor using generated power and braking the outer rotor using redundant power.

Figure 75:
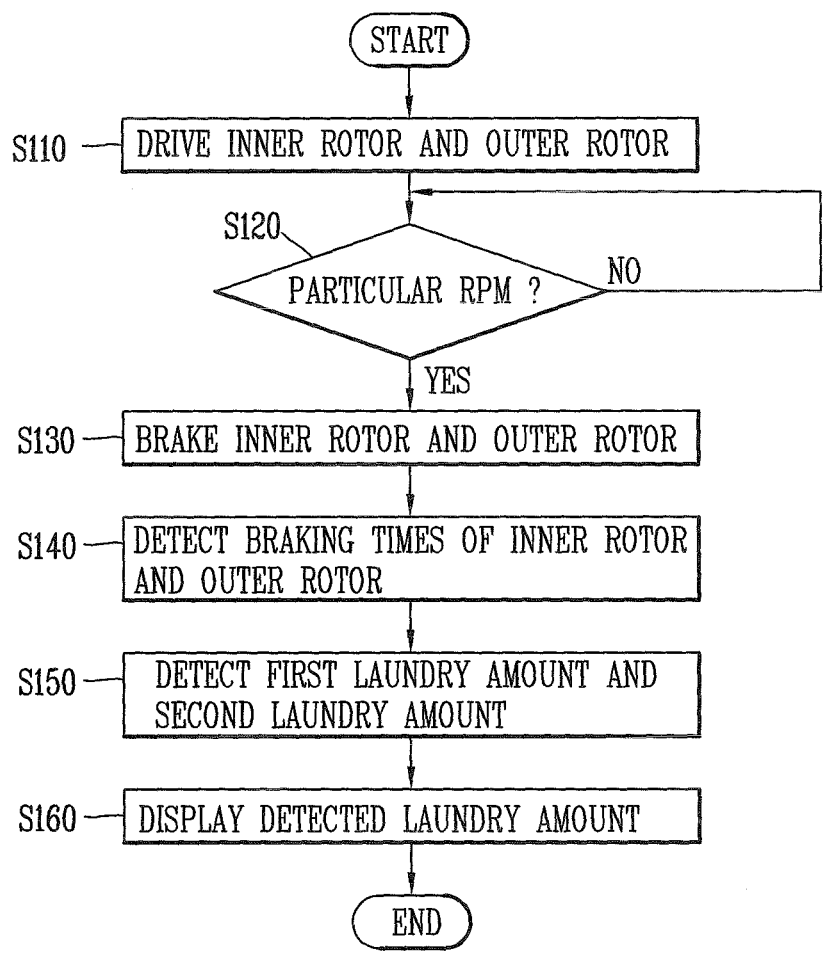
FIGS. 75 and 76 are flowcharts schematically showing a laundry amount detecting method for a washing machine according to the present invention.

Referring to FIG. 75, there is provided a laundry amount detecting method for a washing machine according to an embodiment of the present invention, the washing machine comprising a main body which forms an outer appearance; a tub disposed within the main body; a main drum rotatably mounted in the tub, and accommodating laundry therein; a sub drum mounted in the main drum so as to be relatively rotatable with respect to the main drum; and a driving motor including a stator, an outer rotor connected to the sub drum and rotating outside the stator, and an inner rotor connected to the main drum and rotating inside the stator, the method comprising: initially driving the inner rotor and the outer rotor (S110); braking the inner rotor and the outer rotor (S130) when RPMs of the inner rotor and the outer rotor reach a particular value (S120); and detecting a first laundry amount inside the main drum and a second laundry amount inside the sub drum based on braking times of the inner rotor and the outer rotor (S140, S150). The method further comprises displaying one of the first laundry amount, the second laundry amount, and a final laundry amount determined based on the first and second laundry amounts (S160).

Referring to FIG. 70, the washing machine initially drives the inner rotor and the outer rotor, and increases RPMs of the inner and outer rotors to a particular value, 160 RPM (S110, S120). Then, the washing machine generates braking commands for the inner and outer rotors, and outputs the braking commands to the inner and outer rotors (S130). Here, the washing machine simultaneously outputs the braking command to the inner and outer rotors for minimization of change of the laundry amount due to braking. In case of braking both of the inner and outer rotors using generated power, the outer rotor (RPM2) is firstly braked than the inner rotor (RPM1) as shown in FIG. 70. Referring to FIG. 71, current (I1) applied to the inner rotor 73 is larger than current (I2) applied to the outer rotor 72, and braking time (T1) of the inner rotor 73 is longer than braking time (T2) of the outer rotor 72.

In case of braking the inner rotor 73 using generated power and braking the outer rotor 72 using redundant power, the inner rotor (RM1) is firstly braked than the outer rotor (RPM2') as shown in FIG. 72. Unlike in FIG. 70, the outer rotor undergoing redundant power braking has a larger RPM than the outer rotor undergoing generated power braking (RPM2'>RPM2). Referring to FIG. 73, current (I1) applied to the inner rotor undergoing generated power braking is larger than current (I2) applied to the outer rotor 72 undergoing redundant power braking. That is, the inner rotor undergoing generated power braking is instantaneously applied with a large current, and has a braking time (T1) shorter than that of the inner rotor undergoing redundant power braking. On the other hand, the outer rotor undergoing redundant power braking has an immediate current change to '0' upon receipt of a braking command, and has a braking time (T2) longer than that of the outer rotor undergoing generated power braking as shown in FIGS. 72 and 73.

The washing machine detects a first laundry amount and a second laundry amount based on the braking times (T1, T2) (S150). The washing machine may display one of the first laundry amount, the second laundry amount, and the final laundry amount determined based on the first and second laundry amounts, on a screen, through an output unit (S160). The washing machine determines the final laundry amount based on the first and second laundry amounts in the following manners. For instance, the first and second laundry amounts may be added to each other in a preset ratio. Alternatively, the first laundry amount or the second laundry amount may be set as the final laundry amount. Most simply, the first laundry amount may be set as the final laundry amount.

Figure 76:
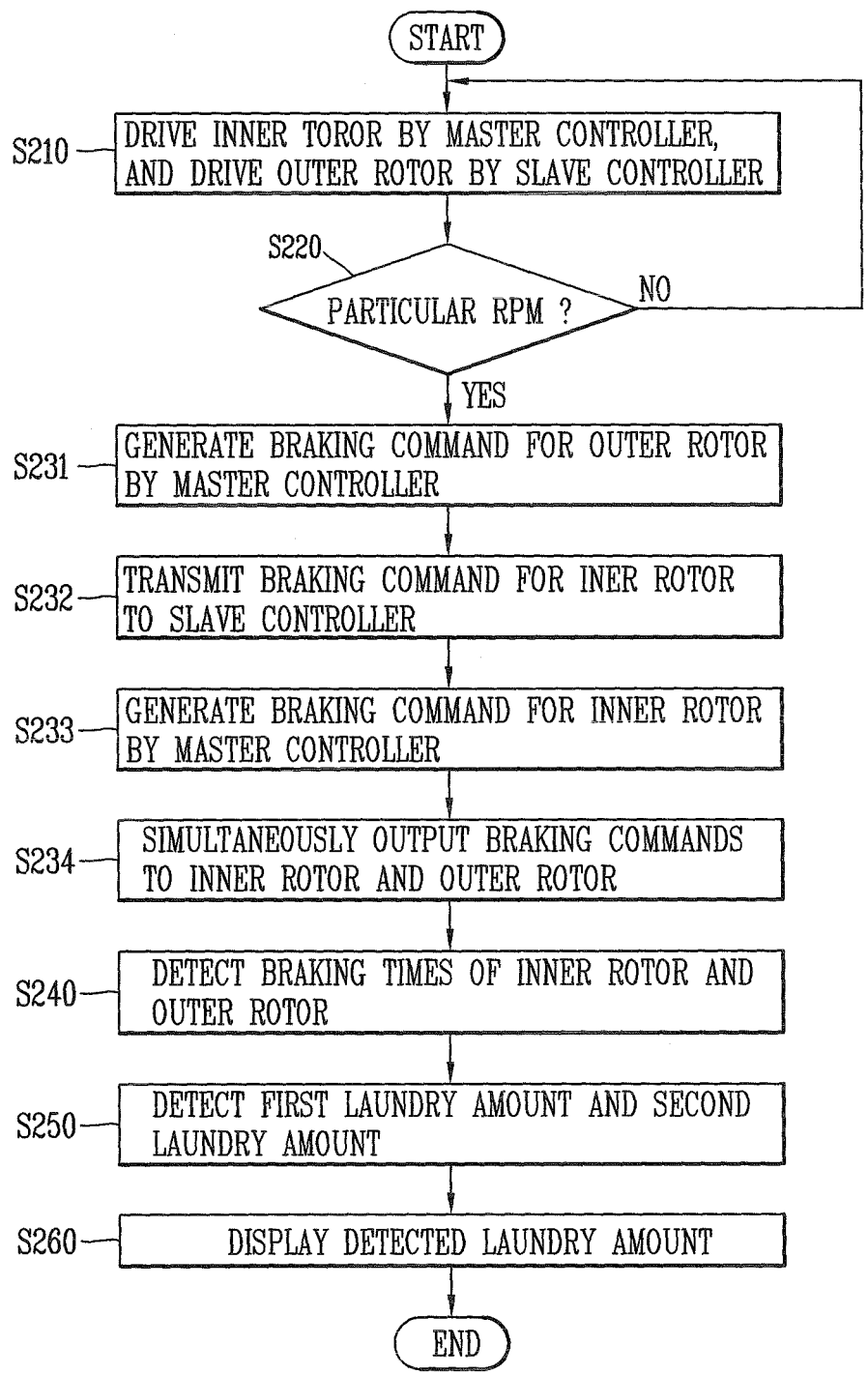

Referring to FIG. 76, there is provided a laundry amount detecting method for a washing machine according to another embodiment of the present invention, the washing machine comprising a main body which forms an outer appearance; a tub disposed within the main body; a main drum rotatably mounted in the tub, and accommodating laundry therein; a sub drum mounted in the main drum so as to be relatively rotatable with respect to the main drum; a driving motor including a stator, an outer rotor connected to the sub drum and rotating outside the stator, and an inner rotor connected to the main drum and rotating inside the stator; a master controller configured to drive the inner rotor; and a slave controller configured to drive the outer rotor, the method comprising: initially driving the inner rotor and the outer rotor by the master controller and the slave controller, respectively; braking the inner rotor and the outer rotor by the master controller, when RPMs of the inner rotor and the outer rotor reach a particular value; and detecting a first laundry amount inside the main drum and a second laundry amount inside the sub drum by the master controller and the slave controller, based on braking times of the inner rotor and the outer rotor.

Referring to FIGS. 70 to 73, the master controller and the slave controller initially drive the inner rotor and the outer rotor, thereby increasing RPMs of the inner and outer rotors into a particular RPM, 160 RPM (S210, S220). Then, the master controller generates a braking command for the outer rotor, and transmits the generated braking command to the slave controller (S231, S232). And, the master controller generates a braking command for the inner rotor (S233). The master controller and the slave controller output the braking commands to the inner rotor and the outer rotor, simultaneously, with consideration of a communication delay therebetween. The master controller detects a first laundry amount based on a braking time of the inner rotor (i.e., time taken for the inner rotor to stop upon receipt of the braking command) (S250). And, the slave controller detects a second laundry amount based on a braking time of the outer rotor (i.e., time taken for the outer rotor to stop upon receipt of the braking command), and transmits information on the second laundry amount to the master controller (S250). Then, the master controller determines a final laundry amount based on the first and second laundry amounts in the following manners. For instance, the first and second laundry amounts may be added to each other in a preset ratio. Alternatively, the first laundry amount or the second laundry amount may be set as the final laundry amount. Most simply, the first laundry amount may be set as the final laundry amount. The washing machine may display, on a screen, one of the first laundry amount, the second laundry amount, and the final laundry amount determined based on the first and second laundry amounts (S260).

As aforementioned, in the washing machine and the laundry amount detecting method thereof according to the present invention, two drums are independently driven to allow laundry to perform 3D motions in various manners. Owing to the 3D motions of the laundry, washing performance of the washing machine can be enhanced, and washing time can be reduced. In the present invention, the washing machine has enhanced washing performance, through 3D motions of laundry, with consideration of torque distribution due to driving of two drums, a mechanical force applied to the laundry, and movements of the laundry. The washing machine is provided with two drums, and a single driving motor for independently driving the two drums. Since a laundry amount is detected with respect to each drum, the laundry amount can be precisely detected. In the present invention, the laundry amounts inside the two drums are detected in different manners. This can allow the laundry amount to be more precisely detected, and can reduce the amount of washing water and electricity required to perform washing, rinsing and dehydration processes.

What is claimed is:

1. A washing machine, comprising:
   a main body defining an outer appearance;
   a tub disposed within the main body;
   a main drum rotatably mounted in the tub;
   a sub drum mounted in the main drum, the sub drum configured to rotate relative to the main drum;
   an outer shaft connected to the main drum;
   an inner shaft disposed inside the outer shaft, the inner shaft connected to the sub drum;
   a driving motor comprising a stator, an outer rotor connected to the inner shaft and configured to rotate outside the stator, and an inner rotor connected to the outer shaft and configured to rotate inside the stator; and
   an inner rotor nut coupled to the outer shaft, the inner rotor nut connected to the inner rotor.

2. The washing machine of claim 1, further comprising a spring washer provided between the inner rotor and the inner rotor nut.

3. The washing machine of claim 2, wherein the spring washer comprises a concave-convex member having a protruding portion and a concaved portion.

4. The washing machine of claim 2, further comprising a connection part between the outer shaft and the inner rotor, wherein the spring washer is fitted into the outer shaft at the connection part between the outer shaft and the inner rotor.

5. The washing machine of claim 2, wherein the spring washer is an annular member which encloses an outer circumference of the outer shaft.

6. The washing machine of claim 2, further comprising an inner bushing installed between the outer shaft and the inner rotor, and configured to transmit a rotational force of the inner rotor to the outer shaft.

7. The washing machine of claim 6, further comprising a connection part between the outer shaft and the inner bushing, wherein the spring washer is installed at the connection part between the outer shaft and the inner bushing, and configured to reduce vibrations and noise of the outer shaft in an axial direction.

8. The washing machine of claim 7, wherein the spring washer is installed on an inner surface of the inner bushing.

9. The washing machine of claim 2, further comprising a plain washer provided between the inner rotor and the spring washer.

10. The washing machine of claim 9, wherein the plain washer is fitted into an outer circumference of the outer shaft.

11. The washing machine of claim 1, wherein the inner rotor nut is screw-coupled to an outer circumference of the outer shaft.

12. The washing machine of claim 1, wherein an inner ball bearing is installed between the outer shaft and the inner shaft.

13. The washing machine of claim 12, wherein the inner ball bearing is configured to enable the driving motor to independently drive the outer shaft and the inner shaft.

14. The washing machine of claim 1, wherein the inner rotor nut fixes the inner rotor.

15. The washing machine of claim 1, wherein the inner rotor nut is configured to prevent release of the outer shaft.

* * * * *